US011514393B1

(12) United States Patent
Alonso Lopez et al.

(10) Patent No.: US 11,514,393 B1
(45) Date of Patent: Nov. 29, 2022

(54) AERIAL ITEM DELIVERY AVAILABILITY

(71) Applicant: Amazon Technologies, Inc., Seattle, WA (US)

(72) Inventors: Javier Alonso Lopez, Edmonds, WA (US); Pragyana K. Mishra, Seattle, WA (US); Kenny Xie, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 279 days.

(21) Appl. No.: 16/880,748

(22) Filed: May 21, 2020

Related U.S. Application Data

(63) Continuation-in-part of application No. 16/447,597, filed on Jun. 20, 2019.

(51) Int. Cl.
*G06Q 10/08* (2012.01)
*B64C 39/02* (2006.01)
*G05D 1/10* (2006.01)

(52) U.S. Cl.
CPC ..... *G06Q 10/08355* (2013.01); *B64C 39/024* (2013.01); *G05D 1/106* (2019.05); *G06Q 10/0832* (2013.01); *B64C 2201/127* (2013.01); *B64C 2201/128* (2013.01)

(58) Field of Classification Search
CPC ......... G06Q 10/0832; G06Q 10/08355; G05D 1/106; B64C 39/024; B64C 2201/127; B64C 2201/128
USPC ........................................................ 705/338
See application file for complete search history.

(56) References Cited

U.S. PATENT DOCUMENTS

| | | | | |
|---|---|---|---|---|
| 7,912,880 | B2 | 3/2011 | Klein | |
| 9,743,239 | B1 * | 8/2017 | Mishra | H04W 4/023 |
| 10,219,112 | B1 * | 2/2019 | Mishra | G06Q 10/083 |
| 10,482,418 | B2 * | 11/2019 | Burch, V | G05D 1/0094 |
| 2003/0158668 | A1 | 8/2003 | Anderson | |
| 2013/0004179 | A1 | 1/2013 | Nielsen et al. | |
| 2017/0154347 | A1 * | 6/2017 | Bateman | G06Q 50/28 |
| 2018/0005184 | A1 * | 1/2018 | Schenken | G06Q 10/06312 |
| 2018/0088578 | A1 * | 3/2018 | Burch, V | G06Q 50/28 |

* cited by examiner

*Primary Examiner* — Gertrude Arthur Jeanglaude
(74) *Attorney, Agent, or Firm* — Athorus, PLLC

(57) ABSTRACT

Disclosed are systems and methods to determine preferred delivery points within a parcel that are available to receive an aerial delivery of an item. For each delivery point a plurality of criteria scores may be determined for various criteria based on a processing of parcel data, image data, and/or sensor data corresponding to the parcel. The criteria may be aerial navigation related criteria or user preference criteria. The criteria scores may then be used to determine a suitability score for each delivery point. In some implementations, a user may specify a preferred delivery point and/or indicate one user criteria as more important than another criteria.

20 Claims, 32 Drawing Sheets

100
104-3
102-3
104-1
102-1
102-2
104-2
102-N
104-N
20th Ave E
21st Ave E
22nd Ave E

1509

| | CRITERIA | A1:B2 (1504-1) | • • • | J1:K2 (1504-2) | K1:L2 (1504-3) | • • • | L8:M9 (1504-4) | • • • | O13:P14 (1504-N) |
|---|---|---|---|---|---|---|---|---|---|
| 1502-1 | VALID DELIVERY POINT (VDP) | .3 | • • • | .9 | 1 | • • • | .7 | • • • | 0 |
| 1502-2 | PROBABILITY CLEAR (PC) | 0 | • • • | .9 | 1 | • • • | .7 | • • • | 0 |
| 1502-3 | REACHABILITY (R) | 0 | • • • | 1 | 1 | • • • | 1 | • • • | 0 |
| 1502-4 | DISTANCE FROM INVALID DELIVERY POINT (DDP) | .5 | • • • | 1 | .9 | • • • | 1 | • • • | 0 |
| 1502-5 | ACCESS CONVENIENCE (AC) | — | • • • | .5 | .4 | • • • | 1 | • • • | — |
| 1502-6 | NOISE (N) | — | • • • | .4 | .4 | • • • | .4 | • • • | — |
| 1502-7 | DOWNDRAFT DISRUPTION (DD) | — | • • • | .6 | .6 | • • • | .6 | • • • | — |
| 1510 | SUITABILITY SCORE (SS) | — | • • • | 4.4 | 4.3 | • • • | 4.7 | • • • | — |

1511 (rows 1502-1 to 1502-4)

1512 (rows 1502-5 to 1510)

FIG. 15

AERIAL ITEM DELIVERY AVAILABILITY

BACKGROUND

Unmanned Aerial Systems (UAS) need a minimum space that is clear and accessible for landing and/or takeoff. In unfamiliar areas, delineating this space requires a mapping method that either uses 2D imagery, 3D models, or a combination of both to ascertain potential locations that are clear and accessible. These techniques, which often use three-dimensional point-clouds or mesh models, are computationally expensive and data intensive. Plus, valuable flight time may be consumed by the UAS as it images an area and processes those images in search for a clear and accessible area to land.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 15 is an example matrix of criteria scores for a plurality of delivery points, in accordance with described implementations.

Figure 1:
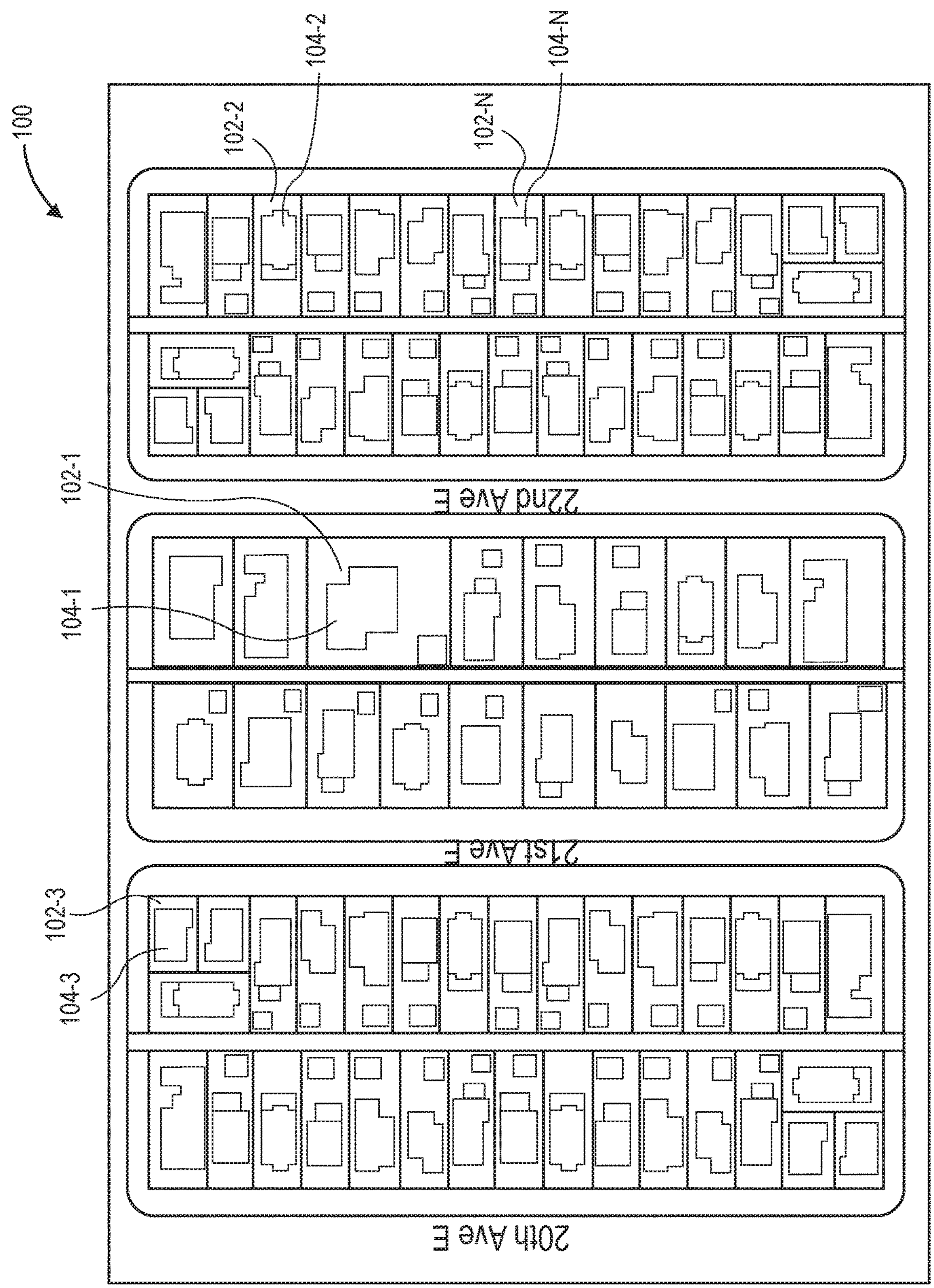
FIG. 1 is a diagram of a parcel map of an area indicating parcel boundaries and structure footprints on parcels.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims.

DETAILED DESCRIPTION

Systems and methods to determine and rank large areas encompassing many parcels (e.g., neighborhoods, cities, towns) for aerial item delivery availability, without the use of image data of the areas, are disclosed. In some implementations, publicly available two-dimensional parcel maps that indicate parcel boundaries and outlines of structures on those boundaries may be obtained and processed. For example, parcels within the area may be processed to determine deliverable area shapes (e.g., squares, rectangles, circles, ellipses, etc.) within the parcel, excluding the area of the structure. A determination is then made as to whether one or more of the deliverable area shapes exceed a deliverable area threshold. If one or more of the deliverable area shapes of the parcel exceed the threshold, the parcel is considered to be available for aerial item delivery. This processing may be done for all parcels within an area, or all user parcels of users of a service within the area (or any other selection criteria). Likewise, this processing may be done for multiple different areas and the areas may be ranked based on the overall determined availability of aerial item delivery to parcels within those areas.

Ranking areas with respect to overall determined availability of aerial item delivery to parcels may be beneficial in, for example, deployment planning to identify new areas to provide aerial item delivery services, planning for mobile deployment locations to position vehicles to deploy aerial vehicles for item delivery to areas, future fulfillment center location planning, etc.

In addition to determining availability of aerial item delivery for areas, the parcel processing may likewise be used to determine delivery points for aerial item delivery to the parcel, in accordance with disclosed implementations. For example, aerial image data of a parcel may be obtained but only portions of the image data processed. Specifically, image data corresponding to the location of the structure and portions of the parcel that are determined to not be within a deliverable area shape that is larger than the threshold may be excluded from processing. As a result, only image data corresponding to portions of the parcel that are potentially available for aerial item delivery are processed. This reduces the computation time required to determine a delivery point at the parcel for aerial item delivery.

Still further, in some implementations, multiple delivery points within a parcel may be determined and ranked based on one or more criteria to determine a preferred delivery point and/or a ranked list of preferred delivery points. Broadly, criteria may be classified as either aerial vehicle navigation criteria or user criteria. Aerial vehicle navigation criteria may include, but is not limited to, probability of the delivery point being clear and available for landing and/or item delivery, the feasibility of navigation of the aerial vehicle to and delivery of an item at the delivery point, and/or the distance of the delivery point from non-deliverable points (also referred to herein as invalid delivery points) and/or objects that are to be avoided. User criteria may include, but is not limited to, distance of the delivery point to the user, distance of the delivery point to a section of the structure (e.g., entrance/exit) at the parcel, noise level, and/or downdraft disruption.

In determining valid delivery points, the aerial vehicle navigation criteria may be considered to determine if a delivery point is to be considered a valid delivery point and presented/provided to a user as an option as a delivery point for an aerial item delivery. If the delivery point is determined to be a valid delivery point for the parcel, the valid delivery point may be presented to the user for selection as a preferred delivery point. If the delivery point is determined to be an invalid delivery point, the invalid delivery point is not presented to the user for selection and is not available for aerial item delivery.

A user, which includes a customer that has ordered an item for delivery to the parcel and/or another person at or associated with the parcel, may be presented with an interface to indicate an importance of one or more user criteria with respect to one or more other user criteria. For example, a user at a parcel in an urban area may indicate that a noise level is more important than a distance of the delivery point to a section of the structure. In comparison, a user in a rural area may indicate that the potential disruption of downdraft on plants or landscaping (e.g., flowerbeds) is more important than noise or access convenience. In some implementations, the interface may be a graphical user interface that includes a visual map of the parcel and the user may select different valid delivery points and be presented, for each selected valid delivery point, different rankings or values of each of the user criteria for that delivery point.

As aerial vehicle deliveries are performed to a parcel, feedback may be obtained from one or more of the user, aerial vehicle sensors, and/or sensors at the parcel to validate or update the values determined for each of the criteria. Based on the feedback received, criteria values for each potential delivery point may be updated and the delivery points reranked as appropriate.

FIG. 1 is a diagram of a two-dimensional ("2D") parcel map 100 of an area indicating parcel boundaries and structure footprints on parcels. Parcel maps are publicly accessible records that specify parcel 102 boundaries and the outline or footprint of structures 104 on those parcels. The parcel maps 100 are vector based and often include latitude and longitude information for the parcel boundaries and structure footprints.

In the example parcel map 100, the area includes several parcels, such as parcels 102-1, 102-2, 102-3 through 102-N and each of the parcels include a structure, such as structure 104-1, 104-2, 104-3 through 104-N. As illustrated, the parcels 102 may be of different sizes and shapes and the structures 104 on those parcels may likewise be of different sizes, shapes, and positions on each parcel. However, each parcel and each structure is a polygon that can be quantified and measured from the parcel map. As discussed herein, each parcel may be processed based on the parcel dimensions and the structure dimensions to determine whether the parcel is potentially available for aerial item delivery.

Figure 2:
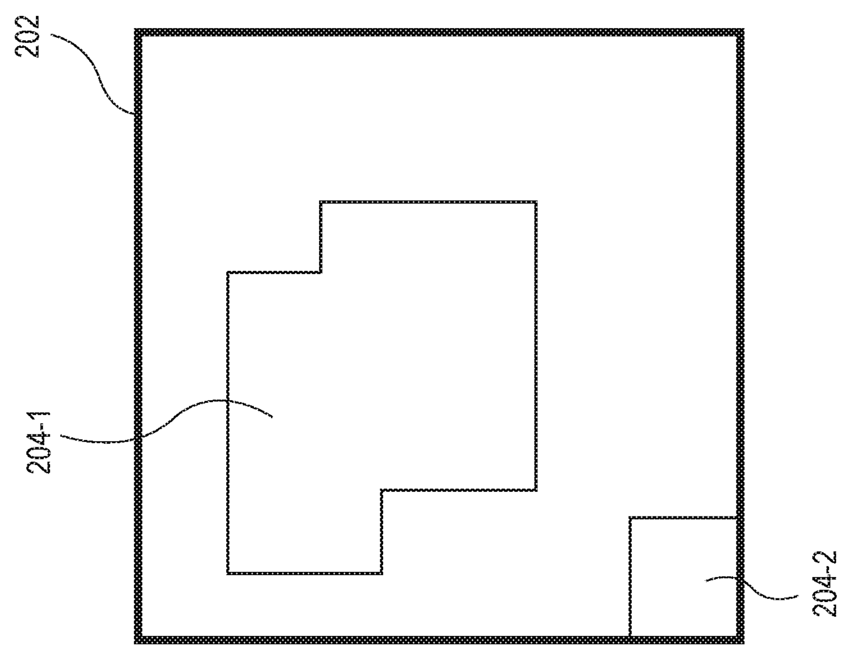
FIG. 2 is a diagram of a parcel polygon with structure footprints of the structures located at the parcel.

FIG. 2 is a diagram of a parcel polygon 202, which corresponds to parcel 102-1 of FIG. 1, with structure footprints 204-1 and 204-2 of the structures located at the parcel 202. As illustrated, the entire parcel and structures are represented in 2D form in the shape of polygons that have latitude and longitude (or any other projection/coordinate frame) accessible from the publicly accessible parcel map.

Figure 3:
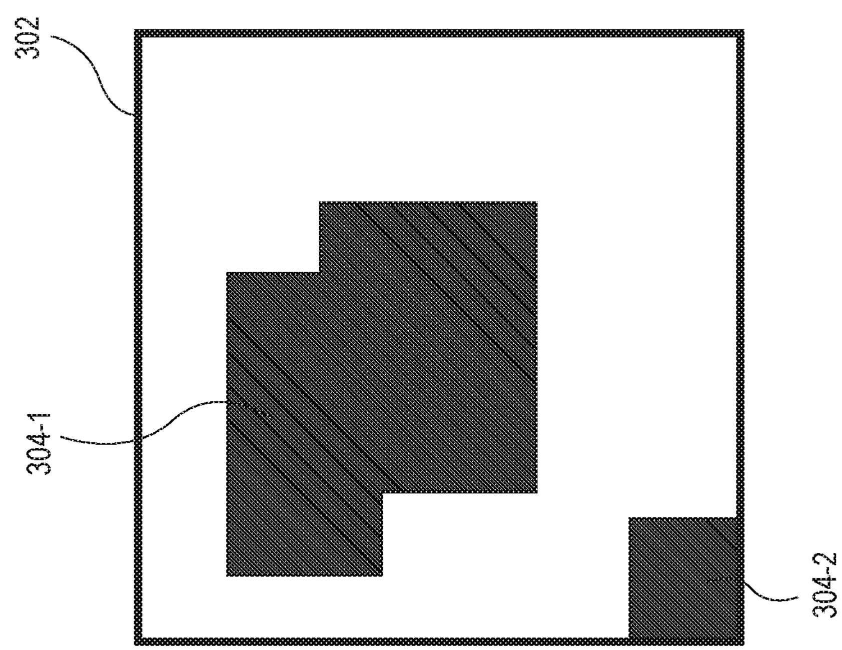
FIG. 3 is a diagram of a remaining parcel polygon with the footprint of the structure removed from consideration, in accordance with described implementations.

To determine the availability of the parcel for aerial item delivery, the polygon(s) representing the footprint of structure(s) at the parcel are removed from consideration. For example, FIG. 3 is a diagram of a remaining parcel polygon 302, which corresponds to parcel polygon 202 of FIG. 2, with the footprint of the structures 304-1 and 304-2 removed from consideration, in accordance with described implementations. The portions of the remaining parcel polygon 302 corresponding to the structures 304, in the disclosed implementations are removed because aerial delivery onto those structures is not an available option for the area. However, it will be appreciated that in some implementations, some or all of a structure 304 may be included in the remaining parcel polygon 302 and considered when determining if the parcel is available for aerial item delivery.

Figure 4B:
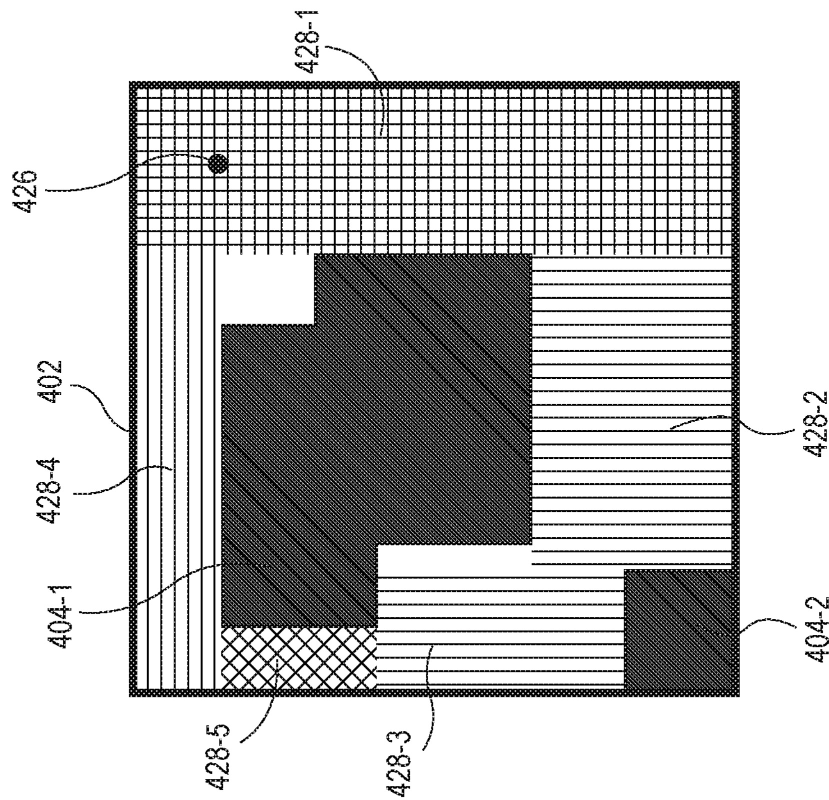
FIGS. 4A and 4B are diagrams of the remaining parcel polygon with the footprint removed and deliverable area shapes determined, in accordance with described implementations.

With the reduced parcel polygon, the disclosed implementations determine the largest possible shape (such as a rectangle, circle, ellipse) that can be inscribed within the remaining parcel polygon. For example, FIGS. 4A and 4B are diagrams of the remaining parcel polygon 402, which corresponds to the remaining parcel polygon 302 of FIG. 3, with the footprint of the structures 404-1, 404-2 removed and deliverable area shapes 408/428 in the form of rectangles determined, in accordance with described implementations.

In some implementations, one or more starting points 406/426 are selected within the remaining parcel polygon 402 from which shapes are to be formed. The starting points may be randomly selected or determined by other techniques. Once a starting point is specified, the disclosed implementations generate the largest possible shape, in this example a rectangle, starting at the starting point and extending such that the rectangle encompasses as much as possible of the remaining parcel polygon 402. For example, referring to FIG. 4A, a first rectangle 408-1 formed from starting point 406 is generated.

Figure 4A:
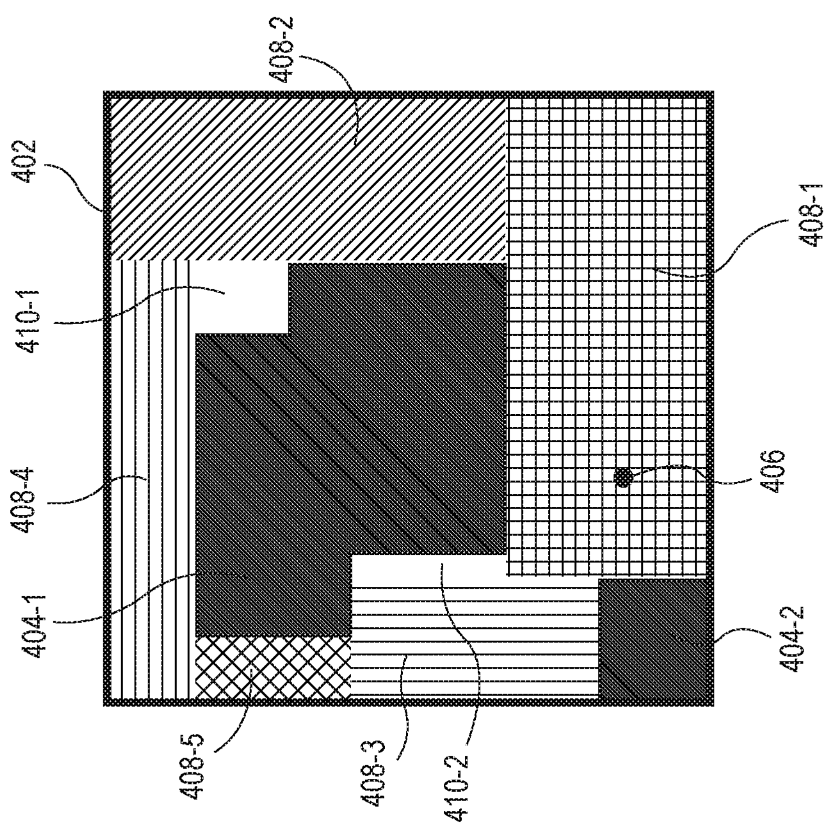

In the example illustrated in FIG. 4A, after forming the first rectangle 408-1, the disclosed implementations generate the next largest rectangle 408-2 within the remaining parcel polygon 402 such that the next largest rectangle 408-2 remains within the polygon 402, does not expand into the removed portion of the area corresponding to the footprint 404-1, 404-2 of the structure and does not overlap any portion of any other formed rectangle, such as rectangle 408-1. This process may continue and form additional rectangles 408-3, 408-4, 408-5 until the rectangles reach a size that does not exceed a deliverable area threshold.

In the example illustrated in FIG. 4A, five rectangles are formed 408-1, 408-2, 408-3, 408-4, and 408-5 that exceed the minimum deliverable area threshold. As illustrated, there may remain portions of the remaining parcel polygon 402, such as portions 410-1, 410-2, that are not included in any rectangle. As discussed further below, in some implementations those portions may be excluded from consideration as areas that are not available for aerial item delivery because they do not meet the minimum size requirement.

Comparing FIG. 4A to FIG. 4B, the process may be performed for each of several randomly selected starting points. Starting at different starting points 406/426 may result in different rectangle configurations, as illustrated. For example, the largest deliverable area shape 428-1 is different than the largest deliverable area shape 408-1 of FIG. 4A, even though the parcel 402 remains unchanged. Likewise, the two second largest deliverable area shapes 408-2 and 428-2 are different. In comparison, deliverable area shapes 408-3, 408-4, and 408-5 are the same as deliverable area shapes 428-3, 428-4, and 428-5. The difference between some of the deliverable area shapes is the result of the different starting points 406 and 426.

FIGS. 5A through 5D are diagrams of the reduced parcel polygon 502, which corresponds to parcel polygon 302 of FIG. 3, with the footprint of the structures 504-1/504-2 removed and deliverable area shapes, in this example in the form of rectangles 508 determined, in accordance with described implementations. In this example, referring first to FIG. 5A, a first starting point 506-1 is randomly selected from the area of the remaining parcel polygon 502 and a rectangle 508-1 formed as large as possible from that area such that the rectangle 508-1 contacts at least one edge of the remaining parcel polygon 502 and at least one edge of the first portion of the area 504-1 that was removed.

Figure 5A:
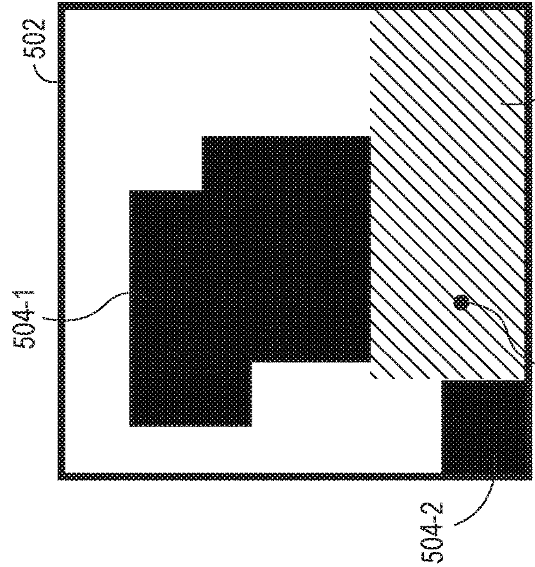
FIGS. 5A through 5D are diagrams of the remaining parcel polygon with the footprint removed and deliverable area shapes determined, in accordance with described implementations.
Figure 5B:
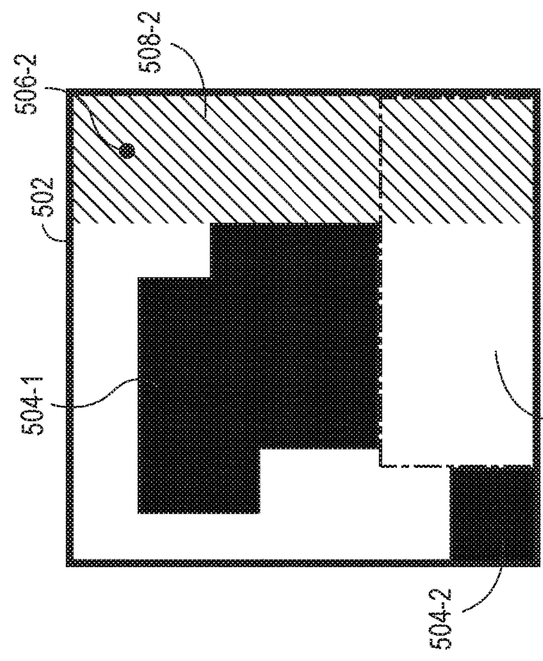

After forming the first rectangle, a reduced remaining parcel polygon is generated from the remaining parcel polygon 502 by removing the portion of remaining parcel polygon encompassed by the rectangle 508-1. Referring to FIG. 5B, a second starting point 506-2 is randomly selected from within the area of the reduced remaining parcel polygon. From the second starting point, another largest rectangle 508-2 is formed. Contrary to the prior examples, in this example, the formed deliverable area shapes may overlap some or all of another formed deliverable area shape. For example, in FIG. 5B the first deliverable area shape 508-1 is overlapped by the second deliverable area shape 508-2.

Figure 5C:
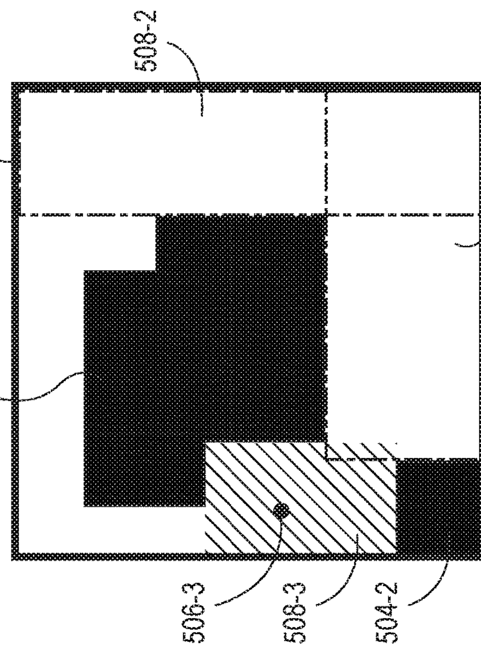

The reduced remaining parcel polygon may then be again further reduced to remove the portion corresponding to the second rectangle 508-2. Referring now to FIG. 5C, a third starting point 506-3 may be randomly or otherwise selected from the reduced remaining parcel polygon and a third deliverable area shape 508-3 formed which, as with the others, may overlap one or more other formed deliverable area shapes, such as deliverable area shape 508-1.

Figure 5D:
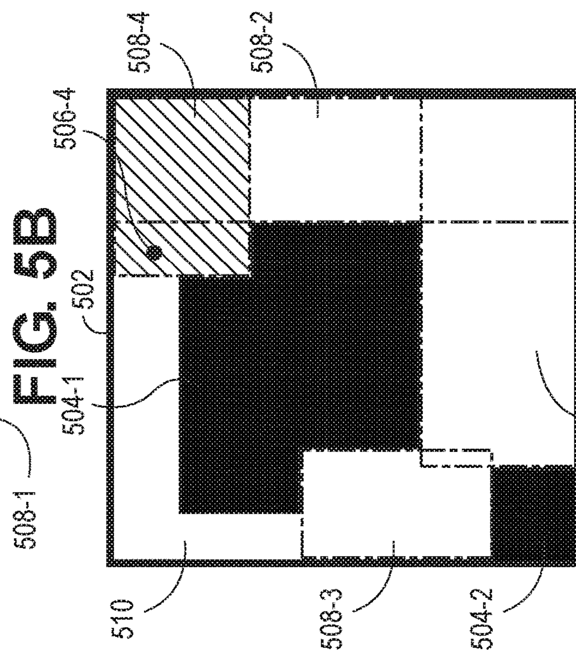

This process of continuing to reduce the reduced remaining parcel polygon, selecting a starting point from within the reduced remaining parcel polygon and then creating a rectangle from that starting point that is within the remaining parcel polygon may continue, as illustrated in FIG. 5D with the selection of a fourth starting point 506-4 and a fourth rectangle 508-4, may continue until a defined number of deliverable area shapes have been formed (e.g., 5, 10) or until a minimum rectangle size (e.g., 1 meter by 1 meter) is reached, or the entire area of the remaining parcel polygon is encompassed by one or more deliverable area shapes.

In the example illustrated in FIGS. 5A through 5D, the remaining parcel polygon is processed and deliverable area shapes 508-1 through 508-5, in the form of rectangles, formed until a minimum deliverable area shape size is formed. As a result, area 510 is not encompassed by a deliverable area shape and may be considered to not be an area that is available for aerial item delivery.

Figure 6:
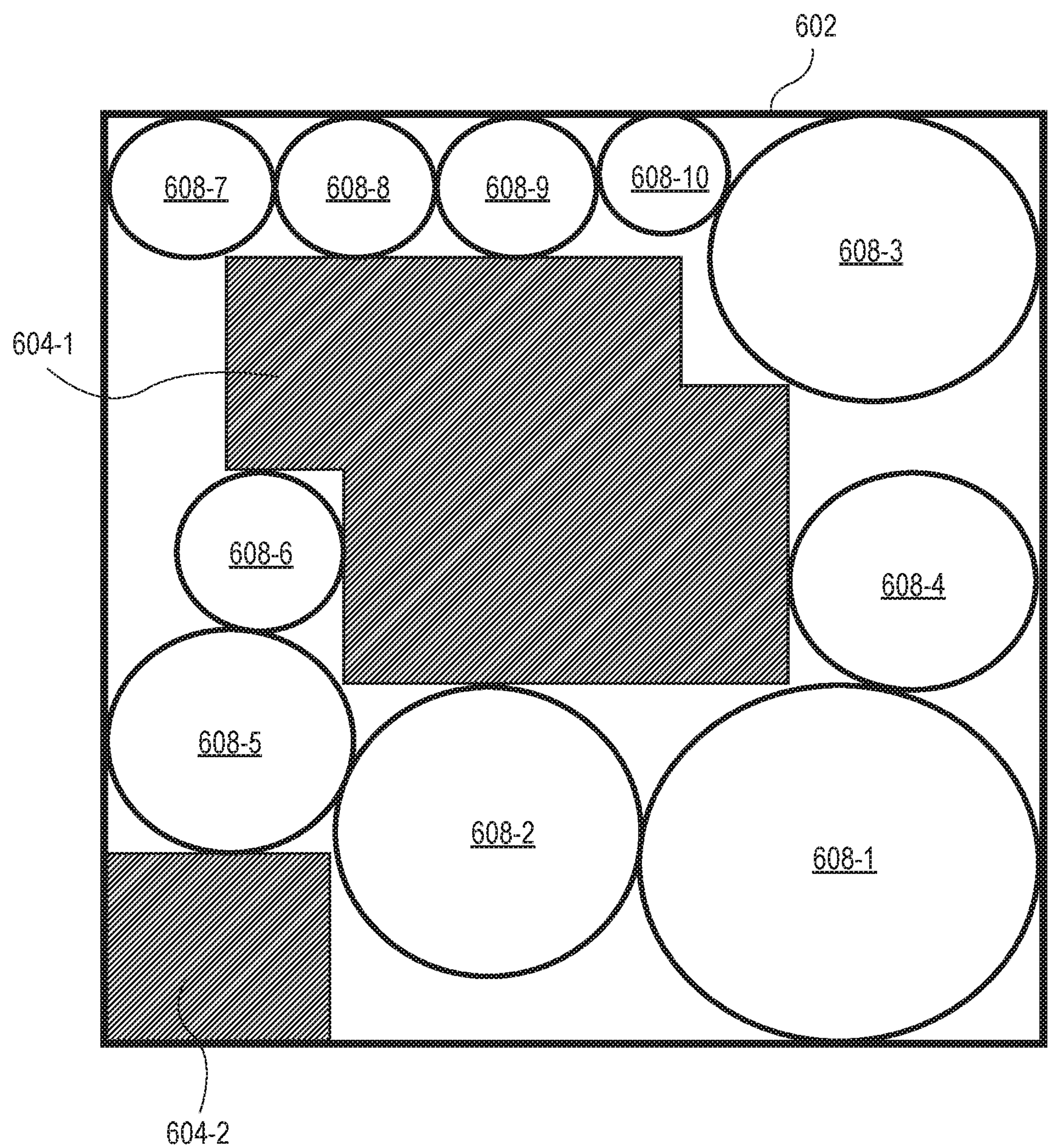
FIG. 6 is a diagram of the remaining parcel polygon with the footprint removed and deliverable area shapes determined, in accordance with described implementations.

FIG. 6 is a diagram of the remaining parcel polygon 602 with the footprint of the structures 604-1 and 604-2 removed and deliverable area shapes 608-1, 608-2, 608-3, 608-4, 608-5, 608-6, 608-7, 608-9, 608-10, in the form circles determined, in accordance with described implementations. In the illustrated example, similar to the discussion with respect to FIGS. 4A and 4B, the deliverable area shapes 608 are formed as large as possible but have the constraints that they not expand beyond the remaining parcel polygon 602, not encroach into the removed portions 604-1, 604-2, or overlap other already formed deliverable area shape. However, it will be appreciated, that in other implementations, the constraints may be changed such that the deliverable area shapes may be allowed to overlap. For example, if the deliverable area shapes are allowed to overlap, deliverable area shape 608-2 would be larger and overlap deliverable area shape 608-1. Likewise, deliverable area shape 608-10 would be larger and overlap deliverable area shape 608-3 and deliverable area shape 608-6 would be larger and overlap deliverable area shape 608-5.

Figure 7:
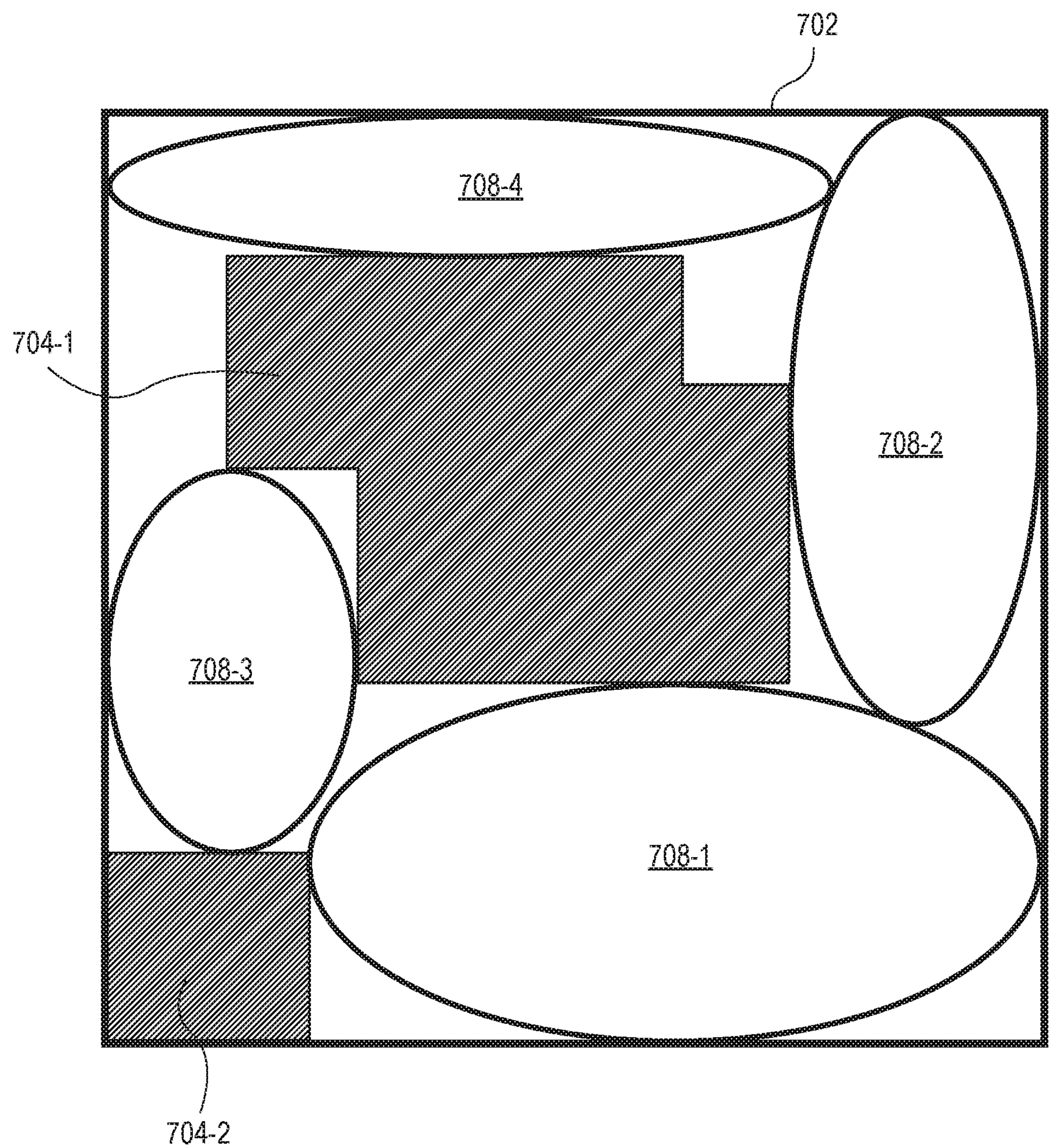
FIG. 7 is a diagram of the remaining parcel polygon with the footprint removed and deliverable area shapes determined, in accordance with described implementations.

FIG. 7 is a diagram of the remaining parcel polygon 702, which corresponds to remaining parcel polygon 302 of FIG. 3, with the footprint of the structures 704-1/704-2 removed and deliverable area shapes 708-1, 708-2, 708-3, 708-4, in the form of ellipses, determined, in accordance with described implementations. In the illustrated example, similar to the discussion with respect to FIGS. 4A, 4B, and 6, the deliverable area shapes 708 are formed as large as possible but have the constraints that they not expand beyond the remaining parcel polygon 602, not encroach into the removed portions 704-1, 704-2, or overlap other already formed deliverable area shapes. However, it will be appreciated, that in other implementations, the constrains may be changed such that the deliverable area shapes may be allowed to overlap. For example, if the deliverable area shapes are allowed to overlap, deliverable area shape 708-2 would be larger and overlap deliverable area shape 708-1. Likewise, deliverable area shape 708-4 would be larger and overlap deliverable area shape 708-2.

Regardless of the constraints applied to forming the deliverable area shapes and/or the shapes used (e.g., rectangles, circles, ellipses), if the one or more shapes formed for a parcel polygon is larger than a deliverable area threshold, the parcel is considered to be available for aerial item delivery. This may be done for each parcel within the area and an area score or ranking determined for the area.

Figure 8:
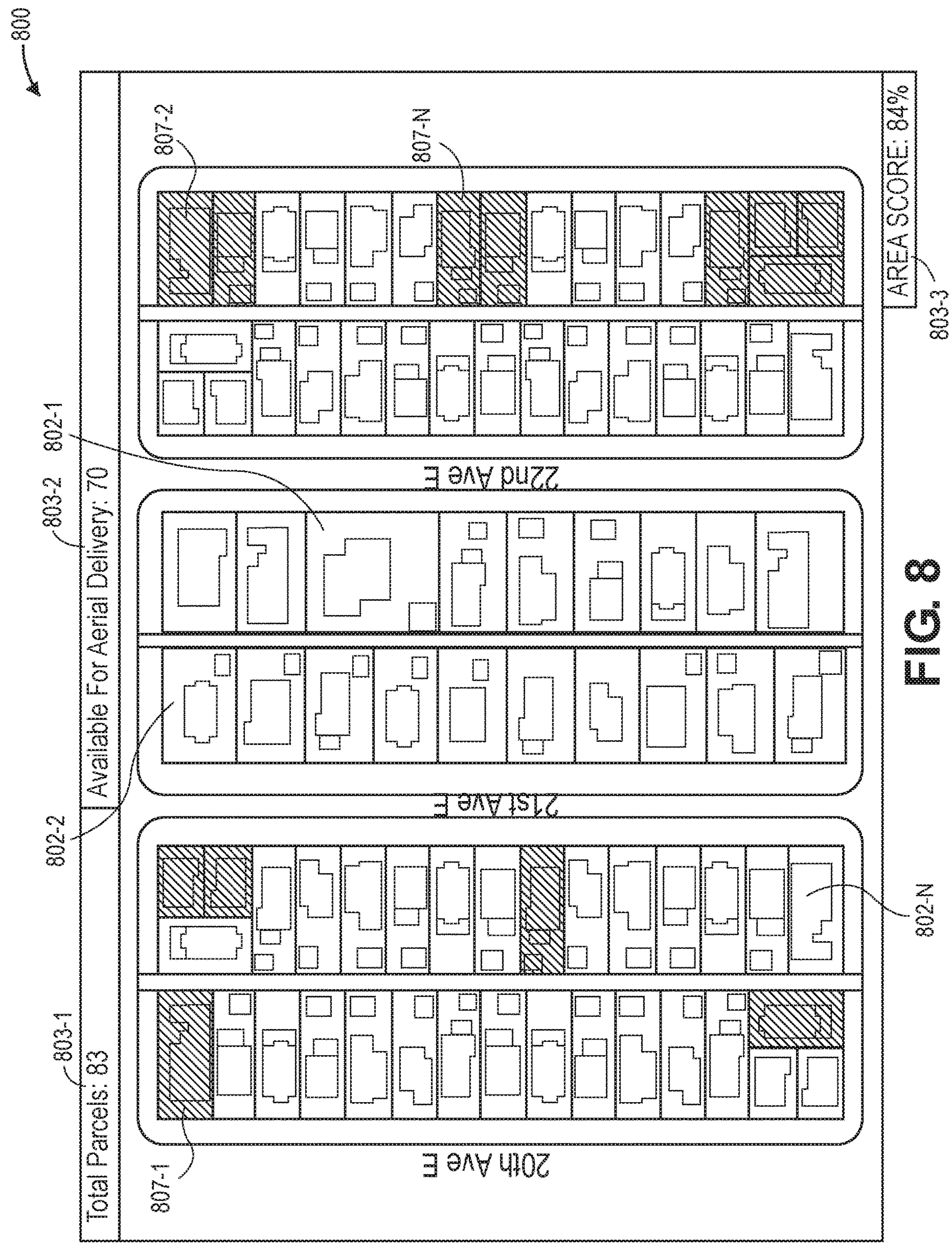
FIG. 8 is a graphical illustration of the parcel map of FIG. 1 with deliverability information for the area, in accordance with described implementations.

FIG. 8 is a graphical illustration 800 of the parcel map of FIG. 1 with deliverability information for the area, in accordance with described implementations. In the illustrated example, parcels 807-1, 807-2 through 807-N that are determined to not be available for aerial item delivery are greyed out or hatched, as illustrated, to visually indicate the parcels as not available for aerial item delivery. Likewise, an overall count 803-1 of parcels in the area, an available count 803-2 of parcels determined to be available for aerial item delivery, an area score 803-3 and/or other information relating to the area and the determined availability of parcels for aerial item delivery may be presented.

In the illustrated example, the described implementations determined that thirteen of the parcels 807-1, 807-2, through 807-N within area 800 are not available for aerial item delivery and that the other parcels 802-1, 802-2, through 802-N are available for aerial item delivery. In some implementations, as discussed further below, each parcel that is determined to be available for aerial item delivery may be assigned a parcel deliverability score. This information may be used for a variety of reasons. For example, the information about the area 800 may be used for deployment planning to identify new areas to provide aerial item delivery services, planning for mobile deployment locations to position vehicles to deploy aerial vehicles for item delivery to areas, future fulfillment center location planning, etc. For example, a weighted sum of parcel deliverability scores for parcels within the area may be computed as an overall area score indicating the confidence or availability of parcels within the area to receive aerial item deliveries. Area scores may be computed for multiple different areas, using the described implementations, and those area scores may be used to rank or prioritize different areas for aerial item delivery.

In addition to determining deliverability for an area, without having to process any image data, the disclosed implementations may also use the information generated for parcels to determine or rank deliverable area shapes within a parcel. For example, each deliverable area shape may be further processed, and a delivery rank assigned to each indicating a preference or order as to which deliverable area shape within the parcel should be processed first during an actual aerial item delivery to confirm an open and accessible area for aerial item delivery.

Figure 9:
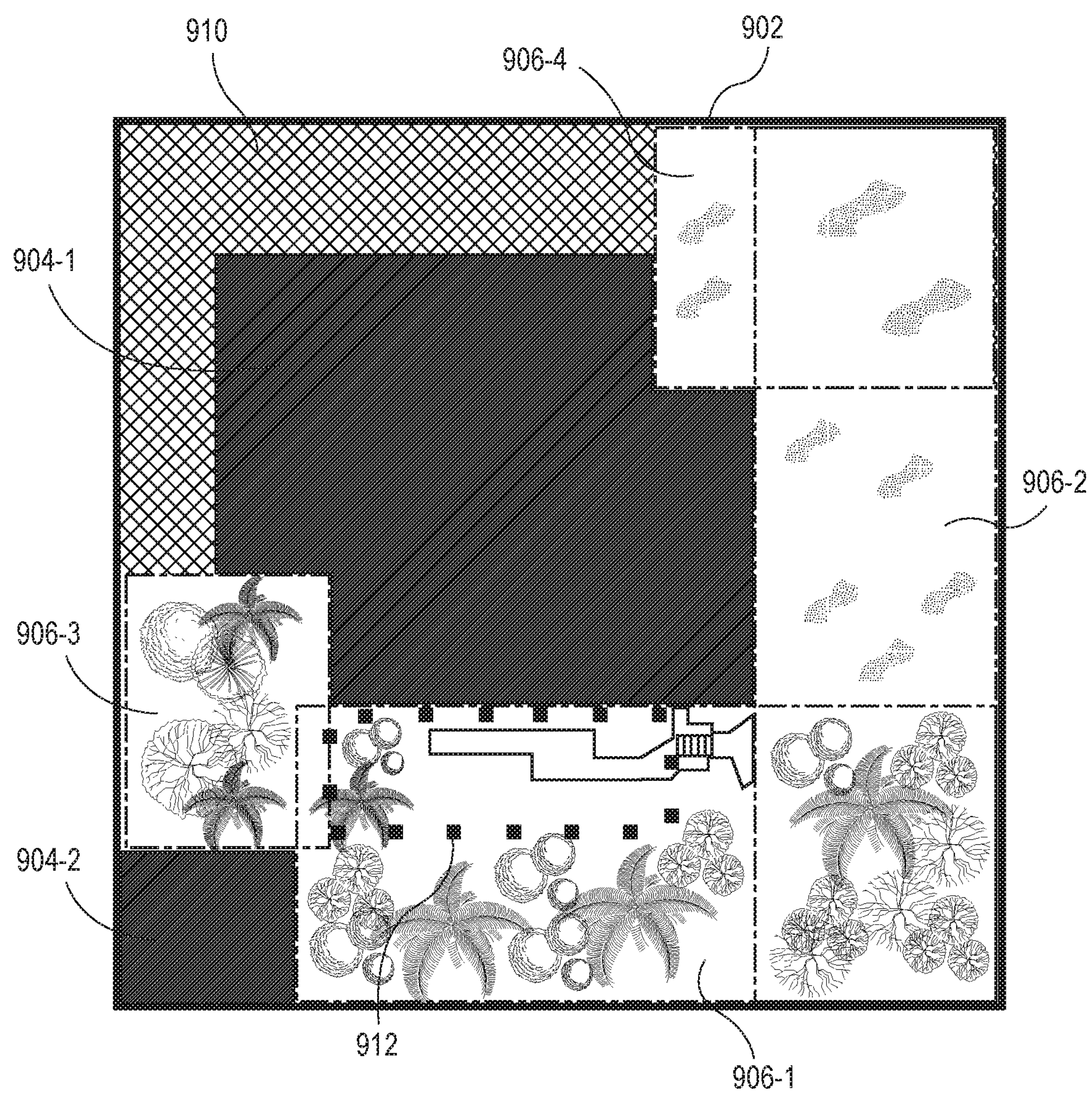
FIG. 9 is an image of the parcel, with image data corresponding to the footprint of the structure removed, in accordance with described implementations.

FIG. 9 is an image of the parcel 902, which corresponds to parcel 102 of FIG. 1, with image data corresponding the footprint of the structures 904-1/904-2 removed, in accordance with described implementations. In the illustrated example, in addition to removing image data corresponding to the footprint of the structures 904-1/904-2, image data for portions of the parcel, such as portion 910 that are not encompassed by one or more deliverable area shapes 906, may be removed from consideration. By removing image data from consideration that is not included in a deliverable area shape, the image processing is reduced, thereby increasing the speed at which deliverable area shapes can be ranked and/or the speed at which a delivery point within a deliverable area shape may be determined.

In the illustrated example, image data within deliverable area shape 906-1 is processed, image data within deliverable area shape 906-2 is processed, image data within deliverable area shape 906-3 is processed, and image data within deliverable area shape 906-4 is processed, without processing any image data corresponding to the footprint of the structures 904-1/904-2 or the portion 910 of the parcel that is not encompassed by a deliverable area shape 906.

Processing of the image data within each deliverable area shape may be performed using a variety of imaging processing techniques. For example, one or more convolutional neural networks ("CNN"), or other deep learning model, may be trained to process image data to determine if the deliverable area shape is clear and free of any objects, such as trees, bushes, tables, chairs, swimming pools, umbrellas, etc. Other processing techniques such as edge detection, object detection, etc., may likewise be used to determine if all or a portion of a deliverable area shape is clear and available for aerial item delivery.

In some implementations, a color histogram of the pixel values of pixels of the image data corresponding to a deliverable area shape may be determined and a probability generated based on that color histogram as to whether the area within the deliverable area shape is clear and available for aerial item delivery. For example, if the color histogram reveals a continuous color within the deliverable area shape that corresponds to a known color of grass or concrete, the deliverable area shape may be assigned a high deliverability score. In comparison, if the color histogram reveals numerous colors that correspond to colors typical of plants, bushes, flowers, etc., the deliverable area shape is assigned a low deliverability score.

Image statistics, such as color histograms, edge densities and directions, co-occurrence matrices, autocorrelation functions, etc., may likewise be used to determine a deliverability score for the image. Image statistics, like the color histogram, may be used to determine an overall availability of a deliverable area shape based on information about the image, such as pixel values, pixel variation, shadows, brightness, hue, etc.

In some implementations, a deliverability score for some or all of the deliverable area shapes may be computed. The deliverability score may be based on, for example, one or more of objects represented in the image data, image statistics, the color histogram of the image data corresponding to the deliverable area shape, a size of the deliverable area shape, a shape of the deliverable area shape, a topology of the portion of the parcel encompassed by the deliverable area shape, etc.

Returning to FIG. 9, processing of deliverable area shape 906-1 indicates that a portion of the deliverable area shape is covered with trees and thus, those portions are not available for aerial item delivery. In some implementations, the deliverable area shape 906-1 may be excluded from further consideration and the image data discarded. In other implementations, if a deliverable area shape is reduced in size, it may again be confirmed whether the reduced size still exceeds the delivery area threshold. If the reduced size does not exceed the delivery area threshold, the deliverable area shape may be removed from consideration. In still other implementations, as illustrated, a size and shape of the deliverable area shape may be reduced to encompass a smaller portion that is determined to be available for aerial item delivery and still above the delivery area threshold. In this example, the smaller portion 912 corresponds to a section of grass and a sidewalk.

Likewise, image data corresponding to deliverable area shapes 906-2, 906-3, and 906-4 may be processed. In the illustrated example, deliverable area shape 906-3 may be excluded from further consideration because the image data processing indicates that the portion of the parcel within the deliverable area shape 906-3 includes plants, trees, etc., as illustrated. In comparison, processing of the image data encompassed by deliverable area shape 906-2 indicates that a portion of that area is open and available for aerial item delivery. Likewise, image processing of the image data corresponding to deliverable area shape 906-4 indicates that the entire area is available for aerial item delivery.

In the illustrated example, deliverable area shape 906-4 may be assigned the highest rank or delivery score because the entire portion of the parcel that is encompassed within the deliverable area shape 906-4 is determined to be available for aerial item delivery. In comparison, deliverable area shape 906-3 may be assigned the lowest delivery score, or removed from consideration, because image processing determines that there is no portion within deliverable area shape 906-3 that is available for aerial item delivery. In some implementations, delivery scores for a deliverable area shape may be increased or decreased based on overlapping deliverable area shapes. For example, the delivery score for deliverable area shape 906-4 may be increased because of the overlap with a portion of deliverable area shape 906-2 that is determined to also be available for aerial item delivery. In comparison, the delivery score for deliverable area shape 906-1 and/or reduced area 912, may be reduced because of the determination that the portion of overlapping deliverable area shapes 906-2 and 906-3 are not available for aerial item delivery.

By ranking deliverable area shapes determined for a parcel, a delivery point within a highest ranked deliverable area shape may be assigned to an aerial vehicle as part of a delivery route and/or an aerial vehicle may be instructed to process the highest ranked deliverable area shape first to determine a delivery point. Likewise, one or more secondary delivery points within other deliverable area shapes associated with the parcel may also be selected and assigned as part of the delivery route in the event the primary delivery point is determined to be unavailable during an actual aerial item delivery to the parcel.

Figure 10:
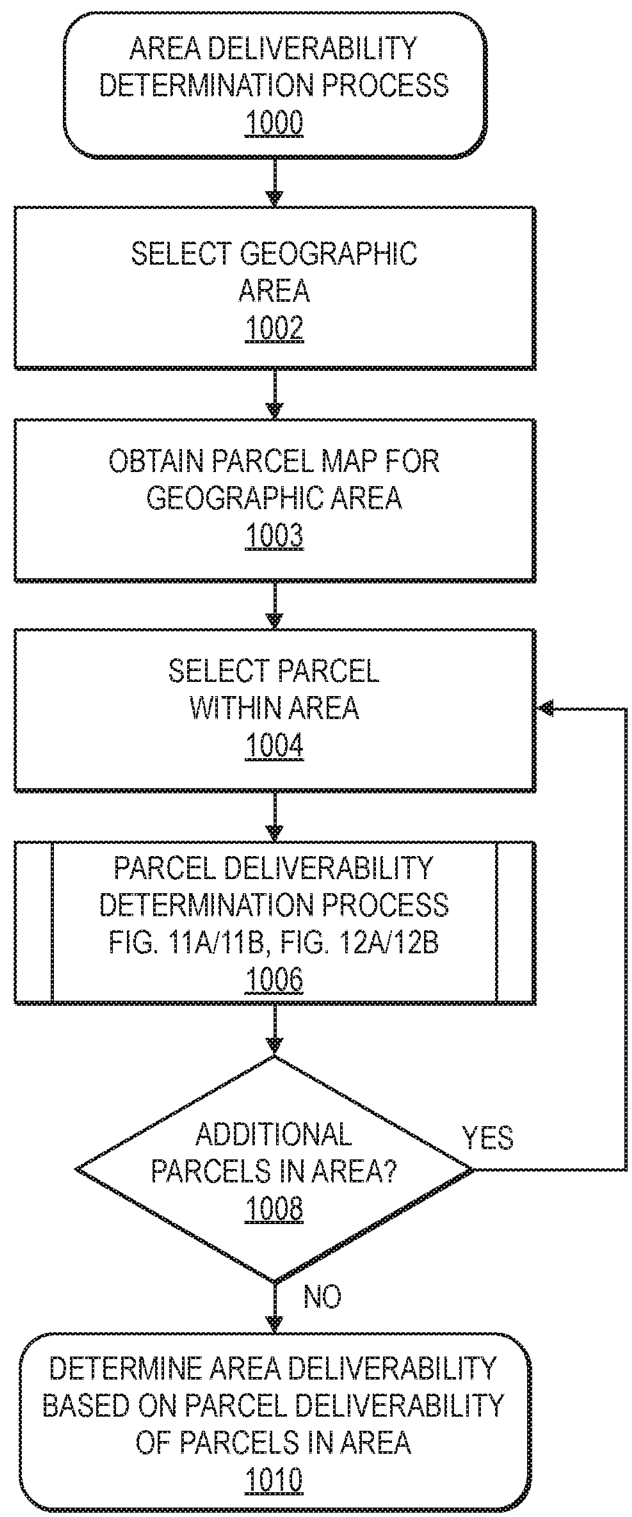
FIG. 10 is an example area deliverability determination process, in accordance with described implementations.

FIG. 10 is an example area deliverability determination process 1000, in accordance with described implementations.

The example process may be used for any size geographic area to determine the deliverability of parcels in that geographic area, without having to process any image data of the area. The example process 1000 begins by selecting a geographic area, as in 1002. The geographic area may be, for example, a neighborhood, a group of several neighborhoods, a city, a group of cities, a town, a group of towns, a geographical defined area (e.g., a fifty-mile radius), a state, etc.

A parcel map for the selected geographic area is then obtained, as in 1003. A parcel may be obtained from any source, such as a public source, that maintains parcel maps. For example, government bodies typically maintain parcel maps for different areas that are updated based on permits issued by that or other government entities. As discussed above, parcel maps include parcel boundary information and outlines or footprints of structures (e.g., homes, buildings, sheds, swimming pools, etc.) on those parcels. The parcel and each structure is some form of a polygon and quantifiable by latitude and longitude coordinates (or any other projection/coordinate frame). Likewise, in some implementations, the parcel maps may indicate access points into and/or out of the structures at the parcel. Access points may include doorways, garage, etc.

The example process 1000 then selects a parcel from the plurality of parcels included in parcel map, as in 1004. A parcel may be selected at random, in a sequential order, etc. For the selected parcel, the parcel deliverability determination process is performed, as in 1006. Example parcel deliverability determination processes are discussed further below with respect to FIGS. 11A, 11B, 12A, and 12B. The result of the parcel deliverability determination process is an indication as to whether the parcel is available for aerial item delivery and optionally a parcel deliverability score for the parcel. The parcel deliverability score indicates an overall confidence that the parcel is available for aerial item delivery. The parcel deliverability score may be determined based on, for example, deliverable area shape, scores for deliverable area shapes associated with the parcel, the size, shape, and/or number of deliverable area shapes that are indicated as available for aerial item delivery and associated with the parcel, etc.

A determination is then made as to whether additional parcels in the selected geographic area remain that are to be processed by the example process 1000, as in 1008. If additional parcels remain, the example process 1000 returns to block 1004 and continues by selecting a next parcel. If no additional parcels remain, the example process 1000 determines an area deliverability or area score based on the determined parcel deliverability of parcels in the area, as in 1010. The area deliverability may be any form of indicator as to the availability of parcels within the geographic area to receive aerial item delivery. For example, the area deliverability may be a percentage of parcels that are available for aerial item delivery out of all the parcels within the geographic area. As another example, the area deliverability may be a ratio between the parcels determined to be available for aerial item delivery and parcels not available for aerial item delivery, or total parcels. In still other examples, the area deliverability may be a raw number of parcels determined to be available for aerial item delivery. In still other examples, the area deliverability may be a weighted sum of the parcel deliverability scores of parcels within the area.

Figure 11A:
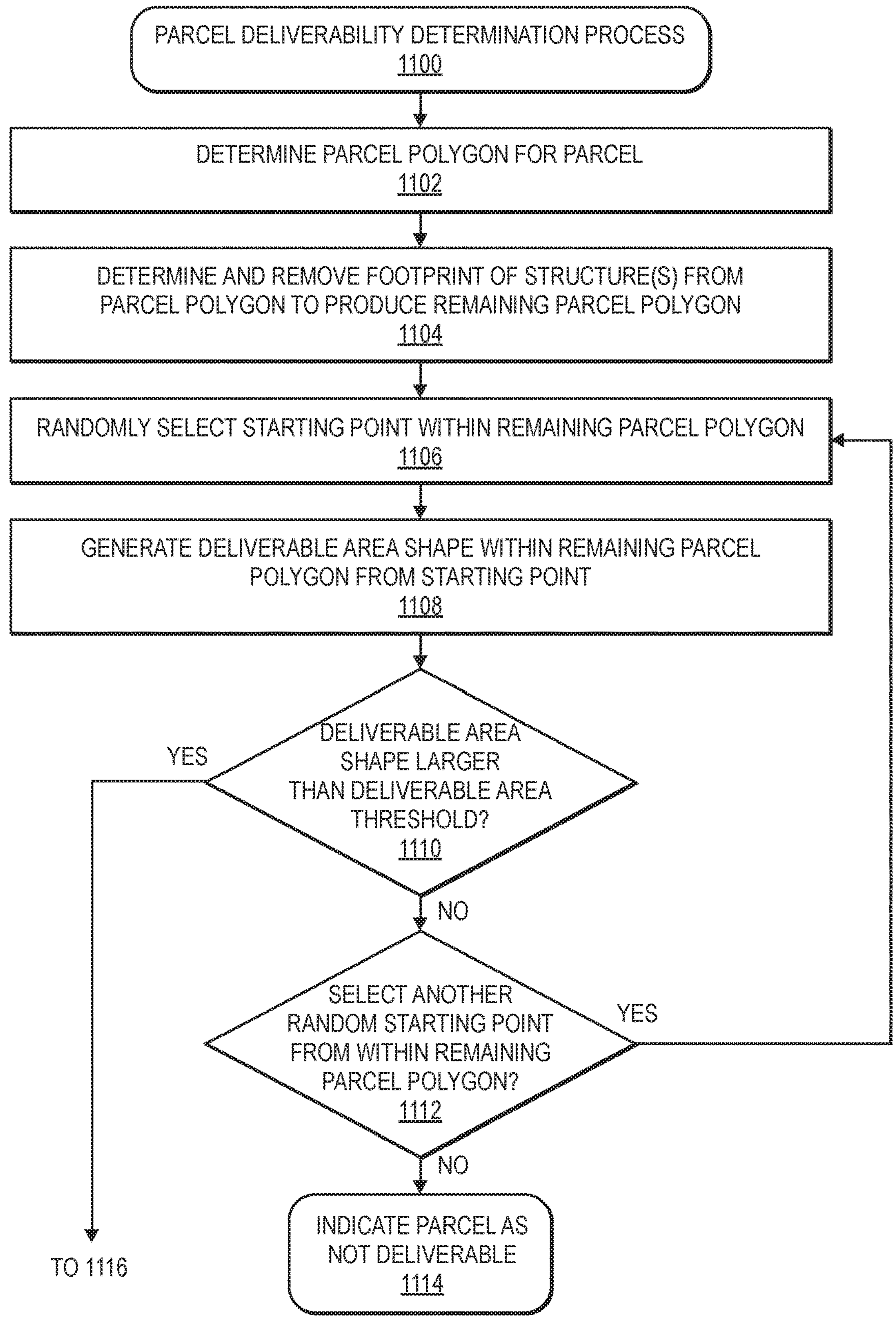
FIGS. 11A and 11B are an example parcel deliverability determination process, in accordance with described implementations.
Figure 11B:
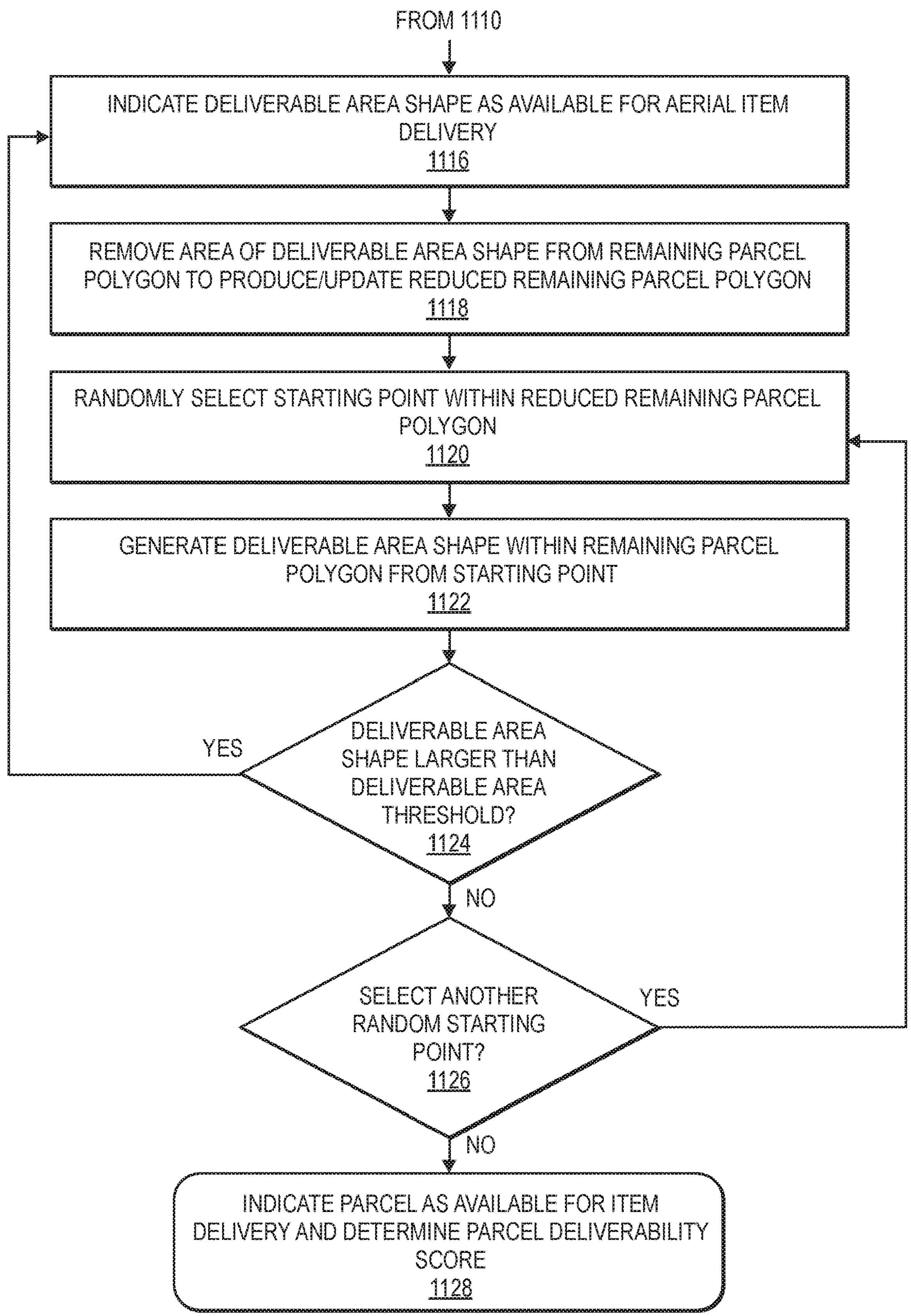

FIGS. 11A and 11B are an example parcel deliverability determination process 1100, in accordance with described implementations.

The example process 1100 begins in FIG. 11A by determining a parcel polygon for a parcel, as in 1102. As noted above, parcel maps typically include latitude and longitude (or other projection/coordinate frame) for parcel boundaries. Utilizing the parcel map, a parcel polygon representative of the shape and size of the parcel may be generated. FIG. 2 is an illustration of an example parcel polygon.

In addition to generating a parcel polygon for the parcel, the outline or footprint of structures on the parcel are determined and the area of the parcel corresponding to those footprints removed from the parcel polygon to produce a remaining parcel polygon, as in 1104. Again, the footprint or outline of structures at the parcel may be obtained from the parcel map. FIG. 3 is an example remaining parcel polygon in which the portion of the area of the parcel polygon corresponding to the footprint of the structure is removed.

In this example, a starting point within the remaining parcel polygon is randomly selected, as in 1106. While the disclosed implementation discusses random selection, in other implementations the starting point may be at a defined position, e.g., top left quadrant of the remaining parcel polygon. Alternatively, the example process 1100 may determine a largest area of the parcel polygon that is not encumbered or encroached by the footprint of the structure and select a starting point within that area. Other techniques may likewise be utilized to select a starting point.

From the selected starting point, a deliverable area shape is formed within the remaining parcel polygon that is as large as possible without expanding beyond the parcel polygon or encroaching on the portion of the area corresponding to the footprint of the structure that was removed, as in 1108. As discussed above, any shape may be used as the deliverable area shape including, but not limited to, rectangles, squares, circles, ellipses, etc. In some examples, the deliverable area shape is formed in compliance with constraints that specify that the deliverable area shape must contact at least one edge or perimeter of the parcel polygon and at least one edge or perimeter of the portion of the area corresponding to the footprint of the structure that was removed but must not expand beyond the perimeter of the parcel polygon or encroach on the portion of area corresponding to the footprint of the structure(s) that was removed from the remaining parcel polygon.

Upon forming the deliverable area shape, a determination is made as to whether the deliverable area shape, or an area of the parcel polygon encompassed by the deliverable area shape, is larger than a deliverable area threshold, as in 1110. The deliverable area threshold may be any size or area indicator and may be different for different geographic areas, different parcels, etc. In some implementations, the deliverable area threshold may be a polygon that is at least two meters by two meters. In other implementations, the deliverability are threshold may be different.

If it is determined that the deliverable area shape is not larger than the deliverable area threshold, a determination is made as to whether another starting point is to be selected, as in 1112. In some implementations, the example process 1100 may attempt to produce deliverable area shapes from multiple starting points if the initial deliverable area shape does not exceed the deliverable area threshold. If it is determined that another starting point is to be selected, the example process returns to block 1106 and continues. However, if it is determined that another starting point is not to be selected, the example process 1100 completes and the parcel is indicated as not available for aerial item delivery, as in 1114.

Returning to decision block 1110 if it is determined that the deliverable area shape is larger than the deliverable area threshold, the example process 1100 continues to FIG. 11B and the deliverable area shape is indicated as available for aerial item delivery, as in 1116. For example, the area or coordinates of the remaining parcel polygon corresponding to the deliverable area shape may be indicated in a datastore as available for aerial item delivery.

In addition to indicating the deliverable area shape as available for aerial item delivery, if one has not yet been produced for the parcel polygon, a reduced remaining parcel polygon is generated from the remaining parcel polygon by removing the area of the remaining parcel polygon that corresponds to the deliverable area shape, as in 1118. The reduced remaining parcel polygon is the parcel polygon with the portion of the area of the parcel polygon corresponding to the footprint of the structures at the parcel removed and any portions of the area already encompassed by a deliverable area shape determined by the example process 1100 to be available for aerial item delivery removed. The reduced remaining parcel polygon may be updated each time an additional deliverable area shape is determined to be available for aerial item delivery. In comparison, the remaining parcel polygon, as noted above, is the parcel polygon with the portion of the area of the parcel polygon corresponding to the footprint of structures at the parcel removed.

Another starting point is then selected, for example randomly selected, from within the area included in the reduced remaining parcel polygon, as in 1120. By limiting the selection of a starting point to the area included in the reduced remaining parcel polygon ensures that different starting points are selected and that all portions of the parcel are eventually processed and considered for determining availability of the parcel for aerial item delivery.

Upon selecting the next starting point, a deliverable area shape is generated from the starting point that remains within the area of the remaining parcel polygon, as in 1122. It is worth noting here, that in the example process 1100, while the starting point is selected from the area included in the reduced remaining parcel polygon, the deliverable area shape formed from that starting point is with respect to the area included in the remaining parcel polygon. As a result, while the formed deliverable area shape may conform to the constraints of not expanding beyond the parcel polygon or encroaching on the portion of the area corresponding to the footprint of the structure, the deliverable area shape may overlap a portion of the area already encompassed by another deliverable area shape already formed for the parcel—i.e., deliverable area shapes for a parcel may overlap.

After forming the deliverable area shape, a determination is made as to whether the deliverable area shape, or a portion of the area of the parcel polygon encompassed by the deliverable area shape, is larger than the deliverable area threshold, as in 1124. If it is determined that the deliverable area shape is larger than the deliverable area threshold, the example process 1100 returns to block 1116 and continues.

However, if it is determined that the deliverable area shape is not larger than the deliverable area threshold, a determination is made as to whether another starting point is to be selected, as in 1126. In some implementations, the example process may attempt to produce deliverable area shapes from multiple starting points if the formed deliverable area shape does not exceed the deliverable area threshold. If it is determined that another starting point is to be selected, the example process 1100 returns to block 1120 and continues. If it is determined that another starting point is not to be selected, the example process 1100 completes and the parcel is indicated as available for aerial item deliverability and optionally a parcel deliverability score may be determined, as in 1128. The parcel is indicated as available for aerial item delivery because at least one deliverable area shape was determined to be larger than the deliverable area threshold and indicated as available aerial item delivery.

The parcel deliverability score is an indication as to the confidence that the parcel is available for aerial item delivery. For example, the parcel deliverability score may be any indication as to a percentage or amount of the parcel polygon that is encompassed by one or more deliverable area shapes and determined to be available for aerial item delivery. For example, if 50% of the area of the parcel polygon corresponds to the footprint of the structure, 20% of the area parcel polygon is determined to not be of a size large enough to be considered available for aerial item delivery (e.g., the deliverable area shape did not exceed the deliverable area threshold), and 30% of the area of the parcel polygon is determined to be available for aerial item delivery, the deliverability score may be 30%. In other implementations, the deliverability score may factor in or consider one or more of the size of the area of the parcel polygon that is determined to be available for aerial item delivery, the size of the largest deliverable area shape determined to be available for aerial item delivery, the number of deliverable area shapes determined to be available aerial item delivery, etc.

Figure 12A:
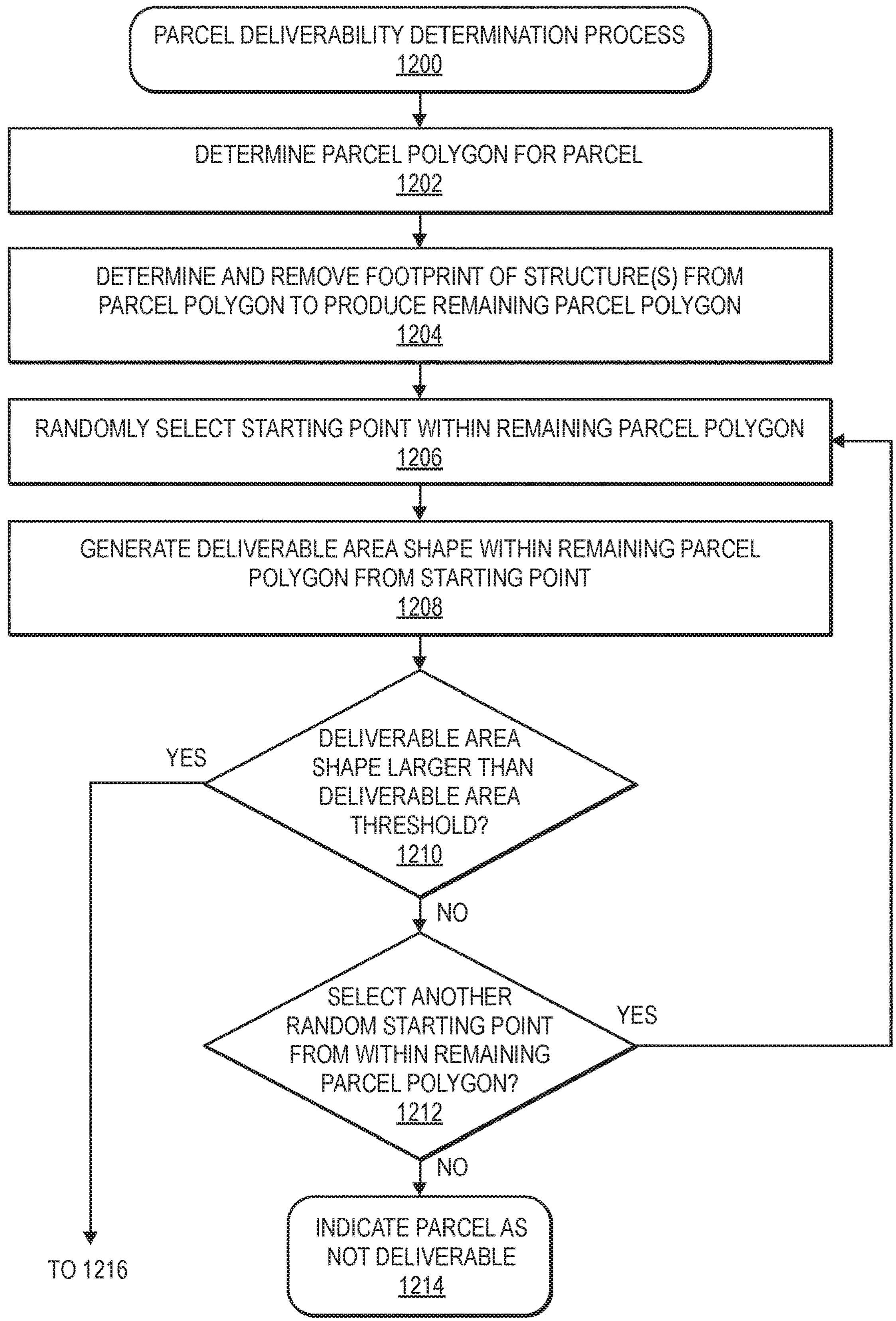
FIGS. 12A and 12B are an example parcel deliverability determination process, in accordance with described implementations.
Figure 12B:
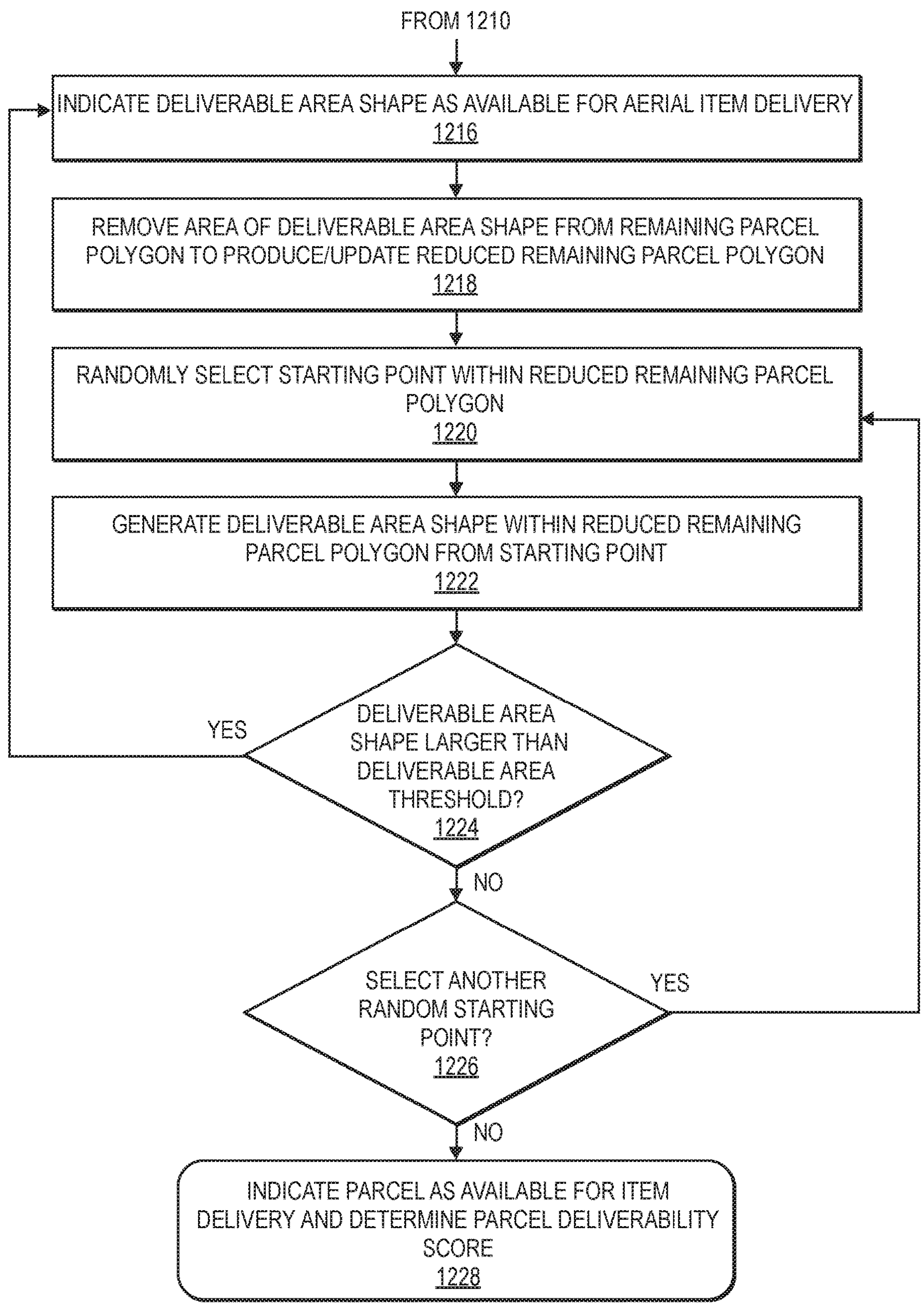

FIGS. 12A and 12B are an example parcel deliverability determination process, in accordance with described implementations.

The example process 1200 begins in FIG. 12A by determining a parcel polygon for a parcel, as in 1202. As noted above, parcel maps typically include latitude and longitude (or other projection/coordinate frame, such as UTM, MGRS, or WGS84) for parcel boundaries. Utilizing the parcel map, a parcel polygon representative of the shape and size of the parcel may be generated. FIG. 2 is an illustration of an example parcel polygon.

In addition to generating a parcel polygon for the parcel, the outline or footprint of structures on the parcel are determined and the area of the parcel corresponding to those footprints removed from the parcel polygon to produce a remaining parcel polygon, as in 1204. Again, the footprint or outline of structures at the parcel may be obtained from the parcel map. FIG. 3 is an example remaining parcel polygon in which the portion of the area of the parcel polygon corresponding to the footprint of the structure is removed.

In this example, a starting point within the remaining parcel polygon is randomly selected, as in 1206. While the disclosed implementation discusses random selection, in other implementations the starting point may be at a defined position, e.g., top left quadrant of the remaining parcel polygon, selected based on a tessellation scheme, e.g., centroids of cells from Voronoi tessellation of the parcel polygon, etc. Alternatively, the example process 1200 may determine a largest area of the parcel polygon that is not encumbered or encroached by the footprint of the structure and select a starting point within that area. Other techniques may likewise be utilized to select a starting point.

From the selected starting point, a deliverable area shape is formed within the remaining parcel polygon that is as large as possible without expanding beyond the parcel polygon or encroaching on the portion of the area corresponding to the footprint of the structure that was removed, as in 1208. As discussed above, any shape may be used as the deliverable area shape including, but not limited to, rectangles, squares, circles, ellipses, etc. In some examples, the deliverable area shape is formed in compliance with constraints that specify that the deliverable area shape must contact at least one edge or perimeter of the parcel polygon and at least one edge or perimeter of the portion of the area corresponding to the footprint of the structure that was removed but must not expand beyond the perimeter of the parcel polygon or encroach on the portion of area corresponding to the footprint of the structure(s) that was removed from the remaining parcel polygon.

Upon forming the deliverable area shape, a determination is made as to whether the deliverable area shape, or an area of the parcel polygon encompassed by the deliverable area shape, is larger than a deliverable area threshold, as in 1210. The deliverable area threshold may be any size or area indicator and may be different for different geographic areas, different parcels, etc. In some implementations, the deliverable area threshold may be a polygon that is at least two meters by two meters. In other implementations, the deliverable area threshold may be different.

If it is determined that the deliverable area shape is not larger than the deliverable area threshold, a determination is made as to whether another starting point is to be selected, as in 1212. In some implementations, the example process 1200 may attempt to produce deliverable area shapes from multiple starting points if the initial deliverable area shape does not exceed the deliverable area threshold. If it is determined that another starting point is to be selected, the example process returns to block 1206 and continues. However, if it is determined that another starting point is not to be selected, the example process 1200 completes and the parcel is indicated as not available for aerial item delivery, as in 1214.

Returning to decision block 1210 if it is determined that the deliverable area shape is larger than the deliverable area threshold, the example process 1200 continues to FIG. 12B and the deliverable area shape is indicated as available for aerial item delivery, as in 1216. For example, the area or coordinates of the remaining parcel polygon corresponding to the deliverable area shape may be indicated in a datastore as available for aerial item delivery.

In addition to indicating the deliverable area shape as available for aerial item delivery, if one has not yet been produced for the parcel polygon, a reduced remaining parcel polygon is generated from the remaining parcel polygon by removing the area of the remaining parcel polygon that corresponds to the deliverable area shape, as in 1218. The reduced remaining parcel polygon is the parcel polygon with the portion of the area of the parcel polygon corresponding to the footprint of the structures at the parcel removed and any portions of the area already encompassed by a deliverable area shape determined by the example process 1200 to be available for aerial item delivery removed. The reduced remaining parcel polygon may be updated each time an additional deliverable area shape is determined to be available for aerial item delivery. In comparison, the remaining parcel polygon, as noted above, is the parcel polygon with the portion of the area of the parcel polygon corresponding to the footprint of structures at the parcel removed.

Another starting point is then selected, for example randomly selected, from within the area included in the reduced remaining parcel polygon, as in 1220. By limiting the selection of a starting point to the area included in the reduced remaining parcel polygon ensures that different starting points are selected and that all portions of the parcel are eventually processed and considered for determining availability of the parcel for aerial item delivery.

Upon selecting the next starting point, a deliverable area shape is generated from the starting point that remains within the area of the reduced remaining parcel polygon, as in 1222. In comparison to the example process 1100 discussed with respect to FIGS. 11A through 11B, the example process 1200 limits the deliverable area shape to the area included in the reduced remaining parcel polygon. As a result, the formed deliverable area shape will conform to the constraints of not expanding beyond the parcel polygon or encroaching on the portion of the area corresponding to the footprint of the structure and will not overlap any other already formed deliverable area shape or encompass any portion of the area of the parcel already encompassed by another deliverable area shape—i.e., deliverable area shapes for a parcel do not overlap.

After forming the deliverable area shape, a determination is made as to whether the deliverable area shape, or a portion of the area of the parcel polygon encompassed by the deliverable area shape, is larger than the deliverable area threshold, as in 1224. If it is determined that the deliverable area shape is larger than the deliverable area threshold, the example process 1200 returns to block 1216 and continues.

However, if it is determined that the deliverable area shape is not larger than the deliverable area threshold, a determination is made as to whether another starting point is to be selected, as in 1226. In some implementations, the example process may attempt to produce deliverable area shapes from multiple starting points if the formed deliverable area shape does not exceed the deliverable area threshold. If it is determined that another starting point is to be selected, the example process 1200 returns to block 1220 and continues. If it is determined that another starting point is not to be selected, the example process 1200 completes and the parcel is indicated as available for aerial item deliverability and optionally a parcel deliverability score may be determined, as in 1228. The parcel is indicated as available for aerial item delivery because at least one deliverable area shape was determined to be larger than the deliverable area threshold and indicated as available aerial item delivery.

The parcel deliverability score may be any indication as to a percentage or amount of the parcel polygon that is encompassed by one or more deliverable area shapes and determined to be available for aerial item delivery. For example, if 50% of the area of the parcel polygon corresponds to the footprint of the structure, 20% of the area parcel polygon is determined to not be of a size large enough to be considered available for aerial item delivery (e.g., the deliverable area shape did not exceed the deliverable area threshold), and 30% of the area of the parcel polygon is determined to be available for aerial item delivery, the deliverability score may be 30%. In other implementations, the deliverability score may factor in or consider one or more of the size of the area of the parcel polygon that is determined to be available for aerial item delivery, the size of the largest deliverable area shape determined to be available for aerial item delivery, the number of deliverable area shapes determined to be available aerial item delivery, etc.

Figure 13:
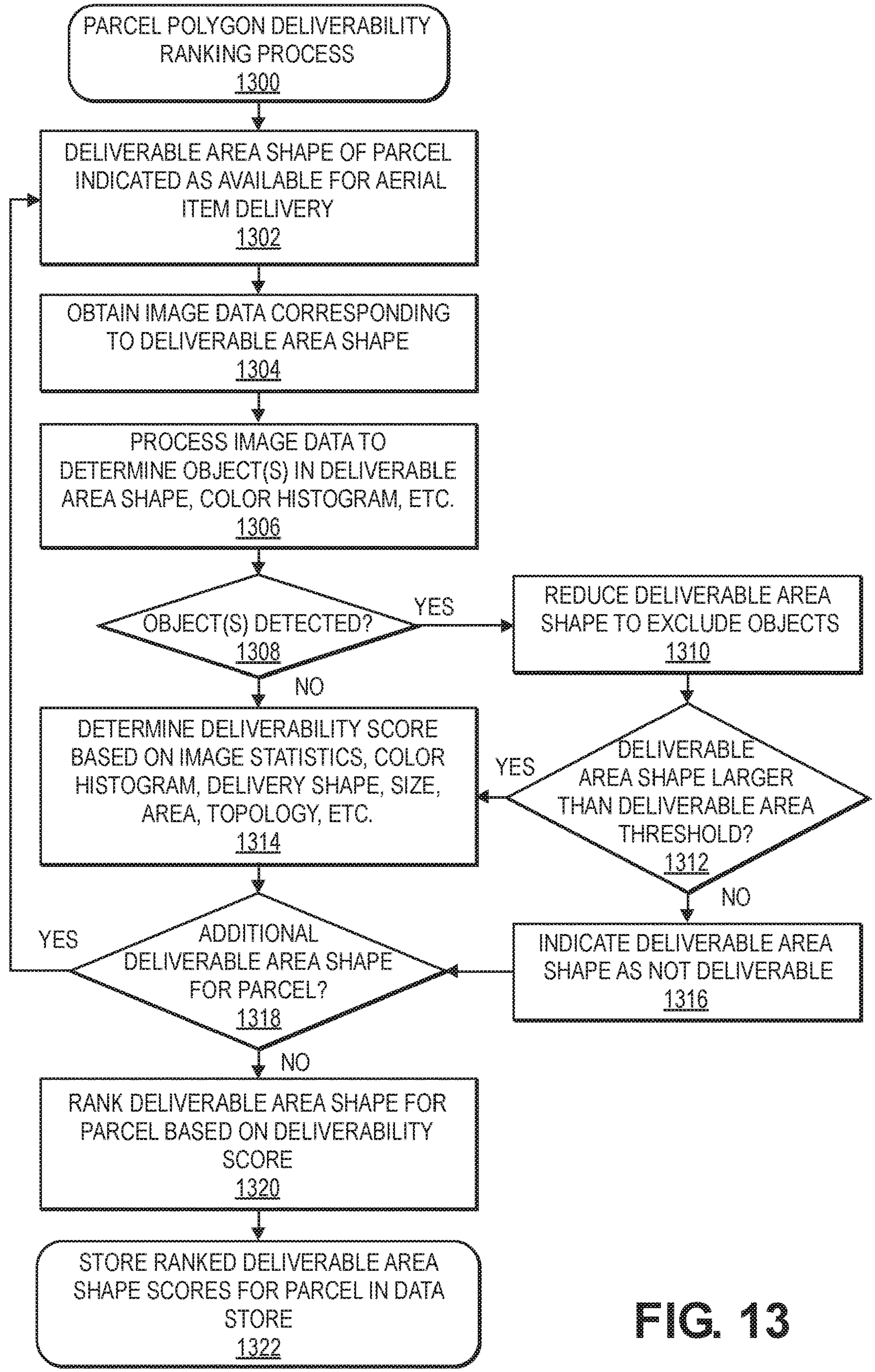
FIG. 13 is an example parcel polygon deliverability ranking process, in accordance with described implementations.

FIG. 13 is an example parcel polygon deliverability ranking process 1300, in accordance with described implementations.

The example process 1300 begins by selecting a deliverable area shape of a parcel that has been indicated as available for aerial item delivery, as in 1302. Image data corresponding to the area of the parcel encompassed by the deliverable area shape is also obtained, as in 1304. Image data for a parcel may be obtained from image data generated by one or more UAS, satellite imagery data, image data generated from other aerial vehicles, etc. In some implementations, image data that includes the entire parcel may be obtained and the portion of the parcel encompassed by the deliverable area shape extracted as part of the example process 1300.

The image data corresponding to the area of the parcel that is encompassed by the deliverable area shape is then processed to determine any objects present in the image data, a color histogram of the image data, etc., as in 1306. Processing of the image data may be performed using a variety of image processing techniques. For example, one or more CNNs, or other deep learning model, may be trained to process image data to determine if the deliverable area shape is clear and free of any objects, such as trees, bushes, tables, chairs, swimming pools, umbrellas, etc. Other processing techniques such as edge detection, object detection, etc., may likewise be used to determine if all or a portion of a deliverable area shape is clean and available for aerial item delivery. Likewise, a color histogram of the pixel values of pixels of the image data corresponding to a deliverable area shape may be determined.

A determination is then made as to whether any objects (e.g., trees, buildings, bushes, swimming pools, etc.) were detected in the image data corresponding to the deliverable area shape, as in 1308. If it is determined that one or more objects are detected, the deliverable area shape may be reduced in size to exclude from the deliverable area shape the portion that is determined to include one or more objects, as in 1310. If the deliverable area shape is reduced in size, a determination may again be made as to whether the reduced size deliverable area shape still exceeds the deliverable area threshold, as in 1312. If it is determined that the reduced size deliverable area shape does not exceed the deliverable area threshold, the deliverable area shape is indicated as not available for aerial item delivery (e.g., not deliverable), as in 1316. In some implementations, if a portion of the deliverable area shape is determined to include objects, rather than reducing the deliverable area shape, the deliverable area shape may be indicated as not deliverable.

If it is determined in decision block 1312 that the reduced size deliverable area shape is larger than the deliverable area threshold, or if it determined in decision block 1308 that no objects were detected in the deliverable area shape, a deliverability score for the deliverable area shape is determined, as in 1314. The deliverability score indicates a likelihood or probability to successfully determining a delivery point within the deliverable area shape and completing an actual aerial item delivery of an item to that delivery point in the deliverable area shape.

The deliverability score may be based on, for example, one or more of image statistics, the color histogram of the deliverable area shape, the shape of the deliverable area shape, the size of the deliverable area shape, a topology of the surface of the portion of the parcel encompassed by the deliverable area shape, etc. For example, the color histogram may be processed to determine a probability of the deliverable area shape being deliverable. In some implementations, different color histograms may be indicated as indicative of open and clear areas, such as lawns, driveways, patios, porches, etc., to which aerial item delivery may be successfully completed. The probability of the color histogram may be combined with dimension or size information of the deliverable area shape to determine an overall deliverability score.

Upon generating a deliverability score for the deliverable area shape in block 1314, or if it is determined in block 1316 that the deliverable area shape is not available for aerial item delivery, a determination is made as to whether additional deliverable area shapes that are indicated as available for aerial item delivery exist for the parcel, as in 1318. If additional deliverable area shapes remain, the example process 1300 returns to block 1302 and continues. If it is determined that there are no additional deliverable area shapes for the parcel, the deliverable area shapes are ranked based on the determined deliverability scores, as in 1320, and the ranked deliverable area shapes with the ranked deliverability scores are stored in a data store, as in 1322. Ranked deliverable area shapes may be used, for example, in route and item delivery planning and/or during item delivery to prioritize different portions of a parcel for aerial item delivery of an item to that parcel. For example, as discussed further below with respect to FIG. 20, an aerial vehicle may first determine or receive a delivery point that is within a highest ranked deliverable area shape of the parcel as a first priority for the aerial item delivery. If, during an attempted aerial item delivery, the aerial vehicle is not able to aerially deliver the item to the delivery point in the first deliverable area shape, the aerial vehicle may query the ranked list to select a next highest ranked deliverable area shape for aerial item delivery. This may continue until the item is successfully delivered or it is determined that there are no portions of the parcel to which aerial item delivery can be accomplished.

Figure 14A:
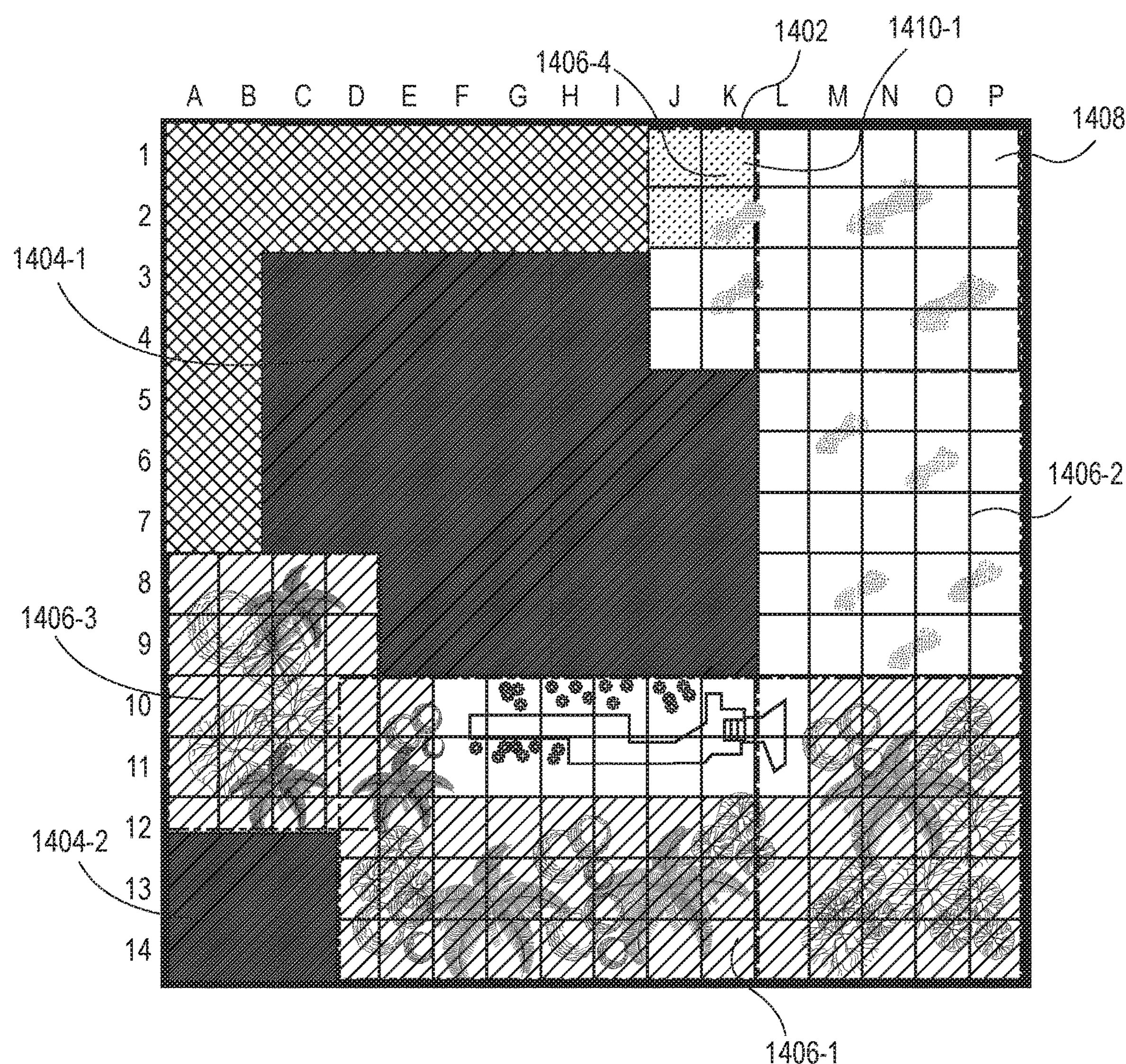
FIGS. 14A, 14B, and 14C is an example image of a parcel and processing of the image to determine delivery points, in accordance with described implementations.
Figure 14B:
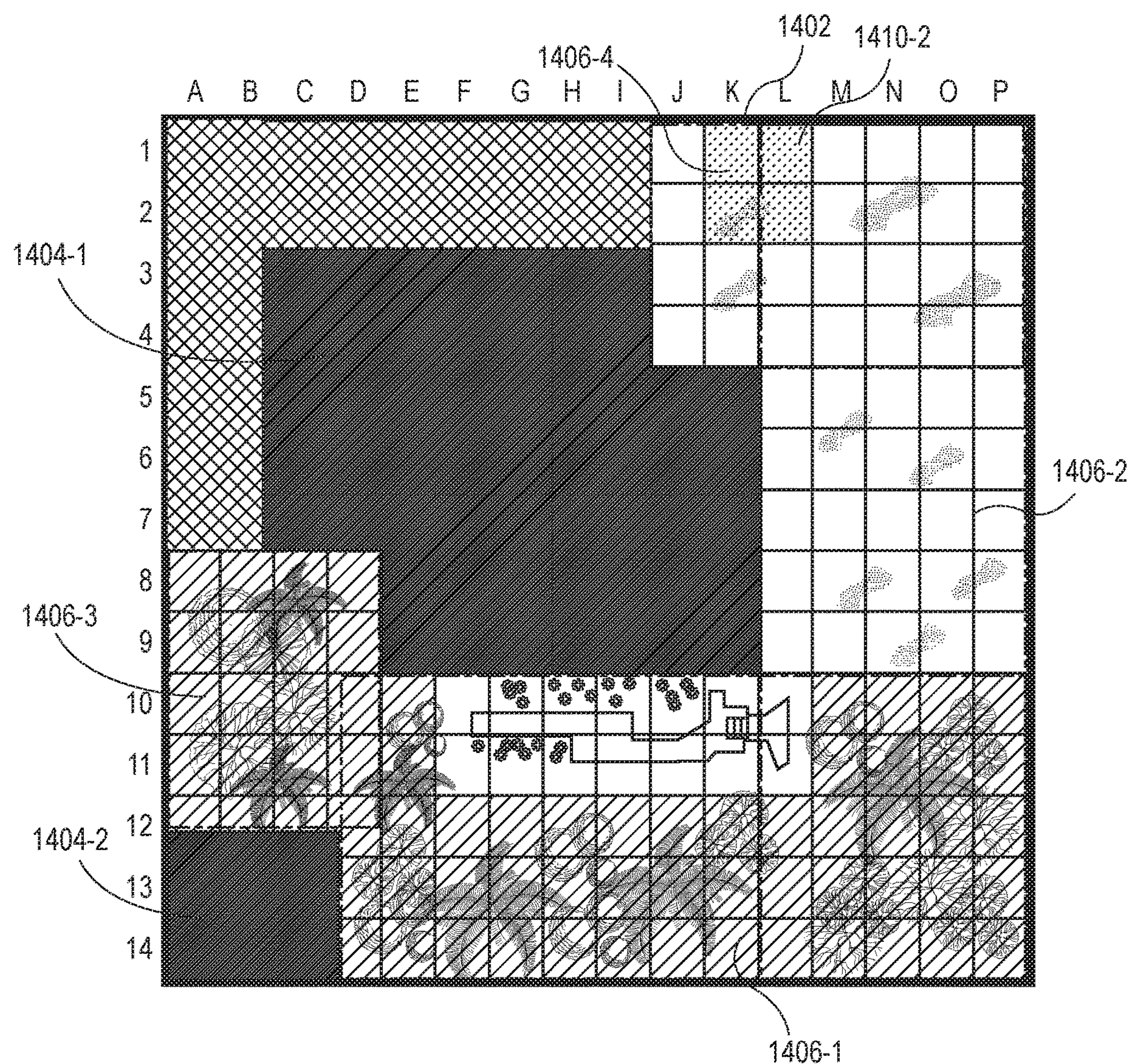
Figure 14C:
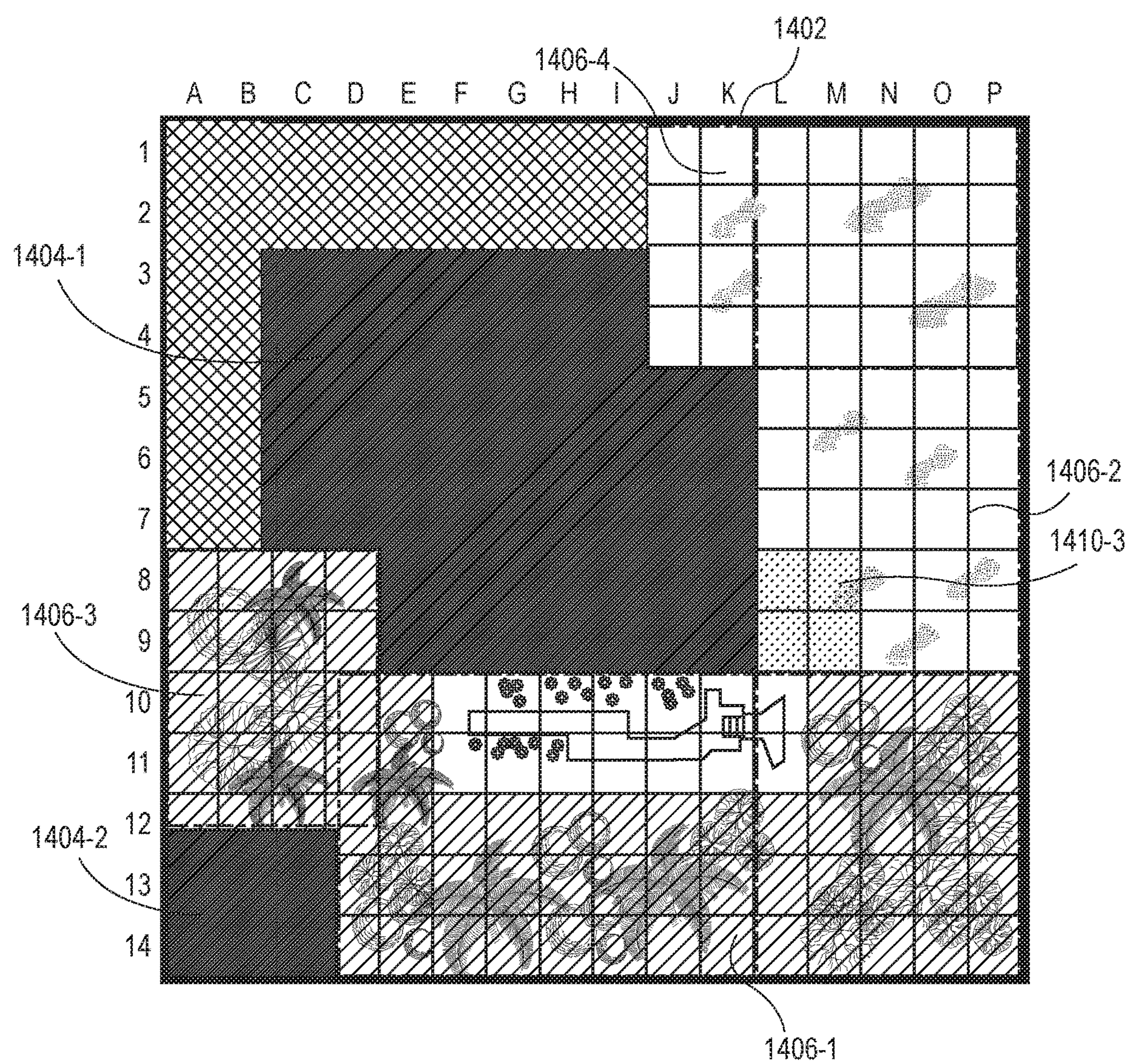

FIGS. 14A, 14B, and 14C is an example image of a parcel and processing of the image to determine delivery points, in accordance with described implementations.

The parcel 1402 corresponds to the parcel 902 discussed above with respect to FIG. 9. As illustrated, the deliverable area shape or shapes 1406-1, 1406-2, 1406-3, 1406-4 determined for a parcel 1402, as discussed above, may be further segregated into cells 1408 or other grid like pattern for further processing. Likewise, non-deliverable portions of the parcel, such as structures 1404-1, 1404-2, may be excluded from processing.

The cells 1408 of the delivery area shapes may be processed to determine valid delivery points within the parcel at which an aerial vehicle may aerially deliver an item to the parcel. The delivery points may be processed to initially determine if the delivery point is at least a defined size associated with the aerial vehicle and clear of obstacles that may prohibit delivery of an item to the delivery point by the aerial vehicle. For example, a defined size may be two-meters by two-meters and each delivery point considered may be two-meters by two-meters. In some implementations, the deliverable areas may be segmented into cells that are the defined size corresponding to the aerial vehicle and each cell processed to determine if it qualifies as a valid delivery point. In other implementations, the delivery areas may be segmented into cells that are smaller than the defined size and groups of cells processed to determine valid delivery points. In such an implementation, groups of cells may overlap such that each cell is processed with more than one delivery point.

Determination as to whether a delivery point is a valid delivery point may include processing one or more of parcel data corresponding to the parcel, image data of the parcel (e.g., satellite, images from other aerial vehicles, etc.), topology maps for the parcel, water maps for the parcel, electrical/telephone line maps for the parcel, sensor data collected from aerial vehicles during prior deliveries to the parcel, sensor data collected/received from sensors at the parcels during prior deliveries, etc. Processing may be performed, for example, using one or more deep learning networks, such as a convolutional neural network ("CNN"), that is trained to process parcel related data to determine criteria scores and/or suitability scores, as discussed herein. As discussed further below, processing of information related to a parcel may initially be performed to determine valid delivery points to which an item may be aerially delivered. Determining if a delivery point is a valid delivery point includes determining that the delivery point is at least the minimum size, the probability that the delivery point will be clear and available for an aerial item delivery, the reachability of the delivery point by an aerial vehicle, and the distance of the delivery point from invalid delivery points at the parcel.

For example, referring to FIG. 14A, cells J1, K1, J2, and K2 (J1:K2) 1410-1 together may equate to the defined size for an aerial vehicle and processed together to determine if the area of the parcels represented by cells J1:K2 1410-1 are a valid delivery point for aerial delivery of an item by an aerial vehicle. Processing may include image processing of image data of that portion of the parcel to determine a probability that the delivery point is clear of objects, substantially flat, etc. For example, a color histogram of the pixel values of pixels of the image data corresponding to the cells J1:K2 may be determined and a probability generated based on that color histogram as to whether the area represented by those cells is clear and available for aerial item delivery. For example, if the color histogram reveals a continuous color within the cells that corresponds to a known color of grass or concrete, the delivery point may be assigned a high probability clear score. In comparison, if the color histogram reveals numerous colors that correspond to colors typical of plants, bushes, flowers, etc., the delivery point is assigned a low probability clear score.

The information about the parcel may be further processed for the delivery point corresponding to cells J1:K2 to determine the reachability of the delivery point by an aerial vehicle. For example, image data, electrical/telephone line maps, topology maps, etc., may be processed to determine if there are obstacles (e.g., trees, bushes, power lines, telephone lines, etc.) that may make navigation by the aerial vehicle to the delivery point difficult. Based on this additional processing, a reachability score may be determined for the delivery point.

Still further, the information about the parcel may also be processed to determine the distance of the delivery point, in this example the delivery point represented by cells J1:K2, to other invalid delivery points corresponding to the parcel. Invalid delivery points may be determined using the disclosed implementations and the distance from invalid delivery points score for each delivery point updated when another delivery point at the location is determined to be invalid.

Based on the probability clear score, reachability score, and distance from invalid delivery points score determined for a delivery point, a valid delivery point score may be computed and a determination made as to whether the delivery point is a valid delivery point or an invalid delivery point. For example, if any of the scores for probability clear, reachability, or distance from invalid delivery points is below a defined minimum individual threshold, which may be different for each criteria score, the delivery point may be indicated as an invalid delivery point. As another example, if a valid delivery point score determined for the delivery point is below a combined minimum threshold, the delivery point may be indicated as an invalid delivery point. As still another example, implementations may require that both the individual scores for probability clear score, reachability score, and distance from invalid delivery points score be above a respective minimum individual thresholds and that the resulting valid delivery point score be above a combined minimum threshold for the delivery point to be valid.

Referring now to FIG. 14B and continuing with the above example, once the first group of cells, J1:K2 1410-1 has been processed, a next group of cells, such as K1, L1, K2, L2 (K1:L2) 1410-2 may be processed to determine if that group of cells is a valid delivery point or an invalid delivery point. This processing of groups of cells may be done for each combination of cells that lie within a determined deliverable area of a parcel. Cells, or groups of cells that are determined to only correspond to invalid delivery points are removed from further consideration. For example, as illustrated in FIGS. 14A and 14B, based on the processing of data for delivery points it may be determined that cells A8, B8, C8, D8, A9, B9, C9, D9, A10, B10, C10, D10, E10, M10, N10, O10, P10, A11, B11, C11, D11, E11, M11, N11, O11, P11, and all cells in rows 12, 13, and 14 are invalid delivery points, as illustrated by the hatch marks in FIGS. 14A and 14B. In comparison, processing of cells or groups of cells may determine that cells J1 through P4 (J1:P4), L5 through P9 (L5:P9), and F10 through L11 (F10:L11) all correspond to one or more valid delivery points.

In some implementations, each valid delivery point may be assigned a suitability score that is determined based on one or more criteria. Criteria for determining suitability scores may be generally classified as either aerial vehicle route planning criteria or user criteria. Aerial vehicle route planning criteria may include, but is not limited to, a probability that a delivery point is clear during the delivery of the item by the aerial vehicle, a reachability of the delivery point by the aerial vehicle, and/or a distance of the delivery point to an invalid delivery point. User criteria may include, but is not limited to, a distance of the delivery point to a structure at the parcel (also referred to herein as access convenience), a noise of the aerial vehicle, or a downdraft disruption of a downdraft from the aerial vehicle. Each criterion may be determined based on the position of the valid delivery point within the parcel and with respect to objects within the parcel and/or adjacent the parcel. For example, the valid delivery point 1410-3 corresponding to cells L8, M8, L9, M9 (L8:M9) 1410-3, illustrated in FIG. 14C, may receive a high access convenience criteria score because it is close to the structure, or an access point of the structure and therefore items delivered at that valid delivery point are easily accessible by the user, and low criteria scores for distance from invalid delivery points and noise because the valid delivery point is both near invalid delivery points corresponding to cell M10 and close to the structure in which the user is located. In comparison, referring back to FIG. 14B, valid delivery point 1410-2 may receive a high criterion score for noise, as it is far from the structure but a low criterion score for access convenience because it is far from the structure and not easily accessible to the user. As will be appreciated, many criteria may be inversely proportional to one another, such as noise and distance, whereas other criteria score may be independent and determined based on the position of the valid delivery point—such as downdraft disruption. For example, processing of the valid delivery point corresponding to cells F10, G10, F11, G11 (F10:G11) may receive a low downdraft disruption score even though image processing shows that a portion of that delivery point is concreate because other portions correspond to a flowerbed that may be disrupted by the downdraft.

FIG. 15 is an example matrix of criteria scores determined for a plurality of delivery points, in accordance with described implementations. The matrix of criteria scores 1509 correspond to the parcel discussed above with respect to FIGS. 14A through 14C.

As discussed above, a valid delivery point ("VDP") score 1502-1 may be determined for each delivery point based on the determined probability clear ("PC") score 1502-2, reachability ("R") score 1502-3, and distance from invalid delivery point ("DDP") score 1502-4. For example, the VDP score 1502-1 for each delivery point may be computed as an average of each of the PC score, R score, and DDP score. In other implementations, one or more of the PC score, R score, or DDP score may be weighted to compute the VDP score 1502-1. For example, the following may be used to compute a VDP score for each delivery point within a parcel:

$$VDP_i = \frac{PC_i\omega_1 + R_i\omega_2 + DDP_i\omega_3}{i}$$

As noted above, for a delivery point to be considered a valid delivery point, in some implementations, the VDP score must be above a defined combined minimum threshold (e.g., 50%, 70%) and/or each of the PC score, R score, and DDP score must be above a respective individual minimum threshold.

For each delivery point that is determined to be a valid delivery point, criteria scores 1509 may be determined. In some implementations, each criteria score may be equally weighted and used to determine a suitability score ("SS") 1510. In other implementations, different weightings may be applied to some or all of the criteria scores when determining the suitability score for a valid delivery point. For example, the following aggregation may be performed to determine a suitability score:

$$SS_i = AC_i\omega_1 + N_i\omega_2 + DD_i\omega_3$$

where ω is the weight assigned to each different criterion, AC is an access convenience criteria 1502-5 to the delivery point, N is a noise criteria 1502-6, and DD is a downdraft disturbance criteria 1502-7. In other implementations, different techniques may be used to aggregate the criteria and determine a suitability score for each valid delivery point. Likewise, fewer, additional, and/or different criteria may be used in determining the suitability score for each valid delivery point.

In the illustrated matrix, all potential delivery points are indicated, both invalid delivery points, such as delivery points 1504-1 and 1504-N corresponding to cells A1:B2 and O13:P14, respectively, of the parcel illustrated in FIGS. 14A through 14C, and valid delivery points 1504-2, 1504-3, 1504-4 corresponding to cells J1:K2, K1:L2, and L8:M9, respectively, of the parcel illustrated in FIGS. 14A through 14C. In other implementations, the matrix 1509 may only include valid delivery points for the parcel.

As discussed above, criteria scores may be determined for each of a plurality of aerial vehicle navigation criteria 1511 and plurality of user criteria 1512. For example, aerial vehicle navigation criteria 1511 may include the probability clear criteria 1502-2, the reachability criteria 1502-3, and/or the distance from invalid delivery point criteria 1502-4. The aerial vehicle navigation criteria 1511 may then be used to compute a valid delivery point score 1502-1 to determine if the delivery point is a valid delivery point or an invalid delivery point. The user criteria 1512 may include the access convenience criteria 1502-5, the noise criteria 1502-6, and/or the downdraft disruption criteria 1502-7.

As discussed above, if the valid delivery point score 1502-1 is determined to be below a combined minimum threshold, in this example. 0.5, the delivery point is determined to be an invalid delivery point. If the valid delivery point score is above the combined minimum threshold, the delivery point is determined to a valid delivery point.

Referring to the matrix 1509, it is determined based on the valid delivery points scores, that delivery points 1504-1 and 1504-N are invalid delivery points (e.g., have VDP scores <0.5). As such, the user criteria may not need to be evaluated for those invalid delivery points. However, if the valid delivery point score 1502-1 is determined to be above the combined minimum threshold, as indicated in the matrix for delivery points 1504-2, 1504-3, 1504-4, the delivery point is determined to be a valid delivery point, the other criteria determined for the valid delivery point, and a suitability score 1510 determined for the valid delivery point.

The probability clear criteria 1502-2 is indicative of a probability that the valid delivery point will be clear and available for aerial delivery of an item. The probability clear criteria may be applicable for delivery points that are available for delivery during certain times but possibly not available at other times. For example, a delivery point that is on a rear patio of the structure on the parcel may have a probability clear criterion of 0.5 indicating that it is clear approximately fifty-percent of the time. For example, the patio may include furniture (e.g., tables, chairs, etc.) during the summer months such that the delivery point is not available for aerial delivery of an item during those times. However, during winter months, the furniture may be put away for storage and the delivery point available for aerial item delivery.

The reachability criteria 1502-3 is indicative of the reachability of the delivery point by the aerial vehicle. For example, if the aerial vehicle has to make several difficult maneuvers to avoid obstacles (e.g., trees, bushes, houses, telephone poles/lines, etc.) to navigate to the delivery point, the reachability criteria may receive a low criteria score. In comparison, if the delivery point can be reached by the aerial vehicle following a simple navigation path, the reachability criteria may receive a high criteria score.

The distance from invalid delivery point criteria 1502-4 is indicative of how close the delivery point is to an invalid delivery point. For example, referring to FIG. 14C, the delivery point corresponding to cells F10:G11 may receive a low criteria score for the distance from invalid delivery point criteria 1502-4 because the valid delivery point of cells F10:G11 are adjacent cells E10, E11, E12, F12, and G12, all of which correspond to invalid delivery points. In comparison, the delivery point corresponding to cells M5:N6 may receive a high invalid delivery point 1502-4 criteria score because cells M5:N6 are in an open area and not adjacent any invalid delivery points.

Based on the scores determined for the probability clear criteria, the reachability criteria, and the distance from invalid delivery points criteria, the valid delivery point score is determined and the delivery point specified as a valid delivery point or an invalid delivery point. If the delivery point is determined to be a valid delivery point, user criteria may be further evaluated.

For example, the access convenience 1502-5 criteria, which is a user criteria, corresponds to an access convenience of a delivered item at a valid delivery point for retrieval by the user. For example, valid delivery points near a structure on the parcel in which the user resides, or near an entry/exit of the structure will have a higher access convenience criteria score because an item delivered to that valid delivery point is easily accessible to the user. In comparison, a valid delivery point that is far from the structure, or far from an entry/exit of the structure, may receive a lower criteria score because it is not as convenient to the user to retrieve a delivered item from that valid delivery point.

The noise criteria 1502-6, which is inversely related to the access convenience criteria is indicative of a noise of the aerial vehicle as perceived by a user at the structure. Accordingly, the closer the valid delivery point is to the structure, or an indicated point within the structure, the lower the noise criteria score. In comparison, the noise criteria score will be higher the farther the valid delivery point is from the structure. In some implementations, the perceived noise and corresponding noise criteria score may be determined based on, for example, the material of the structure, surroundings near the valid delivery point that may amplify (e.g., concrete) or dampen (e.g., grass, trees, bushes) the noise. For example, two valid delivery points that are approximately the same distance to an entry/exit from the structure may receive different noise criteria scores depending on the objects at or around the valid delivery points. For example, if a first valid delivery point is ten feet from an entrance to the structure and the first valid delivery point is on concrete with no other objects between the first valid delivery point and the entrance to the structure, the first valid delivery point may receive a first criteria score. In comparison, if a second valid delivery point is also ten feet from the entrance to the structure but positioned on grass and there is a hedge bush between the second valid delivery point and the entrance to the structure, the second valid delivery point will receive a second criteria score that is higher than the first criteria score because the noise at the entrance to the structure will be lower due to the dampening provided by the grass and the hedge.

In some implementations, the data may be processed to determine potential noise disruption to not only the user at the parcel but noise to adjacent parcels. For example, determined noise propagation patterns from a valid delivery point that expand into an adjacent parcel, may receive a lower noise criteria score due to potential noise disruption to a neighboring parcel. In some implementations, the processing may also consider whether a structure of the neighbor parcel is included near the border or potentially impacted by the noise. In implementation in which adjacent parcels are considered, the noise criteria may be separated into both a parcel noise criteria/parcel noise criteria score and an adjacent parcel noise criteria/adjacent parcel criteria score. Alternatively, a single noise criteria/noise criteria score may be maintained that is representative of any potential noise impact resultant from an aerial delivery of an item to the valid delivery point.

The downdraft disruption criteria 1502-7 is indicative of potential disruption to the parcel that may occur from a downdraft of the aerial vehicle during a delivery of an item to a valid delivery point. If it is determined that objects at or near the valid delivery point may be disrupted by the downdraft of the aerial vehicle, the downdraft disruption criteria 1502-7 may receive a low criteria score. For example, if the valid delivery point is near a flowerbed or a table that may contain papers, food, glasses, etc., the downdraft disruption criteria score may be low for the valid delivery point as disruption to objects near that valid delivery point may occur during an aerial delivery of an item to that valid delivery point. In comparison, if it is determined that downdraft during a delivery of an item to a valid delivery point will not likely cause any disruption, the downdraft disruption criteria score may be high. For example, if the valid delivery point is in the middle of a driveway or yard with no nearby objects, the downdraft disruption score for that valid delivery point may be high.

As noted above, a suitability score 1510 may be determined for each valid delivery point based on an aggregation of each of the user criteria scores discussed above, as determined for that valid delivery point. In addition, in some implementations, some or all of the user criteria scores may be weighted to either increase or decrease the importance of that user criteria score with respect to other user criteria scores in determination of the suitability score for each valid delivery point for the parcel. Weightings may vary by parcel, by valid delivery area within a parcel, may be adjusted or specified by a user, etc. For example, as discussed further below, a user may indicate that a user criteria of downdraft disruption is more important than noise and, as a result of that indication, the weighting for the downdraft disruption criteria 1502-7 may be higher than a weighting for noise criteria 1502-6.

In the matrix illustrated in FIG. 15, the invalid delivery points 1504-1 and 1504-N corresponding to cells A1:B2 and O13:P14 of FIGS. 14A through 14C, respectively, both have VDP scores that are below a minimum combined threshold, in this example 0.5. The valid delivery point 1504-2 corresponding to cells J1:K2 of FIGS. 14A through 14C is determined to have a valid delivery point score of 0.9, which is above the minimum combined threshold, and is thus considered a valid delivery point. Further processing for the valid delivery points produces an access convenience criteria score of 0.5, a noise criteria score of 0.4, and a downdraft disruption criteria score of 0.6. Based on each of the user criteria scores determined for the valid delivery point 1504-

2, a suitability score 1510 for the valid delivery point is determined to be 4.4. As noted above, the suitability score for a valid delivery point may be aggregated using a variety of techniques including, but not limited to, summing of the user criteria scores, averaging of the user criteria scores, a weighted summing of the user criteria scores, a weighted averaging of the user criteria scores, etc.

In this example, the valid delivery point 1504-3 corresponding to cells K1:L2 of FIGS. 14A through 14C is determined an access convenience criteria score of 0.4, a noise criteria score of 0.4, and a downdraft disruption criteria score of 0.6. Based on each of the user criteria scores determined for the valid delivery point 1504-3, a suitability score 1510 for the valid delivery point is determined to be 4.3.

The valid delivery point 1504-4 corresponding to cells L8:M9 of FIGS. 14A through 14C is determined to have an access convenience criteria score of 1, a noise criteria score of 0.4, and a downdraft disruption criteria score of 0.6. Based on each of the user criteria scores determined for the valid delivery point 1504-4, a suitability score 1510 for the valid delivery point is determined to be 4.7.

Figure 16A:
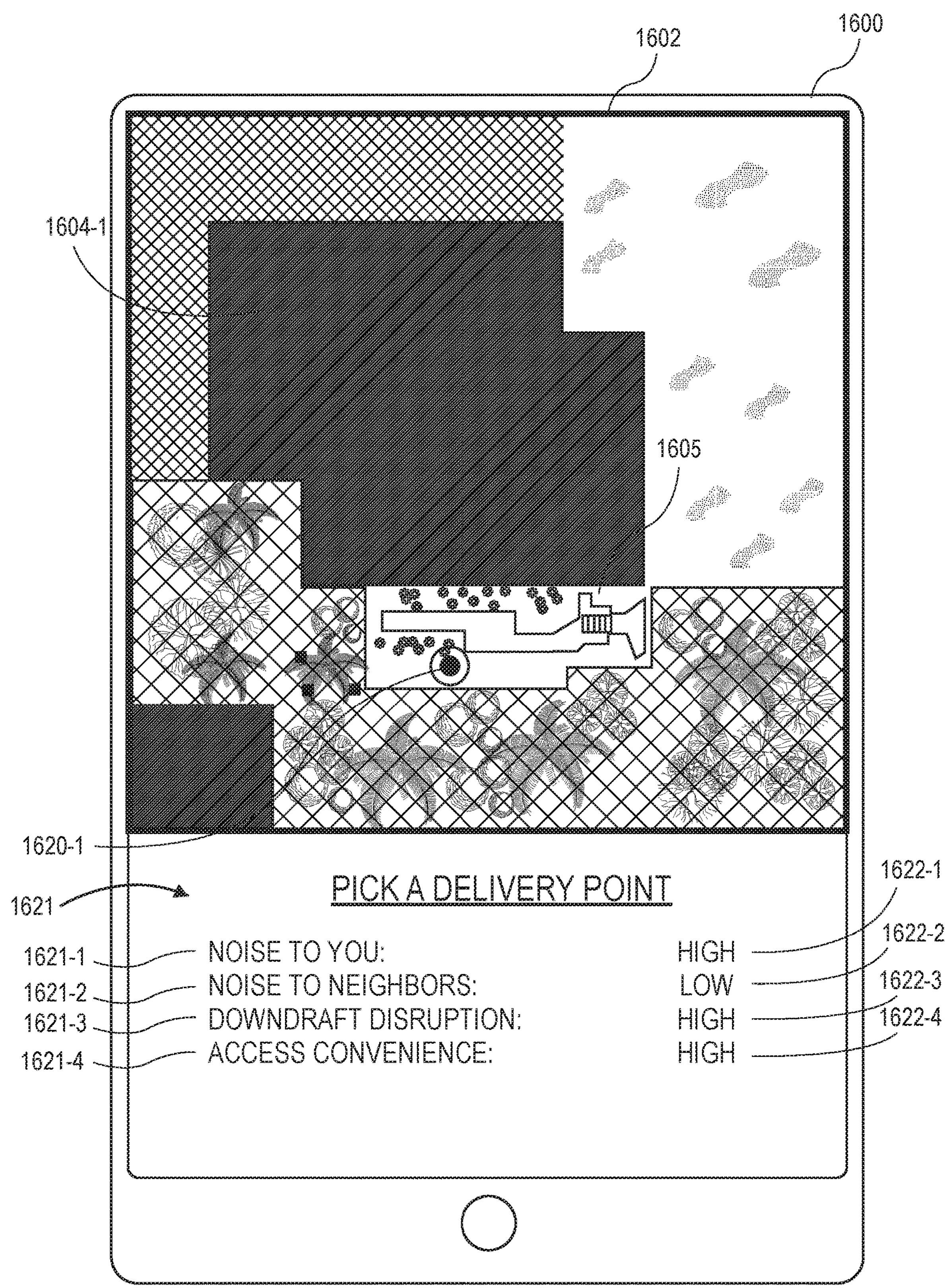
FIGS. 16A, 16B, and 16C is an example user interface to allow a user to select different valid delivery points as a preferred delivery point for a parcel, in accordance with described implementations.
Figure 16B:
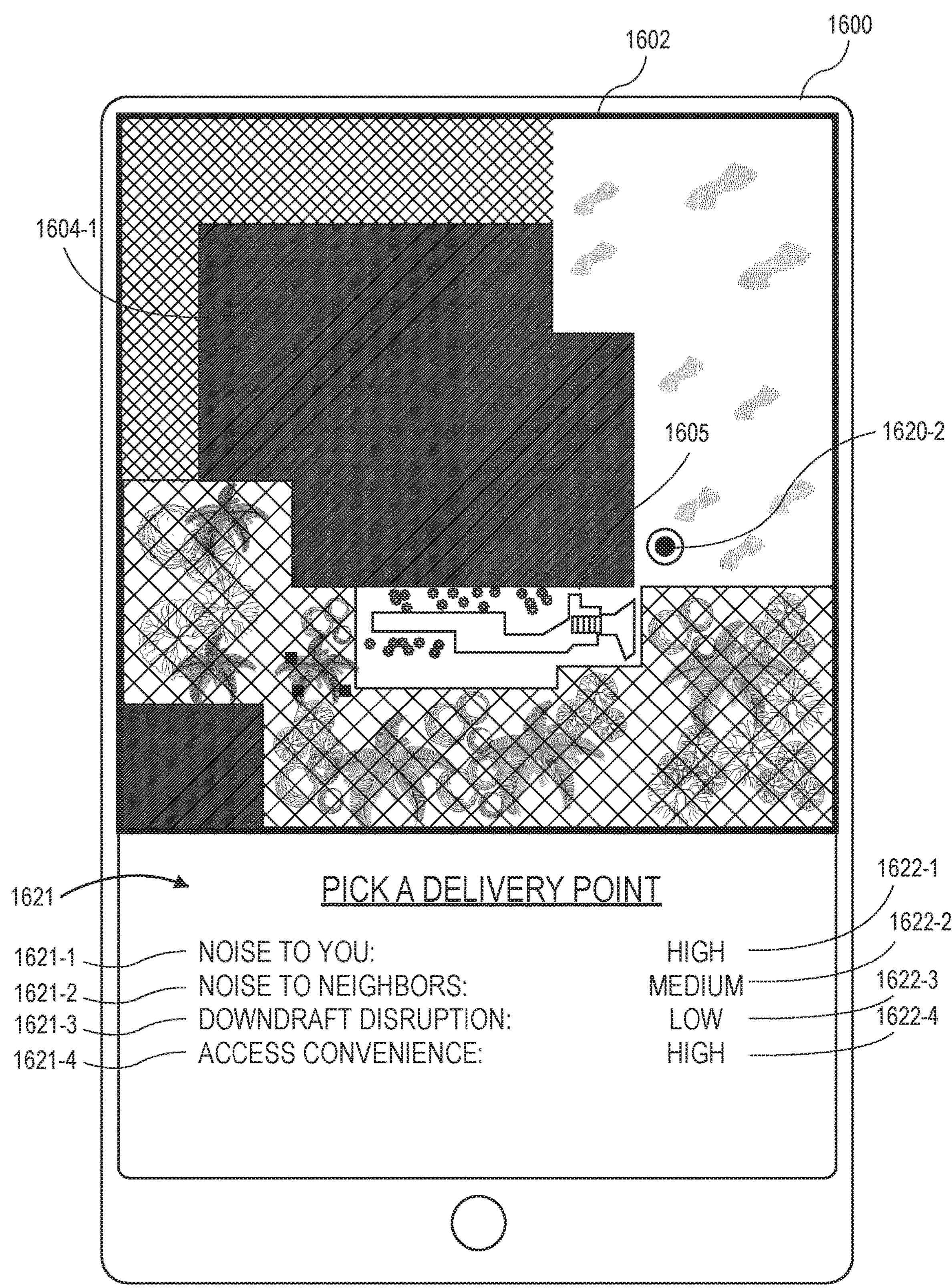
Figure 16C:
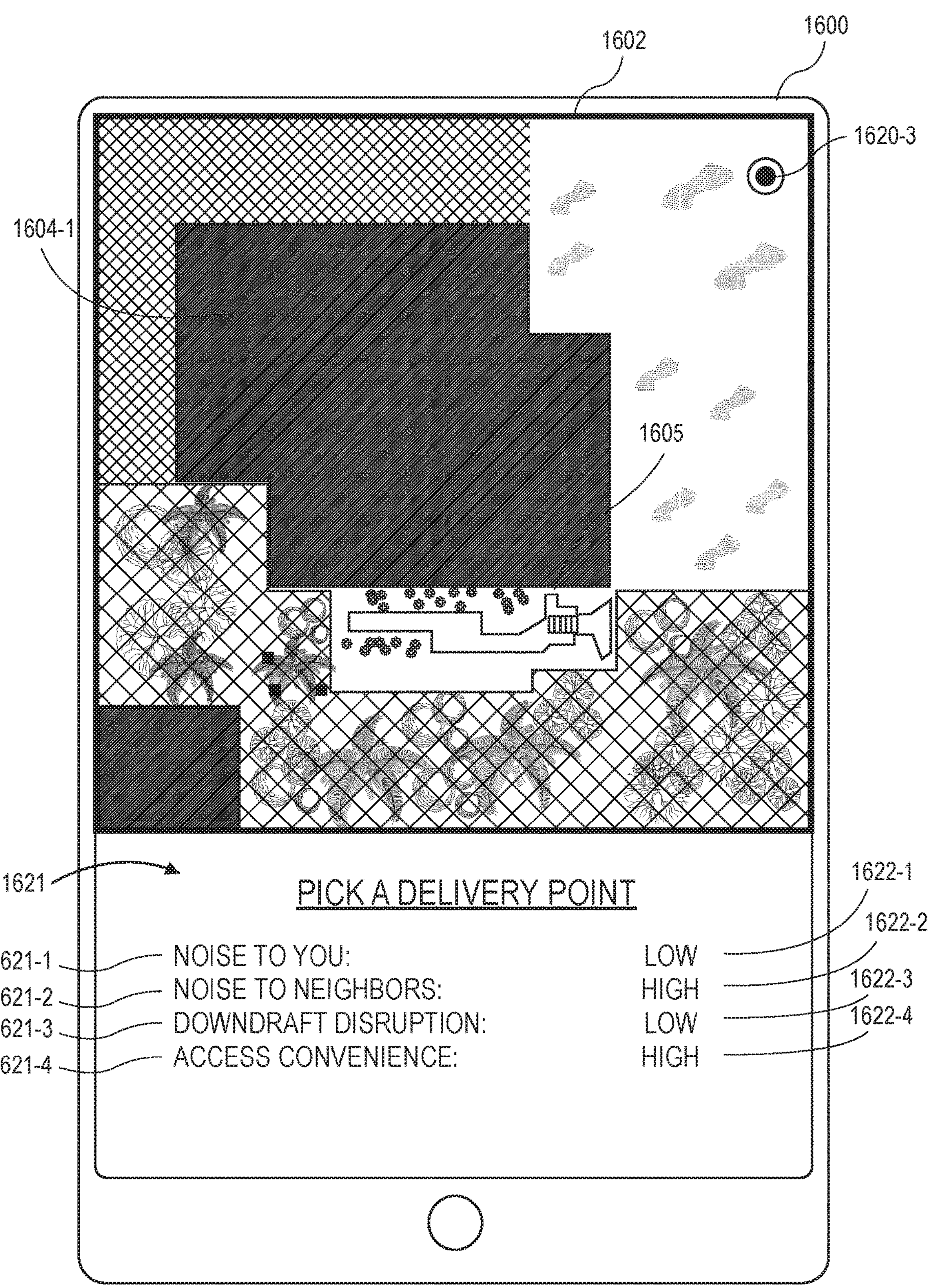

FIGS. 16A, 16B, and 16C is an example user interface to allow a user to select different delivery points as a preferred delivery point on a parcel, in accordance with described implementations.

In the example illustrated in FIGS. 16A through 16C, a user may interact with an image of a parcel 1602 presented on a display of a device 1600, such as a portable device (e.g., cellphone, tablet, laptop desktop, etc.). For example, the display of the device 1600 may be a touch-based display and the user may interact with the image of the parcel 1602 by touching different points in the image as delivery points. In other examples, other forms of interaction beyond touch may be used.

In response to a user selecting a valid delivery point, such as valid delivery point 1620-1 illustrated in FIG. 16A, information relating to some or all of the user criteria may be presented to the user to indicate to the user the positive and negatives of utilizing the selected valid delivery point as a preferred delivery point. For example, as illustrated in FIG. 16A, if the user selects delivery point 1620-1, which is near a flowerbed, sidewalk, and near an entry to the structure 1604-1, as a preferred delivery point, information 1621 relating the user criteria may be presented to the user. For example, noise to you information 1621-1, which relates to a parcel noise criteria determined for the parcel, as discussed above, may be presented to a user as a level 1622-1 (e.g., high, medium, low) of noise perceived by the user if the user is located in the structure 1604-1 during a delivery. In this example, because the point 1620-1 is near the structure, the noise to you information 1621-1 is indicated to be high 1622-1. In comparison, the noise to neighbor information 1621-2 may be indicated as low 1622-2 because the delivery point is away from neighbors and, as a result, there will be limited perceived noise to the neighbors during an aerial delivery of an item to the indicated delivery point 1620-1 at the parcel. Likewise, because the delivery point is near a flowerbed, which may include delicate plants (e.g., flowers), downdraft disruption information 1621-3, which corresponds to downdraft disruption criteria, may be indicated as high 1622-3 because the flowers in the nearby flowerbed may be disrupted by the downdraft of the aerial vehicle during an aerial delivery of an item to that delivery point 1620-1. Finally, access convenience information 1621-4, which corresponds to the access convenience criteria discussed above, may be indicated has high 1622-4 because the delivery point is near an entry/exit 1605 of the structure 1604-1 and therefore retrieval of an item delivered to that point will be convenient for the user.

The information 1621 presented in FIGS. 16A through 16C for noise to you 1621-1, noise to neighbors 1621-2, potential disruption to surroundings 1621-3, and access convenience 1621-4 may relate to one or more of the criteria discussed above, but may be presented in a more user friendly manner such as rankings of high, low, and medium to make the information readily understandable by the user.

In comparison to FIG. 16A, referring now to FIG. 16B, if the user selects a second delivery point 1620-2 that is out in the yard next to the structure 1604-1, the information 1621/1622 is updated to reflect criteria scores determined for that valid delivery point 1620-2. For example, based on the criteria determined for the valid delivery point 1620-2, the noise to you information 1621-1 remains high 1622-1 because the delivery point remains close to the structure 1604-1. In comparison, the noise to neighbor information 1621-2 changes to medium as the delivery point is closer to a neighbor such that the neighbor may perceive more of the noise that occurs during an aerial delivery of the item to that delivery point 1620-2. The downdraft disruption information 1621-3 is also changed to low 1622-3 because the delivery point is in the yard and there are no detected objects at or near the delivery point that may be disrupted by the downdraft of the aerial vehicle during an aerial delivery of an item to the delivery point. Finally, access convenience information 1621-4 remains high as the delivery point 1620-2 remains close to an entry/exit 1605 from the structure 1604-1.

As still another example, FIG. 16C illustrates information 1621/1622 presented when a user selects a valid delivery point 1620-3 that is far from the structure and near a boundary of the parcel. In this example, the noise to you information 1621-1 is low 1622-1 because the delivery point is far from the structure 1604-1, the noise to neighbors information 1621-2 is high 1622-2 because the delivery point is near the boundary of the parcel 1602 and near to neighbors on the other side of the boundary, and the downdraft disruption to surrounding area information 1621-3 is low because there are no objects at or near the selected delivery point 1620-3. Finally, the access convenience information 1621-4 is indicated as low 1622-4 because the selected delivery point is far from an entry 1605 of the structure 1604-1.

As illustrated in FIGS. 16A through 16C, in some implementations, a user may be presented with an image of a parcel 1602 and select different valid delivery points 1620 within the parcel and receive feedback indicating the positive and negative aspects of each different delivery point. As a result, the user is able to make an informed decision as to whether the user desires to receive an aerial delivery and, if so, the preferred delivery point at the parcel for that aerial delivery.

Figure 17A:
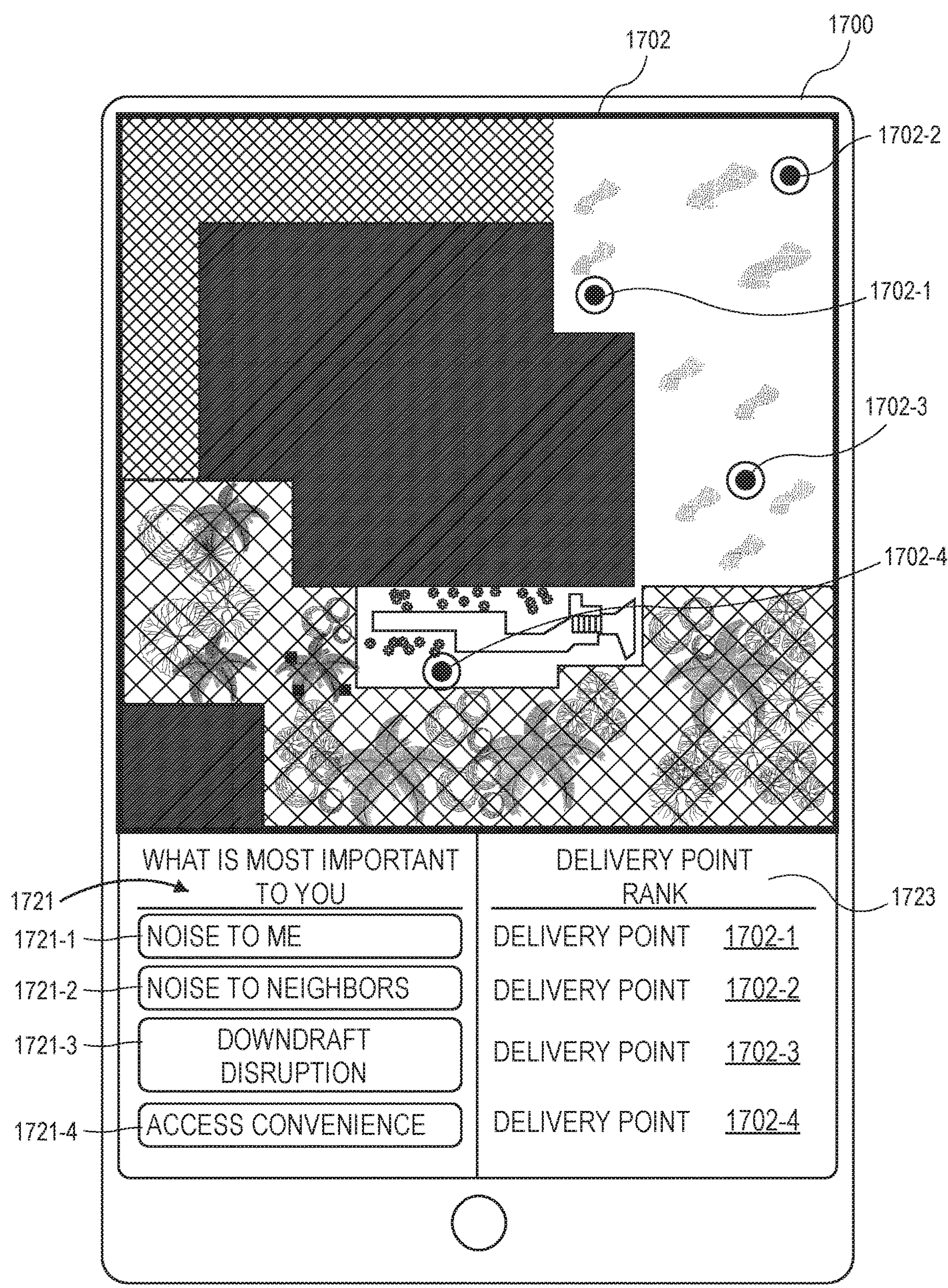
FIGS. 17A and 17B is an example user interface to allow a user to select or rank different criteria for delivery of an item to a parcel, in accordance with described implementations.
Figure 17B:
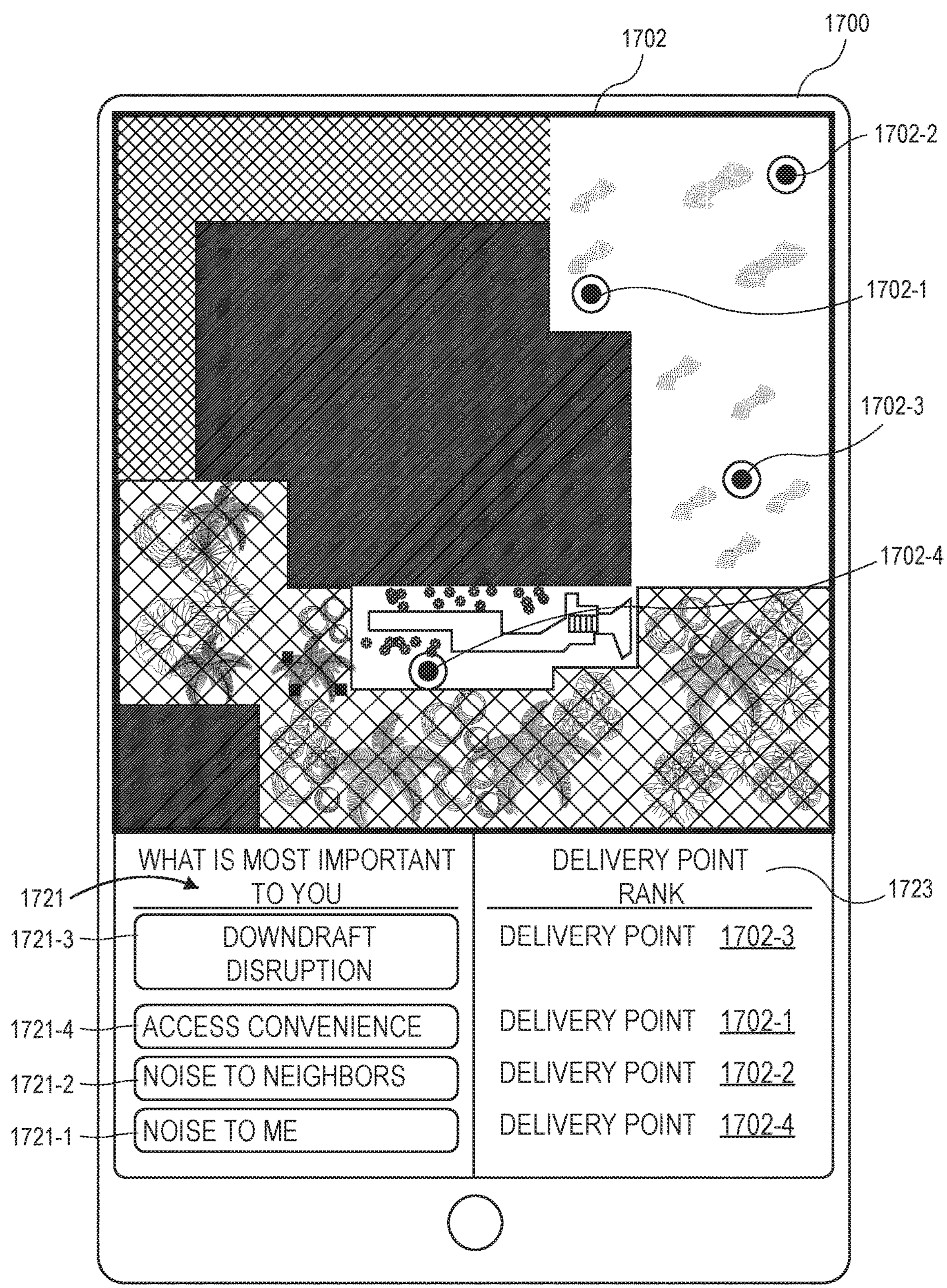

FIGS. 17A and 17B is an example user interface to allow a user to select or rank different criteria for delivery of an item to a parcel, in accordance with described implementations.

Similar to the discussion presented with respect to FIGS. 16A through 16C, the user interface presented on a device 1700 includes an image of a parcel 1702 and criteria information 1721 corresponding to the criteria determined for valid delivery points. However, in the illustrated example, a plurality of valid delivery points 1702-1, 1702-2, 1703-3, 1704-4 are presented on the display simultaneously to illustrate their respective positions on the parcel 1702. For example, the valid delivery points having the highest suitability scores, determined as discussed above, may be simultaneously presented on the display of the device 1700.

In addition, criteria, such noise to me 1721-1 (which corresponds to parcel noise criteria), noise to neighbors 1721-2 (which corresponds to adjacent parcel criteria), downdraft disruption 1721-3, and access convenience 1721-4 may be presented as positionable objects on the display of the device. In the illustrated example, a user may interact with the presented criteria 1721 and move them with respect to each other to rank the criteria in order of importance. Based on the ranking of the criteria 1721, a preferred order or rank of delivery points is determined and presented. Referring first to FIG. 17A, for the criteria ranking in which noise to me 1721-1 has the highest rank, noise to neighbors 1721-2 has the second highest rank, downdraft disruption 1721-3 has the third highest rank, and access convenience 1721-4 has the fourth highest rank, based on the computed suitability scores for the presented delivery points, the delivery points rank 1723 indicates that delivery point 1702-1 is the most preferred/highest ranked, delivery point 1702-2 is second, delivery point 1702-3 is third, and delivery point 1702-4 is the lowest ranked delivery point.

As discussed above, based on the order of importance assigned to each of the criteria 1721 by the user, weights may be assigned to the respective criteria and the suitability scores determined for each delivery point to rank the delivery points based on the user specified order of importance of the criteria. If the user alters the order of importance of one or more of the criteria with respect to another, the weights used to compute the suitability scores may be updated and the priority order of the delivery point rankings adjusted.

For example, referring to FIG. 17B, if the user changes the order of importance such that the downdraft disruption 1720-3 is of highest priority followed by access convenience 1720-4, then noise to neighbors 1720-2, and finally noise to me 1720-1, the weights for the corresponding criteria for the parcel may be adjusted and the delivery point rankings 1723 adjusted based on the updated suitability scores. In the illustrated example, with the adjusted rankings, delivery point 1702-3 is now the highest ranked, followed by delivery point 1702-1, then delivery point 1702-2, and finally delivery point 1702-4.

By presenting valid delivery points to the user and allowing the user to adjust the importance of one or more criteria, the user is able to view each of the delivery points and make an informed decision as to whether the user desires to receive an aerial delivery and, if so, the preferred delivery point at the parcel for that aerial delivery.

Figure 18A:
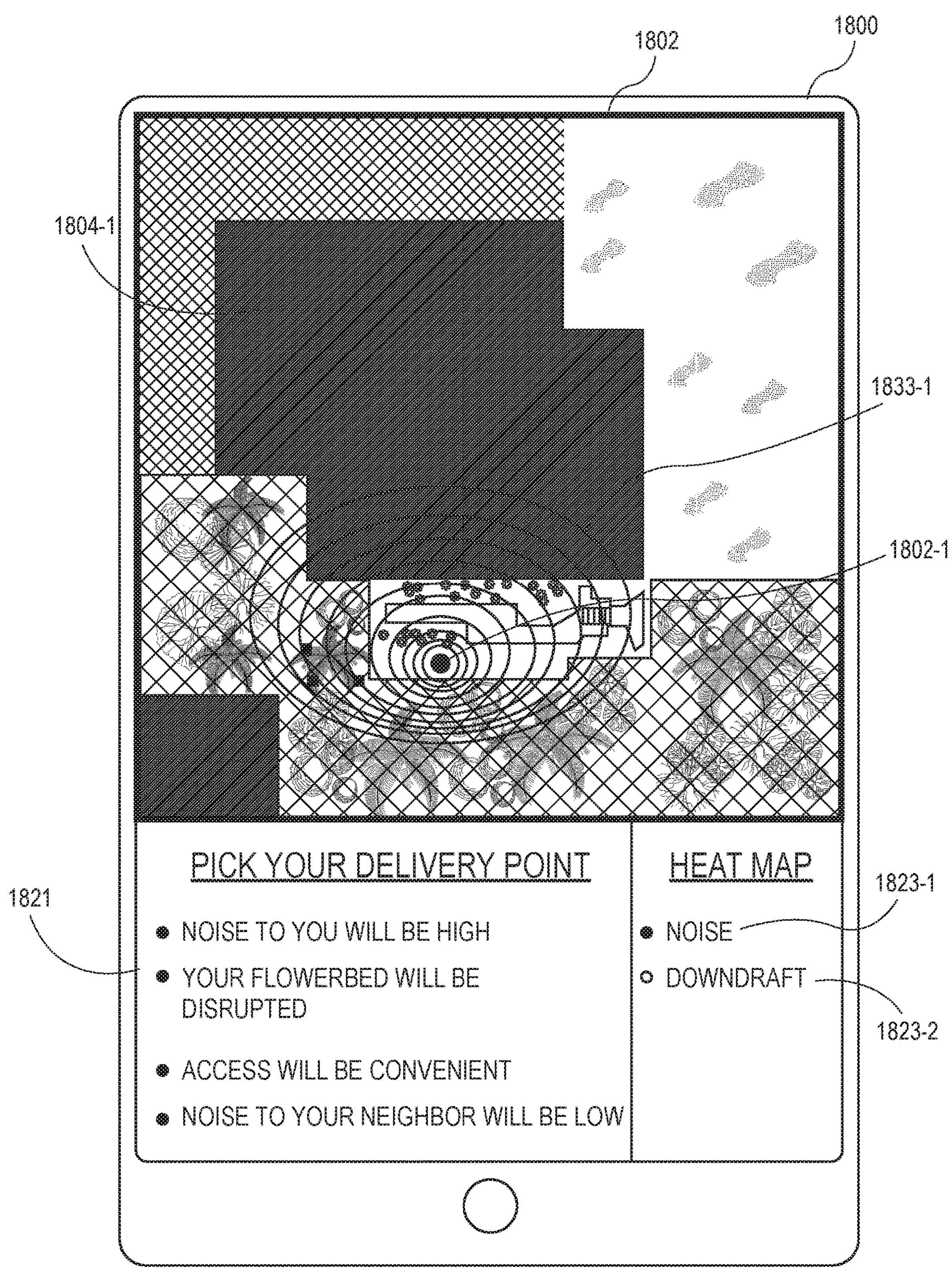
FIGS. 18A and 18B is an example user interface illustrating a heatmap corresponding to criteria of a valid delivery point on a parcel, in accordance with described implementations.
Figure 18B:
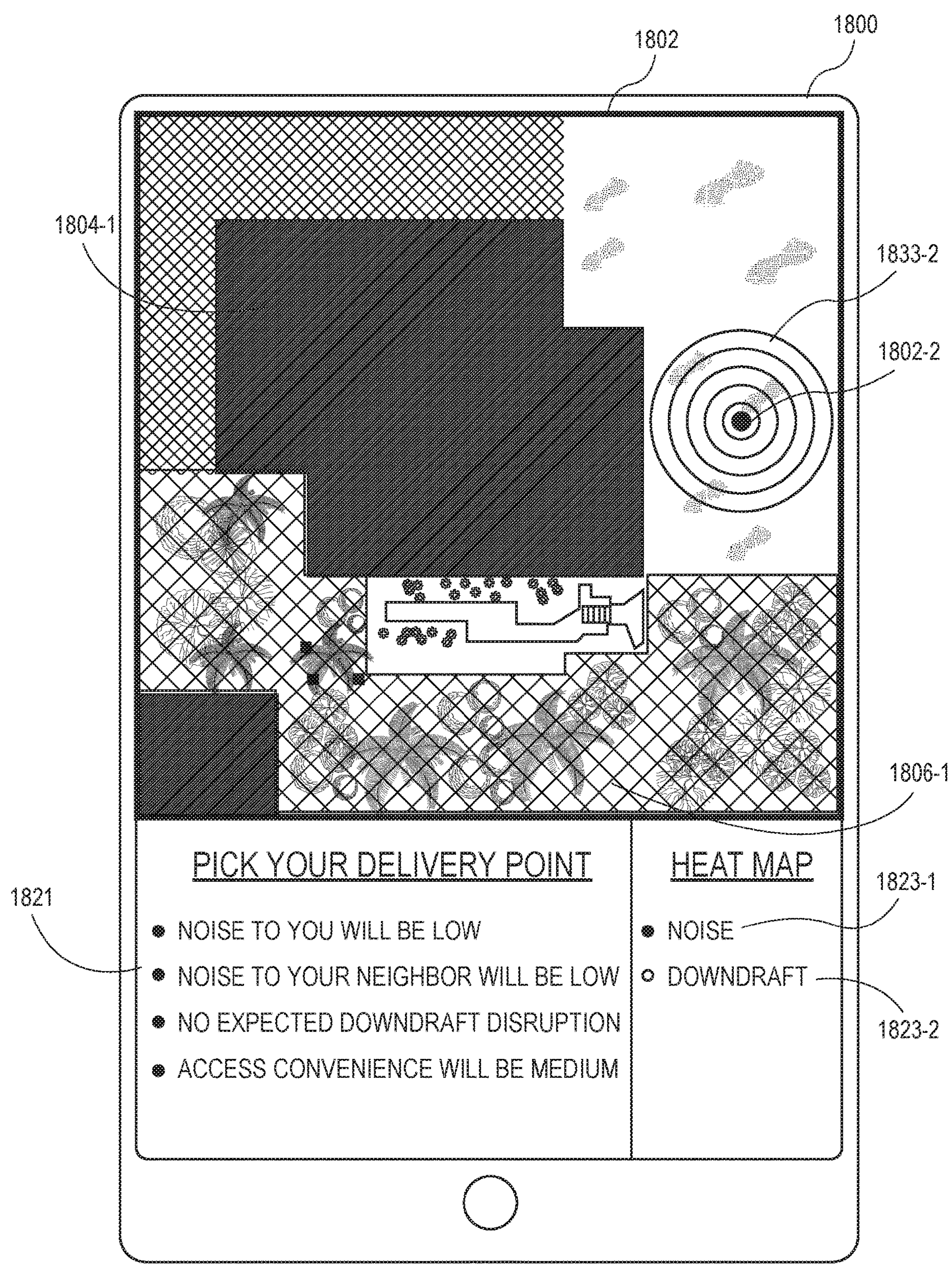

FIGS. 18A and 18B is an example user interface illustrating a heatmap corresponding to criteria of a valid delivery point on a parcel, in accordance with described implementations.

In the example illustrated in FIGS. 18A through 18B, a user may interact with the parcel 1802 presented on a display of a device 1800 and select different valid delivery points on the parcel, such as delivery point 1802-1. In this example, a heatmap 1833-1 corresponding to one or more of the criteria is presented to the user so that the user can visually see the potential impact of a selected criteria through presentation of a heatmap 1833-1 overlaid on the parcel. In some implementations, the user may select what criteria is presented by the heatmap 1833-1, such as noise 1823-1, which corresponds to the noise criteria discussed above, or downdraft 1823-2, which corresponds to the downdraft disruption criteria discussed above. In the illustrated example, the user has selected to view a heatmap 1833-1 corresponding to the noise 1823-1 criteria. The heatmap 1833-1 may be presented based on the noise criteria score computed for the selected valid delivery point 1802-1. As discussed above, a noise profile known for the aerial vehicle and further based on the effects of the surroundings at or near the selected delivery point may have on the noise. For example, as illustrated in FIG. 18A, the noise will be dampened as it propagates away from the structure 1804-1 because of the plants in that area of the parcel, thereby resulting in an elliptical heatmap emanating from the selected delivery point, as illustrated.

In addition to presenting a heatmap corresponding to a selected valid delivery point and a criteria determined for that delivery point, the user interface may also present to the user criteria information 1821 that is determined based on the criteria determined for the selected delivery point. For example, in addition to presenting a heatmap 1833 for, in this example, the noise criteria determined for valid delivery point 1802-1, the criteria information 1821 may also indicate that it has been determined for that delivery point that noise to the user will be high, the flowerbed near the selected delivery point may be disrupted, the access to items delivered at the selected delivery point will be convenient, and noise to the neighbor will be low. In other implementations, other criteria information determined from the criteria may also be presented and/or the criteria information may be presented in different formats.

Referring to FIG. 18B, if the user selects a different delivery point, such as valid delivery point 1802-2, the heatmap and the criteria information 1821 are also updated. For example, the heatmap 1833-2 for noise at the selected valid delivery point 1802-2 may be symmetrical as it propagates from the delivery point because there are no obstacles or objects to deflect or dampen the sound. Likewise, the criteria information 1821 may be updated to indicate that the noise to the user will be low, the noise to the neighbor will be low, that there is no expected downdraft disruption at the selected delivery point, and that access convenience to an item delivered to that delivery point will be medium.

Regardless of the interface used to present valid delivery points to a user for selection, a user may void or remove a delivery point from the list of valid delivery points. For example, if the aerial vehicle navigation criteria determine a delivery point to be a valid delivery point, the user can select the delivery point and specify that the delivery point is not to be considered a valid delivery point, thereby removing the delivery point from the list of valid delivery points so that the delivery point is no longer available as an option for aerial delivery of items to the parcel.

Figure 19:
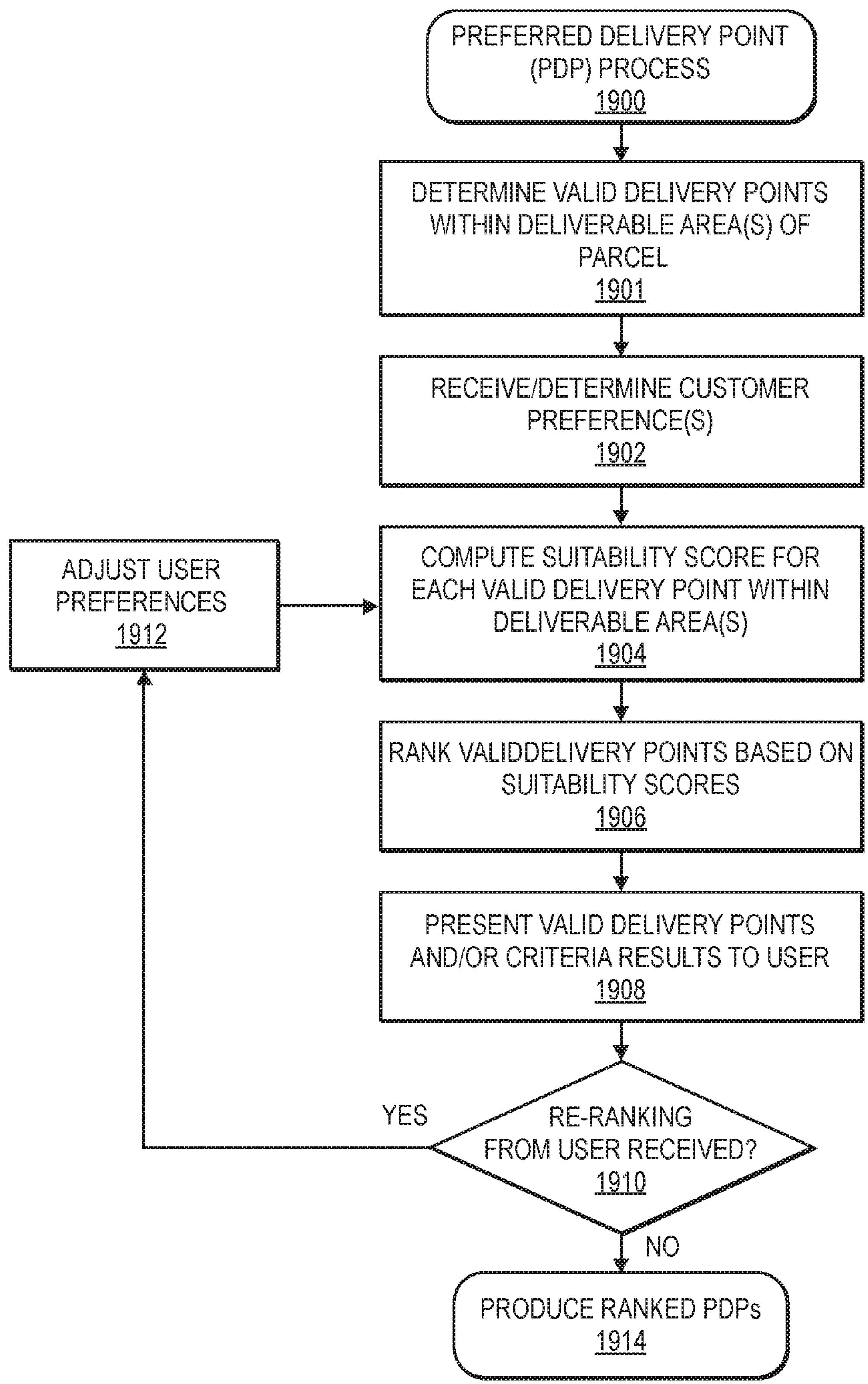
FIG. 19 is an example preferred delivery point process, in accordance with described implementations.

FIG. 19 is an example preferred delivery point process 1900, in accordance with described implementations.

The example process 1900 begins by determining valid delivery points within deliverable areas of a parcel, as in 1901. As discussed above, valid delivery points may be determined by processing parcel data, image data, and/or sensor data corresponding to a parcel.

In addition to determining valid delivery points for the parcel, user preferences indicating an importance of different criteria are also obtained and/or determined for a user to which delivery points are to be presented for selection by the user, as in 1902. If the user has previously provided user preferences, the user preferences may be maintained in a data store and associated with a user account of the user. If the user has not previously indicated user preferences, the user may be presented with different information categories of importance and the user may rank the information categories based on importance to the user, as discussed above. In still other examples, a default importance level, such as treating all criteria as having a same importance may initially be selected for the user.

Based on the received or determined user preferences, a suitability score is computed for each valid delivery point for the parcel, as in 1904. As discussed above, parcel data, image data, and/or sensor data may be processed to determine a criteria score for each of a plurality of criteria (aerial vehicle navigation criteria and user criteria) and a suitability score determined based on those criteria scores.

Based on the suitability scores determined for each valid delivery point, the valid delivery points are ranked, as in 1906, and some or all of the highest ranked valid delivery points may be presented to the user, as in 1908. In some implementations, criteria results, in the form of information or information categories as discussed above, may also be presented to the user. For example, the highest ranked delivery points and corresponding information categories may be presented to the user via a device in one or more of the manners discussed above with respect to FIGS. 16A through 18B.

As discussed above, a user may interact with the presented valid delivery points, change the importance of one or more criteria, etc. As a result, a determination is made as to whether a re-ranking of the criteria or delivery points has been received by the user, as in 1910. If it is determined that a re-ranking of the criteria has been received, the user preferences are adjusted, as in 1912, which may result in different weightings for some or all of the criteria scores used to compute the suitability scores for each valid delivery point. After adjusting the user preferences/criteria weights, the example process 1900 returns to block 1904 and continues.

If it is determined at decision block 1914 that a re-ranking has not been received, the ranked list of valid delivery points is used to generate a ranked preferred delivery points list for the parcel, with the highest ranked delivery point corresponding to the preferred delivery point for the parcel, as in 1914. As discussed, when an item is delivered to the parcel, the aerial vehicle will be instructed to deliver the item to the preferred delivery point. If it is determined during delivery that item delivery to the preferred delivery point is not available, the next preferred delivery point on the preferred delivery point list may be selected for item delivery.

Figure 20:
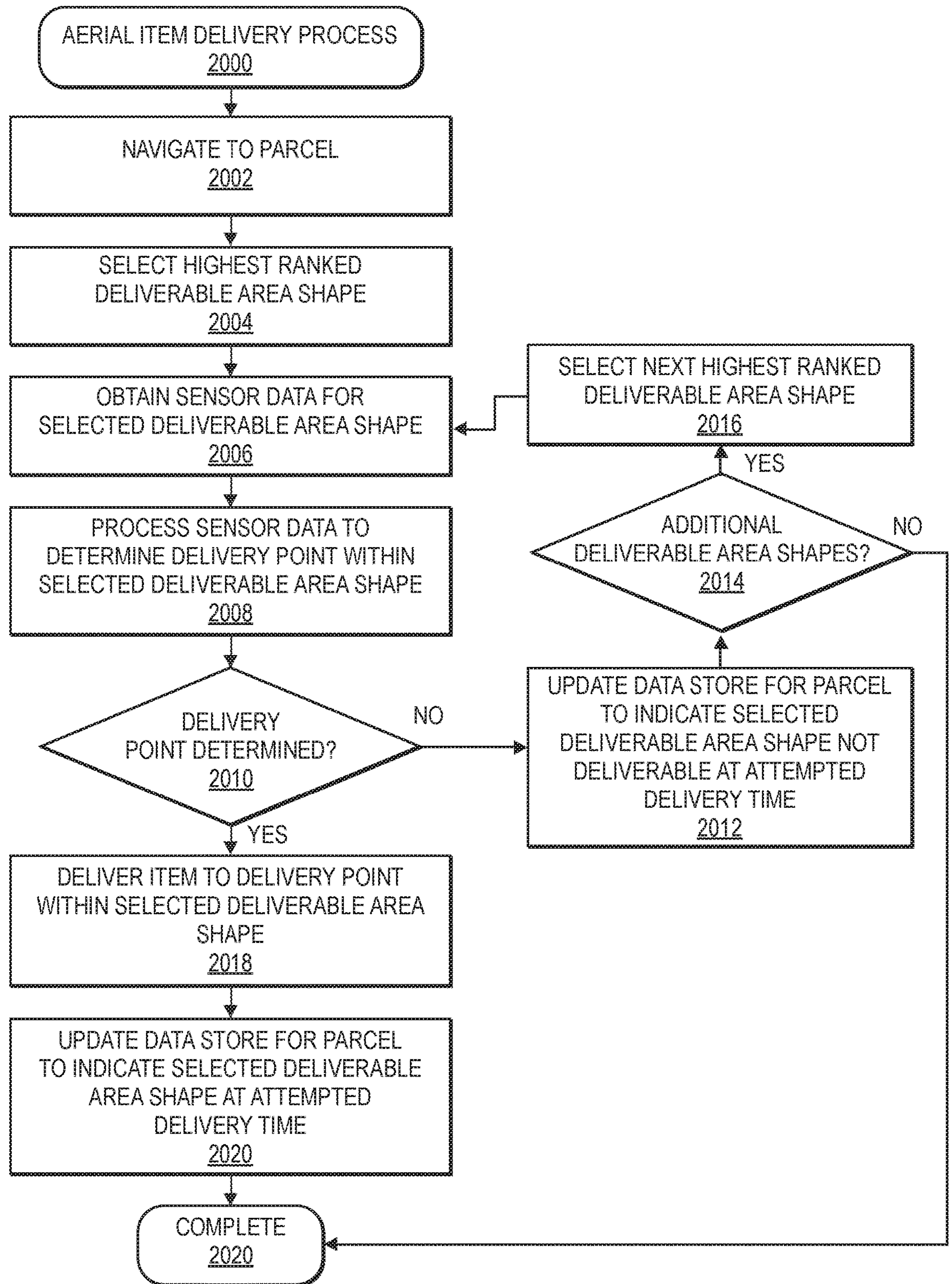
FIG. 20 is an example aerial item delivery process, in accordance with described implementations.

FIG. 20 is an example aerial item delivery process 2000, in accordance with described implementations.

The example process 2000 begins by causing or instructing an aerial vehicle to aerially navigate a route to a parcel to which an item is to be aerially delivered by the aerial vehicle, as in 2002. A highest ranked deliverable area shape corresponding to the parcel is also selected, as in 2004. The deliverable area shape may be selected by one or more computing resources that are independent of the aerial vehicle or may be selected by the aerial vehicle as part of the aerial navigation and item delivery.

When the aerial vehicle arrives at the parcel, it may be instructed to obtain sensor data, such as image data, of at least the portion of the parcel corresponding to the deliverable area shape, as in 2006. The sensor data is obtained while the aerial vehicle is airborne and positioned above the parcel. The sensor data of the deliverable area shape is then processed to determine a delivery point within the deliverable area shape that is clear and available for descent by the aerial vehicle and aerial delivery of the item, as in 2008.

In some implementations, the image data may include more than just the portion of the parcel encompassed by the deliverable area shape. In such an example, the portion of the image data corresponding to the deliverable area shape may be extracted from the image data and only that portion processed. As discussed above, only processing the portion of the image data corresponding to the selected deliverable area shape increases the speed at which a delivery point is determined and reduces computing requirements.

A delivery point may be determined based on an image processing of the image data corresponding to the deliverable area shape to determine a largest clear and open area within the deliverable area shape that is free of obstacles. Image processing of a portion of the parcel already determined as available for aerial item delivery at the actual time of aerial item delivery is done to ensure that the portion of the parcel is unchanged and remains free of obstacles before actual aerial item delivery is attempted. This increases the safety and reliability of aerial item delivery.

A determination is then made as to whether a delivery point was determined, as in 2010. If a delivery point was not determined, the data store is updated to indicate that the selected delivery area is not available for aerial item delivery at the time of the attempted actual aerial item delivery, as in 2012. In some implementations, the example process 2000 may also determine if the inability to determine a delivery point is based on stationary objects (e.g., trees, shrubs, bushes, tables, chairs) within the deliverable area shape or whether the inability to determine a delivery area point is due to a moving object detected around or within deliverable area shape. If the inability is due to a stationary object, the data store may be updated, as indicated above and/or the deliverable area shape score may be decreased due to the determined inability to aerially deliver an item to a delivery point within the deliverable area shape. In comparison, if the inability to determine a delivery point is due to a moving object (e.g. person, animal), the data store may not be updated and/or the score may not be changed because the deliverable area shape may be available for future delivery attempts.

Determining availability of a deliverable area shape at different times may be useful as use and availability of deliverable area shapes of a parcel may change over time. For example, during the summer months, a patio at the parcel may be covered with chairs, tables, and umbrellas (obstacles) and thus not available for aerial item delivery during the summer months. However, during winter months, the obstacles may be put away leaving a clear open space (the patio) that is available for aerial item delivery. By tracking the availability of deliverable area shapes during different times within a datastore, the ranking of those deliverable area shapes for a parcel may change depending on the time of year, etc., based on the likelihood that a deliverable area shape will actually be available for aerial item delivery. In some implementations, the deliverability score for the deliverable area shape may be decreased to reflect the inability to complete an aerial item delivery to a delivery point within the deliverable area shape.

Returning to FIG. 20, after updating the data store at block 2012 that a delivery point was not determined, a determination is made as to whether additional deliverable area shapes indicated as available for aerial item delivery exist at the parcel, as in 2014. If additional deliverable area shapes remain, a next highest ranked deliverable area shape is selected, as in 2016, and the example process 2000 returns to block 2006 and continues. If it is determined that no additional deliverable area shapes indicated as available for aerial item delivery remain, the example process 2000 completes, as in 2020.

In the event no available aerial item delivery point is determined for the parcel, the aerial vehicle may abort the delivery and deliver the item to an alternative location, return to a distribution center, etc. Likewise, a user that ordered the item or is to receive the item may be notified of the inability to complete the aerial item delivery and that alternative delivery methods will be used to complete delivery of the item to the user and/or to the parcel.

Returning to decision block 2010, if it is determined that a delivery point is determined, the aerial vehicle completes aerial item delivery of the item to the delivery point within the selected deliverable area shape, as in 2018. In addition, the data store for the parcel may be updated to indicate the delivery point to which the item was aerially delivered and/or to indicate that an item has been actually delivered to the delivery point within the selected deliverable area shape. Likewise, in some implementations, the deliverability score for the deliverable area shape may be increased in response to a confirmed actual aerial delivery of an item to a delivery point within the deliverable area shape. This deliverability score may be adjusted for the period of time corresponding to the delivery (e.g., winter months) and/or as a total deliverability score adjustment for the deliverable area shape.

In some implementations, the indication and/or rank of deliverable area shapes may be provided to a user for review, verification, and/or modification. For example, the example process 2000 may provide a ranked list or ranked graphical representation of the parcel to a user indicating which deliverable area shapes within the parcel are highest ranked for aerial item delivery. In such an example, the user may confirm the ranking, rearrange the ranking, or indicate other deliverable area shapes or delivery points at the parcel for aerial item delivery.

Figure 21:
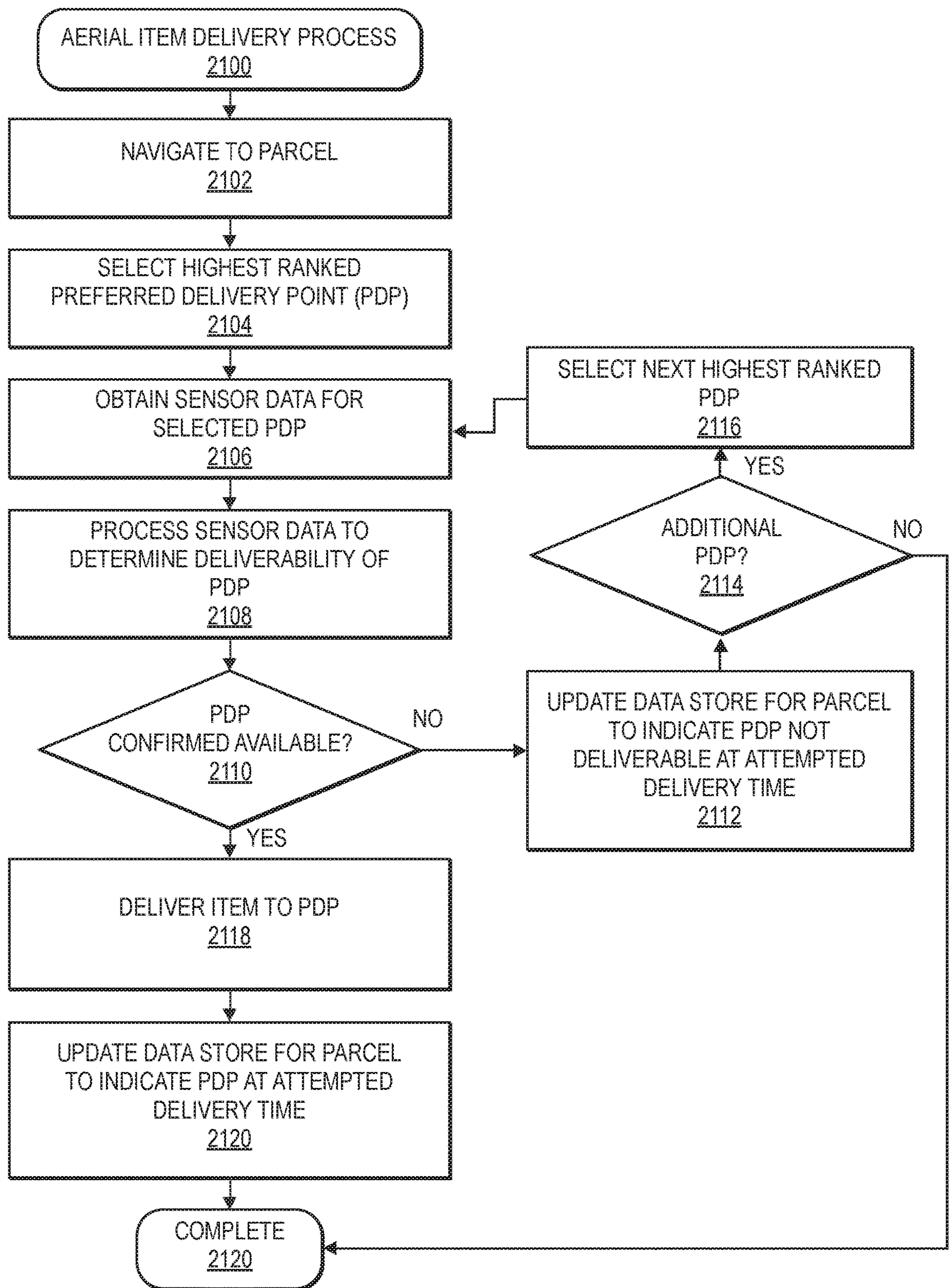
FIG. 21 is another example aerial item delivery process, in accordance with described implementations.

FIG. 21 is another example aerial item delivery process 2100, in accordance with described implementations.

The example process 2100 begins by causing or instructing an aerial vehicle to aerially navigate a route to a parcel to which an item is to be aerially delivered by the aerial vehicle, as in 2102. A highest ranked preferred delivery point corresponding to the parcel is also selected, as in 2104. As discussed above, the highest rank preferred delivery point may be determined based on processing of parcel data, image data, and/or sensor data corresponding to the parcel to determine criteria scores for a plurality of criteria, and further may be based on criteria preferences as specified by a user.

When the aerial vehicle arrives at the parcel, it may be instructed to obtain sensor data, such as image data, of at least the portion of the parcel corresponding to the preferred delivery point, as in 2106. The sensor data is obtained while the aerial vehicle is airborne and positioned above the parcel. The sensor data of the preferred delivery point is then processed to determine whether the preferred delivery point is clear and available for descent by the aerial vehicle and aerial delivery of the item, as in 2108.

In some implementations, the sensor data may include more than just the portion of the parcel encompassed by the preferred delivery point. In such an example, the portion of the image data corresponding to the preferred delivery point may be extracted from the sensor data and only that portion processed. As discussed above, only processing the portion of the sensor data corresponding to the selected preferred delivery point increases the speed at which it can be confirmed that the preferred delivery point is available to receive an aerial delivery of an item.

Confirmation that the preferred delivery point is available to receive an aerial delivery of an item may be determined based on an image processing of image data corresponding to or encompassing the preferred delivery point to determine if the area that corresponds to the preferred delivery point is free of obstacles. Image processing of a portion of the parcel corresponding to the determined preferred delivery point at the actual time of aerial item delivery is done to ensure that the portion of the parcel corresponding to the preferred delivery point is unchanged and remains free of obstacles before actual aerial item delivery is attempted. This increases the safety and reliability of aerial item delivery.

A determination is then made as to whether a confirmation was made that the preferred delivery point is available for aerial item delivery, as in 2110. If the preferred delivery point was not confirmed, the data store is updated to indicate that the selected preferred delivery point is not available for aerial item delivery at the time of the attempted actual aerial item delivery, as in 2112. In some implementations, the example process 2100 may also determine if the inability to confirm the preferred delivery point as available for aerial item delivery is based on stationary objects (e.g., trees, shrubs, bushes, tables, chairs) within the preferred delivery point or whether the inability to confirm the preferred delivery point as available is due to a moving object detected around or within preferred delivery point. If the inability is due to a stationary object, the data store may be updated, as indicated above and/or the probability clear criteria score may be decreased due to the determined inability to aerially deliver an item to the preferred delivery point. In comparison, if the inability to confirm availability of the preferred delivery point is due to a moving object (e.g. person, animal), the data store may not be updated and/or the score may not be changed because the deliverable area shape may be available for future delivery attempts.

Determining availability of a preferred delivery point at different times may be useful as use and availability of preferred delivery points of a parcel may change over time. For example, during the summer months, a patio at the parcel may be covered with chairs, tables, and umbrellas (obstacles) and thus not available for aerial item delivery during the summer months. However, during winter months, the obstacles may be put away leaving a clear open space (the patio) that is available for aerial item delivery. By tracking the availability of preferred delivery points during different times within a data store, the ranking of those preferred delivery points for a parcel may change depending on the time of year, etc., based on the likelihood that a preferred delivery point will actually be available for aerial item delivery. In some implementations, the suitability score for the preferred delivery point may be decreased to reflect the inability to complete an aerial item delivery to the preferred delivery point.

Returning to FIG. 21, after updating the data store at block 2112, a determination is made as to whether an additional preferred delivery point exists for the parcel, as in 2114. If an additional preferred delivery point remains, a next highest ranked preferred delivery point is selected, as in 2116, and the example process 2100 returns to block 2106 and continues. If it is determined that no additional preferred delivery point remains, the example process 2100 completes, as in 2120.

In the event no available preferred delivery point is determined for the parcel, the aerial vehicle may abort the delivery and deliver the item to an alternative location, return to a distribution center, etc. Likewise, a user that ordered the item or is to receive the item may be notified of the inability to complete the aerial item delivery and that alternative delivery methods will be used to complete delivery of the item to the user and/or to the parcel.

Returning to decision block 2110, if it is determined that a preferred delivery point is confirmed as available to receive an aerial item delivery, the aerial vehicle completes aerial item delivery of the item to the preferred delivery point, as in 2118. In addition, the data store for the parcel may be updated to indicate the preferred delivery point to which the item was aerially delivered and/or to indicate that an item has been actually delivered to the preferred delivery point, as in 2120. Likewise, in some implementations, the suitability score for the preferred delivery point may be increased in response to a confirmed actual aerial delivery of an item to the preferred delivery point. For example, the suitability score may be adjusted for the period of time corresponding to the delivery (e.g., winter months) and/or as a total suitability score adjustment for the preferred delivery point.

Figure 22:
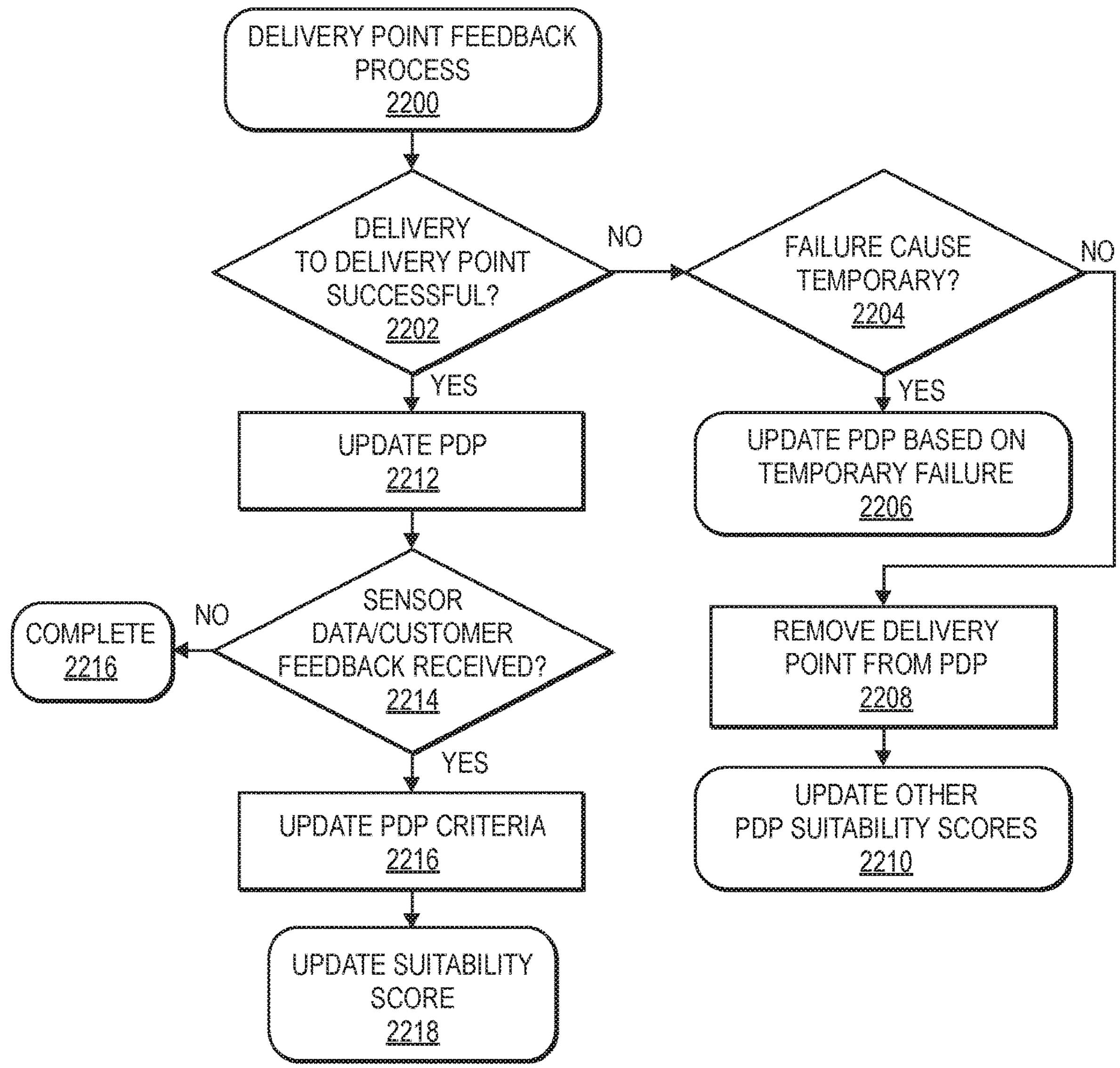
FIG. 22 is an example delivery point feedback process, in accordance with described implementations.

FIG. 22 is an example delivery point feedback process 2200, in accordance with described implementations. The example process may be performed for each attempted and/or completed aerial item delivery to a parcel and the information provided back to the system to update one or more criteria for one or more delivery points of the parcel.

The example process 2200 begins by determining if an attempted aerial item delivery to a delivery point within a parcel was successfully completed to that delivery point, as in 2202. If it is determined that the aerial item delivery was not successful, a determination is made as to whether the cause of the failure was temporary, as in 2204. As discussed above, a failure to complete an aerial delivery to a preferred delivery point may be due to temporary/movable objects, such as humans, animals, chairs, tables, automobiles, etc. If it is determined that the cause of the failure was temporary, the data store and/or one or more criteria, such as the probability clear criteria for the preferred delivery point is updated to indicate that the availability of the preferred delivery point may vary, as in 2206.

However, if it is determined that the cause of the failure is not temporary, for example, a plant, structure, or other permanent/immobile object is detected at the preferred delivery point, the preferred delivery point is removed from the list of preferred delivery points and indicated as an invalid delivery point for the parcel, as in 2208. In addition, one or more of the suitability scores for other valid delivery points corresponding to the parcel may also be updated, as in 2210. For example, a criteria included in the computation of the suitability score for each valid delivery point may be the distance from invalid delivery points. As such, if the delivery point is marked invalid, the distance from invalid delivery points criteria score for other valid delivery points that are near the now invalid delivery point may be updated.

Returning to decision block 2202, if it is determined that the attempted aerial delivery to the preferred delivery point was successful, the preferred delivery point is updated to indicate that the preferred delivery point has been successfully used to complete an aerial delivery of an item to the parcel, as in 2212. Such an update may include adding a weight or increasing the score to the suitability score for the preferred delivery point.

A determination may also be made as to whether any sensor data and/or user feedback is received in response to the successfully completed aerial delivery of the item to the preferred delivery point, as in 2214. If no sensor data or user feedback was received, the example process 2200 completes, as in 2216. However, if sensor data and/or user feedback is received, one or more preferred delivery point criteria are updated based on the received sensor data and/or user feedback, as in 2216. Sensor data may be sensor data collected by sensors of the aerial vehicle during the aerial delivery of the item and/or sensor data collected by sensors that are remote from the aerial vehicle. For example, sensors at the parcel, such as video cameras, microphones, etc., on an exterior of the structure at the parcel may be received as feedback sensor data. Likewise, the user may provide feedback, positive or negative, regarding the aerial delivery. For example, the user may provide written feedback indicating that aerial delivery of the item to that preferred delivery point was too loud, perfect, wrong location, correct location, etc.

In some implementation, even if the user does not provide explicit feedback, implicit user feedback may be determined based on the behavior of the user. For example, if the user subsequently selects the same delivery point for additional deliveries, it can be inferred that the user was happy with the selected delivery point. Still further, based on the user criteria scores determined for such a delivery point, it may be inferred what user criteria are more important to the user.

In comparison, if the user selects a different valid delivery point for subsequent deliveries, it can be inferred that one or more of the criteria corresponding to the valid delivery point that has not again been selected was not preferred by the user.

Based on the sensor data and/or user feedback (explicit or implicit), one or more criteria impacted by that feedback may be updated to adjust the criteria score to reflect the received feedback. Finally, with the updated criteria score(s) for the preferred delivery point, the suitability score for that preferred delivery point may be recalculated, as in 2218.

Figure 23:
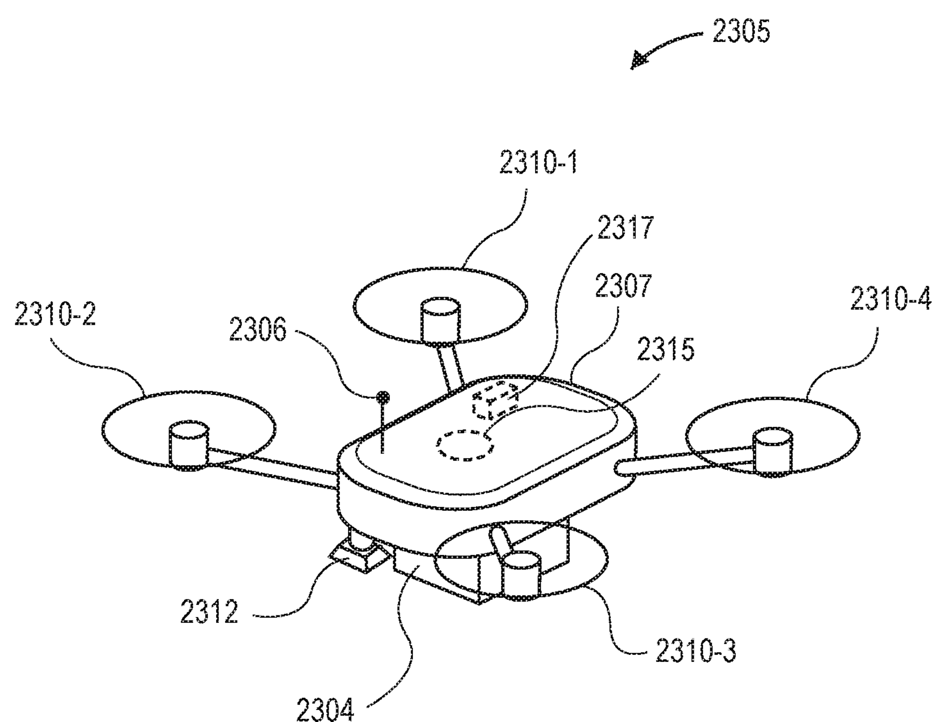
FIG. 23 is an example aerial vehicle, in accordance with described implementations.

FIG. 23 is an example aerial vehicle, in accordance with described implementations.

As illustrated in FIG. 23, an aerial vehicle 2305 may include a frame or body 2307, and a plurality of propulsion mechanisms, such as motors and propellers 2310, coupled to the frame or body 2307. The frame or body 2307 may be formed of any suitable materials, such as carbon fiber, metals, plastics, or combinations thereof. In addition, the motors and propellers 2310 may be coupled to the frame or body 2307, or via one or more motor arms extending from the frame or body 2307. The motors may be any suitable motors for rotating respective propellers 2310 to generate thrust to lift or maneuver at least a portion of the aerial vehicle 2305. The propellers 2310 may be formed of any suitable materials, such as carbon fiber, metals, plastics, or combinations thereof. Further, the aerial vehicle 2305 may also include a control system 2315 that may control operation and navigation of the aerial vehicle 2305, including aspects related to operation of the motors and propellers 2310.

Although FIG. 23 shows an aerial vehicle having a particular shape, size, number of motors and propellers 2310-1, 2310-2, 2310-3, 2310-4, and overall configuration, the systems and methods described herein may be utilized with aerial vehicles having various other shapes, sizes, numbers of motors and propellers, and overall configurations, such as tricopters, quadcopters, hexacopters, octocopters, or various other types of aerial vehicles. In addition, aerial vehicles may include other types of propulsion mechanisms, such as fans, jets, turbojets, turbo fans, jet engines, electric jets, and/or combinations thereof, that may generate noise patterns.

In addition, the aerial vehicle 2305 may include an analysis unit 2317 that includes one or more processors that may process or analyze sensor data to determine one or more delivery points within a deliverable area shape at a parcel for aerial item delivery. The analysis unit 2317 may be included as part of the control system 2315 or independent of the control system 2315.

The aerial vehicle 2305 may also include an antenna 2306 or other wireless transmission mechanism to enable wireless communication between the aerial vehicle and other computing sources, such as computing sources that provide route information, delivery information, indications of deliverable area shapes and/or parcels, etc. Likewise, the aerial vehicle 2305 includes one or more sensors 2312, such as a camera, ranging sensor, altimeter, barometer, etc., that may be used by the control system 2315 and/or the analysis unit 2317 to navigate the aerial vehicle 2305 and/or to obtain sensor data representative of at least a portion of a parcel or deliverable area shape within a parcel. For example, the sensor 2312 may be a digital Red, Green, Blue (RGB) camera oriented to obtain images of a surface, such as parcels, below the aerial vehicle 2305 when the aerial vehicle is airborne.

The aerial vehicle 2305 may also include a payload engagement component 2304 that is operable to engage, carry, and/or disengage a payload, such as an item, for aerial transport by the aerial vehicle 2305.

Figure 24:
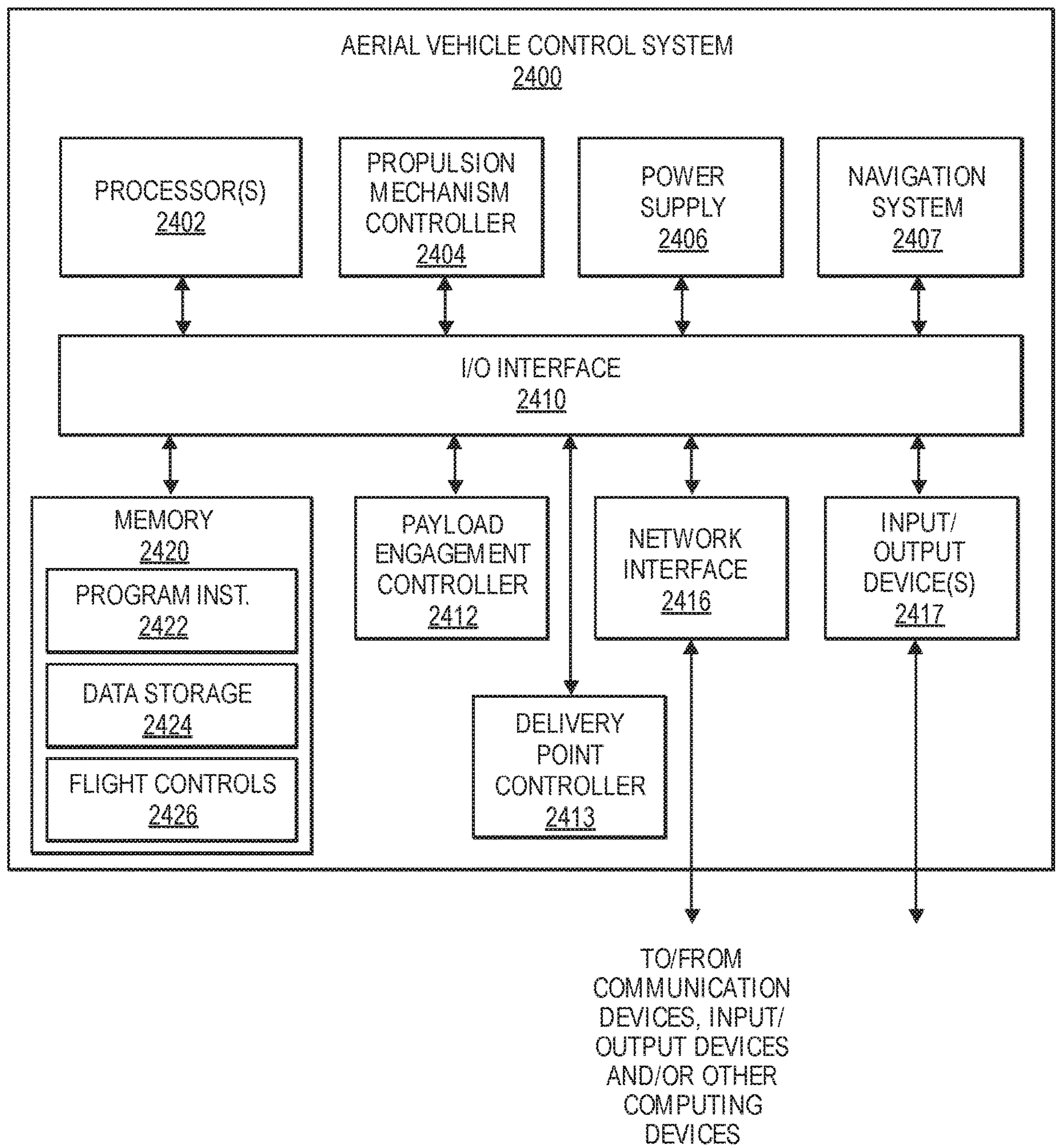
FIG. 24 is an example aerial vehicle control system, in accordance with described implementations.

FIG. 24 is a block diagram illustrating various components of an example aerial vehicle control system 2400, in accordance with disclosed implementations.

In various examples, the block diagram may be illustrative of one or more aspects of the aerial vehicle control system 2400 that may be used to implement the various systems and methods discussed herein and/or to control operation of an aerial vehicle discussed herein. In the illustrated implementation, the aerial vehicle control system 2400 includes one or more processors 2402, coupled to a memory, e.g., a non-transitory computer readable storage medium 2420, via an input/output (I/O) interface 2410. The aerial vehicle control system 2400 also includes propulsion mechanism controllers 2404, such as electronic speed controls (ESCs) or motor controllers, power modules 2406 and/or a navigation system 2407. The aerial vehicle control system 2400 further includes a payload engagement controller 2412, a delivery point controller 2413 configured to implement one or more of the implementations described herein, a network interface 2416, and one or more input/output devices 2417.

In various implementations, the aerial vehicle control system 2400 may be a uniprocessor system including one processor 2402, or a multiprocessor system including several processors 2402 (e.g., two, four, eight, or another suitable number). The processor(s) 2402 may be any suitable processor capable of executing instructions. For example, in various implementations, the processor(s) 2402 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 2402 may commonly, but not necessarily, implement the same ISA.

The non-transitory computer readable storage medium 2420 may be configured to store executable instructions, data, flight paths, flight control parameters, center of gravity information, and/or data items accessible by the processor(s) 2402. In various implementations, the non-transitory computer readable storage medium 2420 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 2420 as program instructions 2422, data storage 2424 and flight controls 2426, respectively. In other implementations, program instructions, data, and/or flight controls may be received, sent, or stored upon different types of computer-accessible media, such as non-transitory media, or on similar media separate from the non-transitory computer readable storage medium 2420 or the aerial vehicle control system 2400. Generally speaking, a non-transitory, computer readable storage medium may include storage media or memory media such as magnetic or optical media, e.g., disk or CD/DVD-ROM, coupled to the aerial vehicle control system 2400 via the I/O interface 2410. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 2416.

In one implementation, the I/O interface 2410 may be configured to coordinate I/O traffic between the processor(s) 2402, the non-transitory computer readable storage medium 2420, and any peripheral devices, the network interface or other peripheral interfaces, such as input/output devices 2417. In some implementations, the I/O interface 2410 may perform any necessary protocol, timing or other data transformations to convert data signals from one component (e.g., non-transitory computer readable storage medium 2420) into a format suitable for use by another component (e.g., processor(s) 2402). In some implementations, the I/O interface 2410 may include support for devices attached through various types of peripheral buses, such as a variant of the Peripheral Component Interconnect (PCI) bus standard or the Universal Serial Bus (USB) standard, for example. In some implementations, the function of the I/O interface 2410 may be split into two or more separate components, such as a north bridge and a south bridge, for example. Also, in some implementations, some or all of the functionality of the I/O interface 2410, such as an interface to the non-transitory computer readable storage medium 2420, may be incorporated directly into the processor(s) 2402.

The propulsion mechanism controllers 2404 may communicate with the navigation system 2407 and adjust the rotational speed, position, orientation, or other parameters of each propulsion mechanism, to stabilize the aerial vehicle, and/or to perform one or more maneuvers and guide the aerial vehicle along a flight path and/or to a safe landing location.

The navigation system 2407 may include a global positioning system (GPS), indoor positioning system (IPS), or other similar system and/or sensors that can be used to navigate the aerial vehicle to and/or from a location. The payload engagement controller 2412 communicates with the actuator(s) or motor(s) (e.g., a servo motor) used to engage and/or disengage items.

The delivery point controller 2413 may comprise or form a part of a flight controller that is configured to determine flight paths/routes, selected delivery points, and/or to provide other controls and operations of the aerial vehicle. The delivery point controller 2413 may send and/or receive data to/from one or more sensors, such as imaging devices, an inertial measurement unit, accelerometers, gyroscopes, navigation sensors, or other sensors, and/or the delivery point controller 2413 may send and/or receive data to/from propulsion mechanism controllers 2404 associated with respective propulsion mechanisms. In some implementations, the delivery point controller 2413 may be integrated with or form a part of one or more of the processors 2402, the propulsion mechanism controllers 2404, and/or the navigation system 2407.

The network interface 2416 may be configured to allow data to be exchanged between the aerial vehicle control system 2400, other devices attached to a network, such as other computer systems (e.g., remote computing resources), and/or with aerial vehicle control systems of other aerial vehicles. For example, the network interface 2416 may enable wireless communication between the aerial vehicle and an aerial vehicle control system that is implemented on one or more remote computing resources. For wireless communication, an antenna of the aerial vehicle or other communication components may be utilized. As another example, the network interface 2416 may enable wireless communication between numerous aerial vehicles. In various implementations, the network interface 2416 may support communication via wireless general data networks, such as a Wi-Fi network. For example, the network interface 2416 may support communication via telecommunications networks, such as cellular communication networks, satellite networks, and the like.

Input/output devices 2417 may, in some implementations, include one or more displays, imaging devices, thermal sensors, infrared sensors, time of flight sensors, accelerometers, pressure sensors, weather sensors, etc. Multiple input/output devices 2417 may be present and controlled by the aerial vehicle control system 2400. One or more of these sensors may be utilized to implement the implementations described.

As shown in FIG. 24, the memory may include program instructions 2422, which may be configured to implement the example routines and/or sub-routines described herein. The data storage 2424 may include various data stores for maintaining data items that may be provided for aerial vehicle navigation, determining flight paths, landing, determining deliverable area shapes within a parcel, identifying delivery points, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 2400 is merely illustrative and is not intended to limit the scope of the present disclosure. In particular, the computing system and devices may include any combination of hardware or software that can perform the indicated functions. The aerial vehicle control system 2400 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 2400. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 2400 may be transmitted to the aerial vehicle control system 2400 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

Figure 25:
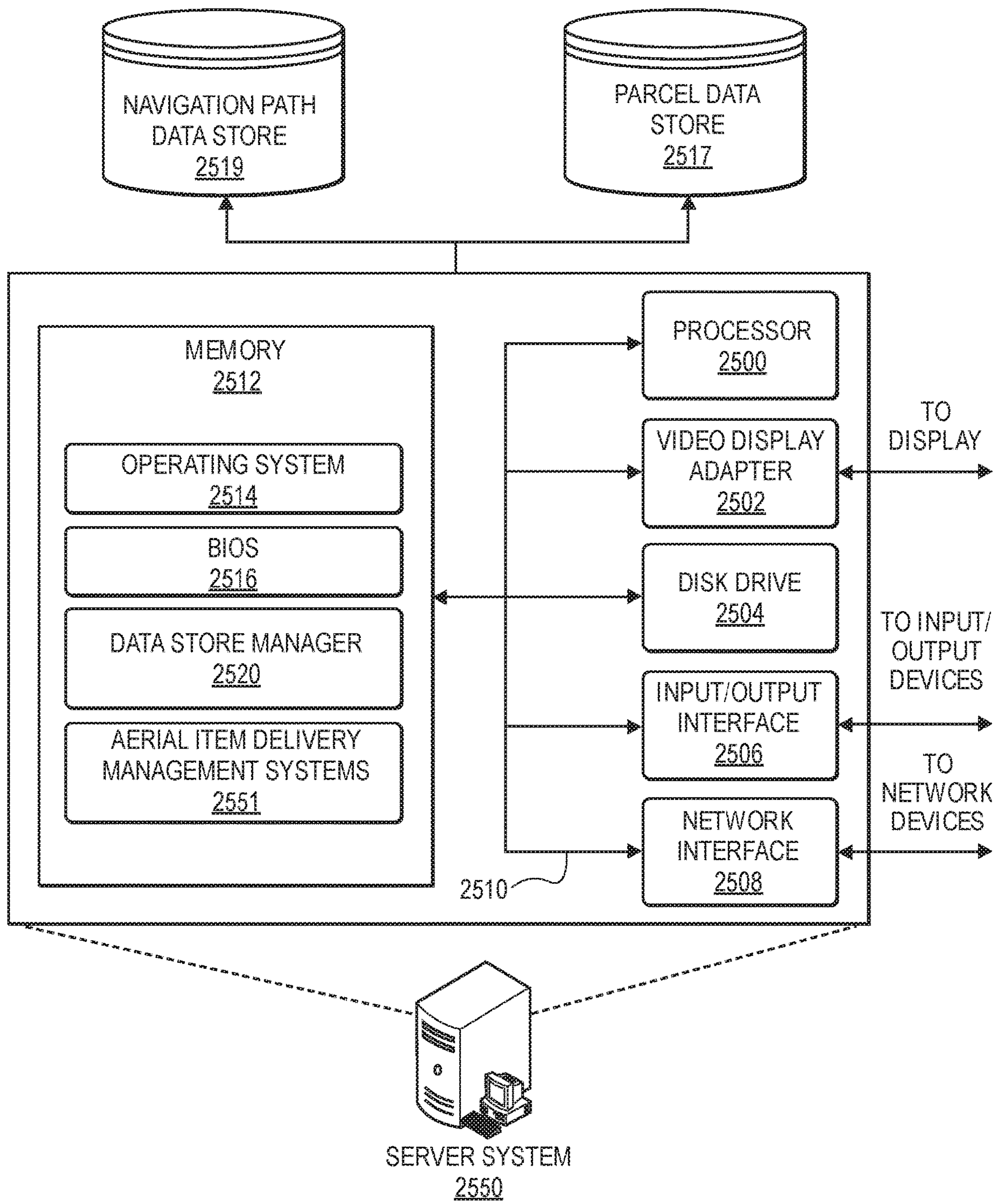
FIG. 25 is an example computing system, in accordance with disclosed implementations.

FIG. 25 is a pictorial diagram of an illustrative implementation of a server system 2550 that may be used in the implementations described herein.

The server system 2550 may include a processor 2500, such as one or more redundant processors, a video display adapter 2502, a disk drive 2504, an input/output interface 2506, a network interface 2508, and a memory 2512. The processor 2500, the video display adapter 2502, the disk drive 2504, the input/output interface 2506, the network interface 2508, and the memory 2512 may be communicatively coupled to each other by a communication bus 2510.

The video display adapter 2502 provides display signals to a local display permitting an operator of the server system 2550 to monitor and configure operation of the server system 2550. The input/output interface 2506 likewise communicates with external input/output devices, such as a mouse, keyboard, scanner, or other input and output devices that can be operated by an operator of the server system 2550. The network interface 2508 includes hardware, software, or any combination thereof, to communicate with other computing devices. For example, the network interface 2508 may be configured to provide communications between the server system 2550 and other computing devices, such as the aerial vehicle control system 2400 (FIG. 24) of an aerial vehicle 2305 (FIG. 23).

The memory 2512 may be a non-transitory computer readable storage medium configured to store executable instructions accessible by the processor(s) 2500. In various implementations, the non-transitory computer readable storage medium may be implemented using any suitable memory technology, such as static random access memory (SRAM), synchronous dynamic RAM (SDRAM), nonvolatile/Flash-type memory, or any other type of volatile or permanent memory. In the illustrated implementation, program instructions and data implementing desired functions, such as those described herein, are shown stored within the non-transitory computer readable storage medium. In other implementations, program instructions may be received, sent, or stored upon different types of computer-accessible media, such as non-transitory media, or on similar media separate from the non-transitory computer readable storage medium. Generally speaking, a non-transitory, computer readable storage medium may include storage media or memory media such as magnetic or optical media, e.g., disk or CD/DVD-ROM. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 2508.

The memory 2512 is shown storing an operating system 2514 for controlling the operation of the server system 2550. A binary input/output system (BIOS) 2516 for controlling the low-level operation of the server system 2550 is also stored in the memory 2512. The memory 2512 additionally stores computer executable instructions, that, when executed by the processor 2500 cause the processor to perform one or more of the processes discussed herein. The memory 2512 additionally stores program code and data for providing network services. The data store manager application 2520 facilitates data exchange between the data stores 2517, 2519 and/or other data stores.

As used herein, the term "data store" refers to any device or combination of devices capable of storing, accessing and retrieving data which may include any combination and number of data servers, databases, data storage devices and data storage media in any standard, distributed or clustered environment. The server system 2550 can include any appropriate hardware and software for integrating with the data stores 2517, 2519 as needed to execute aspects of the management systems 2550.

The data stores 2517, 2519 can include several separate data tables, databases or other data storage mechanisms and media for storing data relating to a particular aspect. For example, the data stores 2517, 2519 illustrated include mechanisms for maintaining navigation path information, parcel data such as deliverable area shapes, parcel locations, etc. Depending on the configuration and use of the server system 2550, one or more of the data stores may not be included or accessible to the server system 2550 and/or other data store may be included or accessible.

It should be understood that there can be many other aspects that may be stored in the data stores 2517, 2519. The data stores 2517, 2519 are operable, through logic associated therewith, to receive instructions from the server system 2550 and obtain, update or otherwise process data in response thereto.

The memory 2512 may also include an aerial item delivery management system 2551. The item delivery management system 2551 may be configured to perform some or all of the implementations discussed herein and/or to exchange data and information with one or more aerial vehicles. For example, the item delivery management system 2551 may perform one or more of the processes discussed above with respect to FIGS. 10-20.

The corresponding server system 2550 may be executable by the processor 2500 to implement one or more of the functions of the server system 2550. In one implementation, the server system 2550 may represent instructions embodied in one or more software programs stored in the memory 2512. In another implementation, the system 2550 can represent hardware, software instructions, or a combination thereof.

The server system 2550, in one implementation, is a distributed environment utilizing several computer systems and components that are interconnected via communication links, using one or more computer networks or direct connections. It will be appreciated by those of ordinary skill in the art that such a system could operate equally well in a system having fewer or a greater number of components than are illustrated in FIG. 25. Thus, the depiction in FIG. 25 should be taken as being illustrative in nature and not limiting to the scope of the disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims.

Moreover, with respect to the one or more methods or processes of the present disclosure shown or described herein, including but not limited to the flow charts shown in FIGS. 10 through 20, order in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to determine a preferred delivery point to complete an aerial delivery of an item to a parcel, comprising:

determining a geographic area within a parcel within which an aerial vehicle may deliver an item;

determining a plurality of delivery points within the geographic area at which the aerial vehicle may deliver the item;

determining, for each of the plurality of delivery points, a suitability score indicating a suitability for a delivery of the item to the delivery point;

ranking each of the plurality of delivery points based at least in part on the suitability scores;

presenting at least a portion of the delivery points to a user along with information corresponding to the suitability score determined for each presented delivery point;

receiving, from the user, a selection of a delivery point of the at least a portion of the delivery points presented to the user as a preferred delivery point; and causing a delivery of the item to the parcel at the preferred delivery point.

2. The computer-implemented method of claim 1, wherein determining the plurality of delivery points further includes:

determining, based at least in part on one or more of parcel data associated with the parcel or image data of the parcel, a plurality of delivery points that are clear of obstacles and of at least a defined size associated with the aerial vehicle to enable the delivery of the item by the aerial vehicle.

3. The computer-implemented method of claim 1, wherein determining, for each of the plurality of delivery points, the suitability score further includes:

for each of the plurality of delivery points:

determining, for each of a plurality of criteria, a criteria score; and aggregating the criteria scores to generate the suitability score.

4. The computer-implemented method of claim 3, wherein the plurality of criteria include one or more of an access convenience to the delivery point, a noise of the aerial vehicle, or a downdraft disruption of a downdraft from the aerial vehicle.

5. The computer-implemented method of claim 3, further comprising:

receiving, from the user, an indication of an importance of a first criteria of the plurality of criteria with respect to a second criteria of the plurality of criteria; and wherein the suitability score is weighted based at least in part on the importance of the first criteria with respect to the second criteria.

6. A computing system, comprising:

one or more processors; and a memory storing program instructions that, when executed by the one or more processors, cause the one or more processors to at least:

determine a first delivery point within a parcel at which an aerial vehicle may deliver an item;

determine a second delivery point within the parcel at which the aerial vehicle may deliver the item, wherein the second delivery point is different than the first delivery point;

determine, based on a plurality of criteria, a first suitability score indicating a first suitability of the first delivery point for aerial delivery of the item;

determine, based on the plurality of criteria, a second suitability score indicating a second suitability of the second delivery point for aerial delivery of the item;

determine that the first suitability score is higher than the second suitability score; and in response to determination that the first suitability score is higher than the second suitability score, store, in a data store, the first delivery point as a preferred delivery point for the parcel such that aerial delivery of the item to the parcel will be directed to the preferred delivery point.

7. The computing system of claim 6, wherein the program instructions, that when executed by the one or more processors to determine the first suitability score, further include instructions that, when executed by the one or more processors, further cause the one or more processors to at least:

determine, for each of the plurality of criteria, a corresponding criteria score for the first delivery point; and aggregate criteria scores to determine the first suitability score for the first delivery point.

8. The computing system of claim 6, wherein the program instructions that when executed by the one or more processors further cause the one or more processors to at least:

determine, for the first delivery point, a valid delivery point score, wherein the valid delivery point score is based at least in part on a determined probability that the first delivery point is clear during an attempted delivery of the item by the aerial vehicle, a reachability of the first delivery point by the aerial vehicle, and a distance of the first delivery point to an invalid delivery point;

determine that the valid delivery point score exceeds a threshold; and in response to determination that the valid delivery point score exceeds the threshold, indicate the first delivery point as a valid delivery point.

9. The computing system of claim 6, wherein the program instructions that, when executed by the one or more processors further cause the one or more processors to at least:

send, for presentation to a user, a user interface that includes a representation of the parcel, an indication of a first position of the first delivery point at the parcel and an indication of a second position of the second delivery point at the parcel;

receive, from the user, a selection of the second delivery point as the preferred delivery point for the parcel; and update, in the data store, the second delivery point as the preferred delivery point for the parcel.

10. The computing system of claim 9, wherein the program instructions that, when executed by the one or more processors further cause the one or more processors to at least:

send, for presentation to the user, first information indicative of the first suitability score; and send, for presentation to the user, second information indicative of the second suitability score.

11. The computing system of claim 10, wherein:

the first information is further indicative of a plurality of criteria scores corresponding to the plurality of criteria used to determine the first suitability score; and the program instructions that, when executed by the one or more processors further cause the one or more processors to at least:

receive, from the user, a selection of a first criteria of the plurality of criteria as having a higher importance than a second criteria of the plurality of criteria; and update the first suitability score based at least in part on the indication of the first criteria having a higher importance than the second criteria.

12. The computing system of claim 6, wherein the program instructions that when executed by the one or more processors further cause the one or more processors to at least:

determine, for the first delivery point, a valid delivery point score, wherein the valid delivery point score is based at least in part on a probability clear score indicative of a probability that the first delivery point is clear during an attempted delivery of the item by the aerial vehicle, a reachability score indicative of a reachability of the first delivery point by the aerial vehicle, and a distance to invalid delivery point score indicative of a distance of the first delivery point to an invalid delivery point;

determine that the valid delivery point score exceeds a threshold; and in response to determination that the valid delivery point score exceeds the threshold, indicate the first delivery point as a valid delivery point.

13. The computing system of claim 12, wherein the program instructions that when executed by the one or more processors further cause the one or more processors to at least:

determine that each of the probability clear score, the reachability score, and the distance from invalid delivery point score exceeds a respective minimum individual threshold.

14. The computing system of claim 6, wherein the program instructions that, when executed by the one or more processors further cause the one or more processors to at least:

for each of a plurality of delivery points within the parcel:

determine whether the delivery point is a valid delivery point; and in response to determination that the delivery point is a valid delivery point, determine a suitability score for the delivery point.

15. The computing system of claim 14, wherein at least some of the plurality of delivery points at least partially overlap.

16. A method to determine a preferred delivery point to complete an aerial delivery of an item, comprising:

determining a plurality of valid delivery points within a parcel at which an aerial vehicle may deliver an item;

for each of the plurality of valid delivery points:

determining, for a first criteria, a first criteria score indicative of a first suitability of the first criteria at the delivery point;

determining, for a second criteria, a second criteria score indicative of a second suitability of the second criteria at the delivery point; and determining, based at least in part on the first criteria and the second criteria, a suitability score indicative of a suitability of the delivery point for aerial delivery of the item.

17. The method of claim 16, wherein determining a plurality of valid delivery points further includes:

for each of a plurality of delivery points:

determining one or more of:

a probability clear score indicative of a probability that the delivery point is clear during a delivery of the item by the aerial vehicle;

a reachability score indicative of a reachability of the delivery point by the aerial vehicle; or a distance to invalid delivery point score indicative of a distance of the delivery point to an invalid delivery point;

determining, based at least in part on one or more the probability clear score, the reachability score, or the distance to invalid delivery point score, a valid delivery point score;

determining that the valid delivery point score exceeds a threshold; and in response to determining that the valid delivery point score exceeds the threshold, determining that the delivery point is a valid delivery point.

18. The method of claim 16, wherein the first criteria is a user criteria indicative of at least one of an access convenience to the delivery point, a noise of the aerial vehicle, or a downdraft disruption of a downdraft of the aerial vehicle.

19. The method of claim 16, wherein determining the first criteria score is based at least in part on a processing of one or more of parcel data corresponding to the parcel, image data of the parcel, or sensor data collected during a prior delivery to the parcel.

20. The method of claim 16, further comprising:

collecting, during the delivery of the item by the aerial vehicle and with one or more sensors included on the aerial vehicle, sensor data corresponding to the first criteria; and updating, based at least in part on the sensor data, the first criteria score for the preferred delivery point.

* * * * *